(12) United States Patent
Goldstein

(10) Patent No.: US 10,304,064 B2
(45) Date of Patent: May 28, 2019

(54) GRANT ADMINISTRATION SYSTEM

(75) Inventor: Dahna Goldstein, Washington, DC (US)

(73) Assignee: ALTUM, INC., Reston, VA (US)

( * ) Notice: Subject to any disclaimer, the term of this patent is extended or adjusted under 35 U.S.C. 154(b) by 860 days.

(21) Appl. No.: 11/979,416

(22) Filed: Nov. 2, 2007

(65) Prior Publication Data

US 2009/0117529 A1 May 7, 2009

(51) Int. Cl.
*G09B 3/00* (2006.01)
*G06Q 30/02* (2012.01)

(52) U.S. Cl.
CPC .................................... *G06Q 30/02* (2013.01)

(58) Field of Classification Search
CPC ... G09B 7/02; G09B 7/00; G09B 7/04; G09B 3/00; G06F 17/3089; G06Q 30/02; G06Q 30/06; G06Q 50/165
USPC ..... 434/322, 118, 350, 308, 323, 236; 705/1
See application file for complete search history.

(56) References Cited

U.S. PATENT DOCUMENTS

| | | | |
|---|---|---|---|
| 5,802,493 A * | 9/1998 | Sheflott et al. | 705/1.1 |
| 5,875,432 A * | 2/1999 | Sehr | G07C 13/00 434/306 |
| 6,112,209 A | 8/2000 | Gusack | |
| 6,131,085 A * | 10/2000 | Rossides | G06Q 30/02 705/1.1 |
| 6,146,148 A * | 11/2000 | Stuppy | G06Q 10/00 434/322 |
| 6,175,831 B1 | 1/2001 | Weinreich et al. | |
| 6,283,761 B1 * | 9/2001 | Joao | G06F 19/322 434/236 |
| 6,345,278 B1 | 2/2002 | Hitchcock et al. | |
| 6,356,909 B1 * | 3/2002 | Spencer | |
| 6,393,426 B1 | 5/2002 | Odom et al. | |
| 6,460,042 B1 | 10/2002 | Hitchcock et al. | |
| 6,898,601 B2 | 5/2005 | Amado et al. | |
| 6,910,045 B2 | 6/2005 | Hickey et al. | |
| 6,944,776 B1 | 9/2005 | Lockhart et al. | |
| 6,961,897 B1 | 11/2005 | Peel, Jr. et al. | |
| 6,964,015 B2 | 11/2005 | Demopoulos et al. | |
| 2002/0046147 A1 * | 4/2002 | Livesay | G06Q 10/06 705/37 |

(Continued)

*Primary Examiner* — Eddy Saint-Vil
(74) *Attorney, Agent, or Firm* — Steptoe & Johnson LLP

(57) ABSTRACT

A method and system are disclosed for facilitating the completion of a questionnaire. A storage medium stores a plurality of questions and associated answers. Similar questions are linked. An interface presents to a user through a computer network a presented question as part of a questionnaire to be completed. The interface also presents to the user answers associated with similar questions linked to the presented question. Upon user selection, an answer to a similar question is stored as an answer to the selected question. The user may modify the answer. The method and system may present additional questions and answers associated with similar questions linked to the additional question. A user may have access to stored questions, add questions, and link similar questions. Answers to questions may be stored before the user completes the questionnaire. The questionnaire may include fields populated with information previously supplied by the user without user selection. The storage medium may be a database.

19 Claims, 98 Drawing Sheets

(56) References Cited

U.S. PATENT DOCUMENTS

| | | | |
|---|---|---|---|
| 2002/0064766 A1* | 5/2002 | Cozens | G09B 5/02 434/350 |
| 2002/0103818 A1* | 8/2002 | Amberden | 707/205 |
| 2002/0115050 A1* | 8/2002 | Roschelle | G09B 7/00 434/350 |
| 2002/0138389 A1* | 9/2002 | Martone | G06F 17/30861 705/36 R |
| 2002/0165723 A1* | 11/2002 | Kroeger | G06Q 50/165 705/315 |
| 2002/0192631 A1* | 12/2002 | Weir | G09B 5/02 434/350 |
| 2003/0118629 A1* | 6/2003 | Scholz | A01N 59/12 424/443 |
| 2003/0227479 A1* | 12/2003 | Mizrahi | A63F 13/10 715/753 |
| 2004/0210540 A1* | 10/2004 | Israel | G06Q 10/10 705/80 |
| 2005/0014122 A1* | 1/2005 | Ruvinsky | G09B 7/02 434/350 |
| 2005/0075977 A1* | 4/2005 | Carroll | G06Q 20/102 705/40 |
| 2005/0130110 A1* | 6/2005 | Gosling | G09B 7/00 434/322 |
| 2005/0137938 A1* | 6/2005 | Meyer | G06Q 20/20 705/16 |
| 2005/0149507 A1* | 7/2005 | Nye | G06F 17/30864 |
| 2005/0170326 A1* | 8/2005 | Koehler | G09B 5/00 434/350 |
| 2005/0246196 A1* | 11/2005 | Frantz | G06Q 30/02 705/7.32 |
| 2005/0266387 A1* | 12/2005 | Rossides | 434/323 |
| 2005/0287507 A1* | 12/2005 | Inandik | 434/323 |
| 2006/0074699 A1* | 4/2006 | Samsky | G06Q 10/10 705/311 |
| 2006/0078862 A1* | 4/2006 | Goto | G09B 7/02 434/322 |
| 2006/0134593 A1* | 6/2006 | Kalous | G09B 7/00 434/350 |
| 2006/0265630 A1* | 11/2006 | Alberti | G06F 8/65 714/38.12 |
| 2006/0286530 A1* | 12/2006 | Forrest et al. | 434/323 |
| 2007/0065797 A1* | 3/2007 | Elgart | 434/322 |
| 2007/0150296 A1* | 6/2007 | Ramcharran | G06Q 10/06 715/221 |
| 2007/0156662 A1* | 7/2007 | Tully | 707/3 |
| 2007/0166684 A1* | 7/2007 | Walker | 434/322 |
| 2009/0094040 A1* | 4/2009 | Lewis | 705/1 |

* cited by examiner

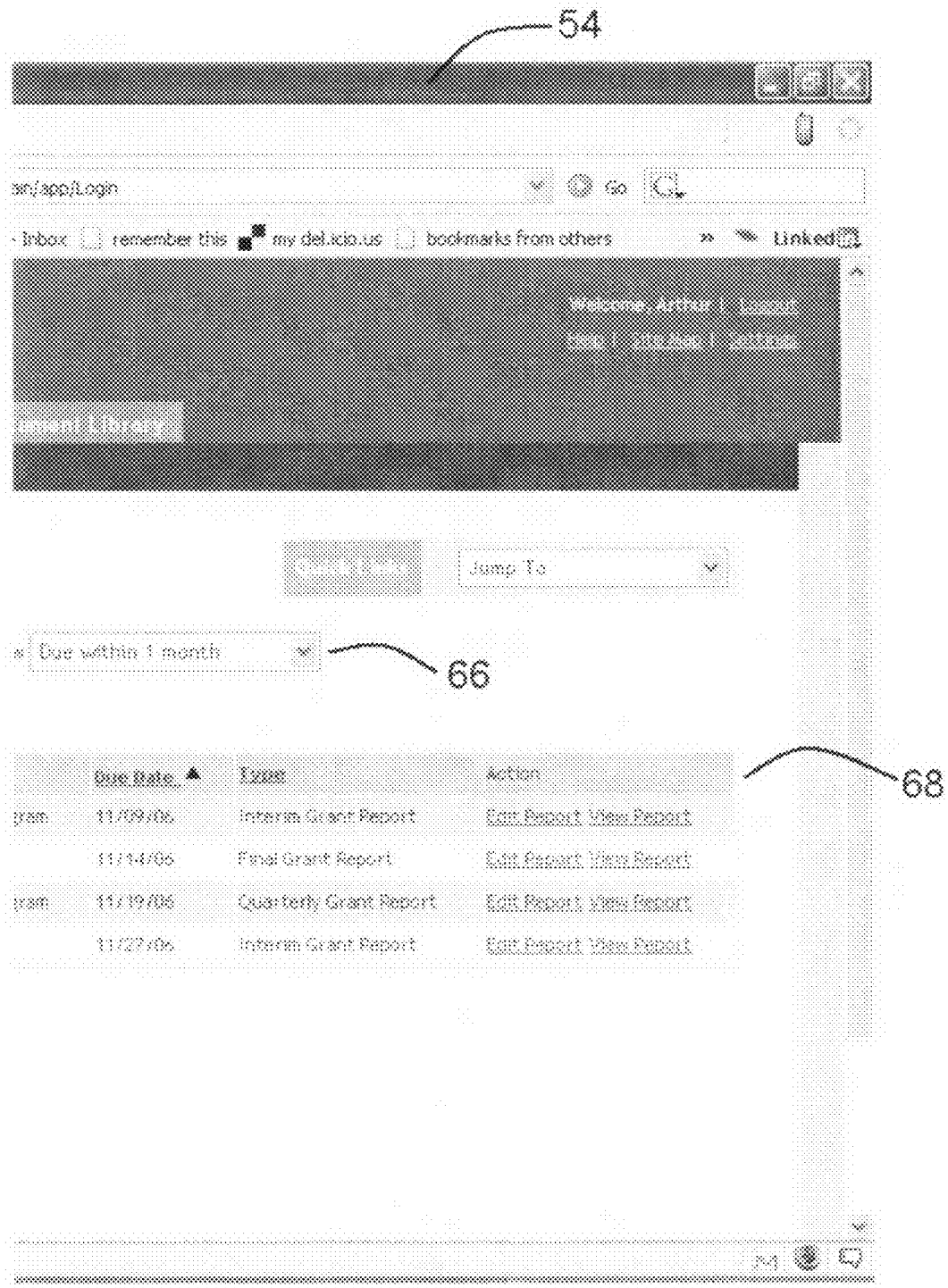

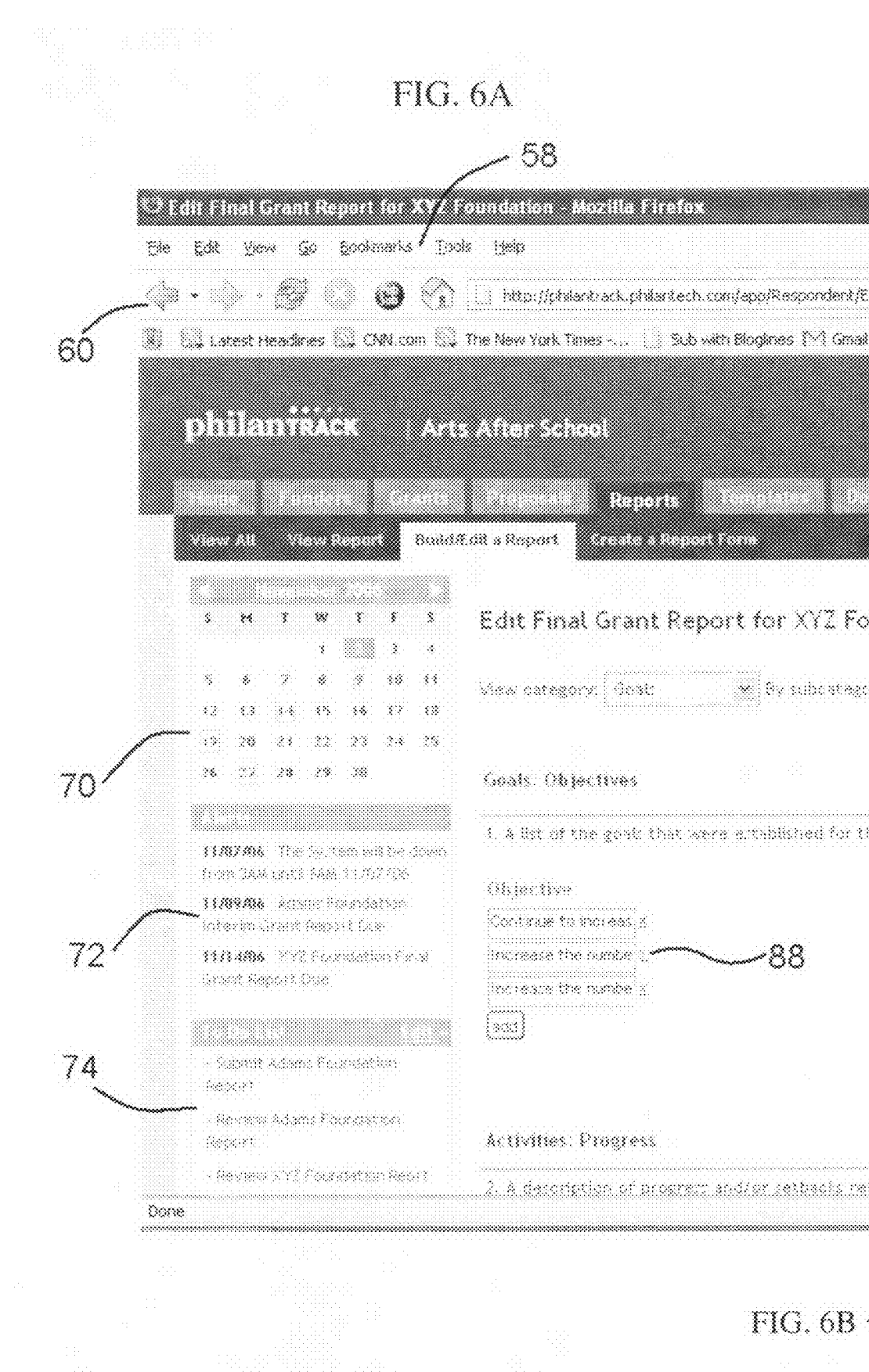

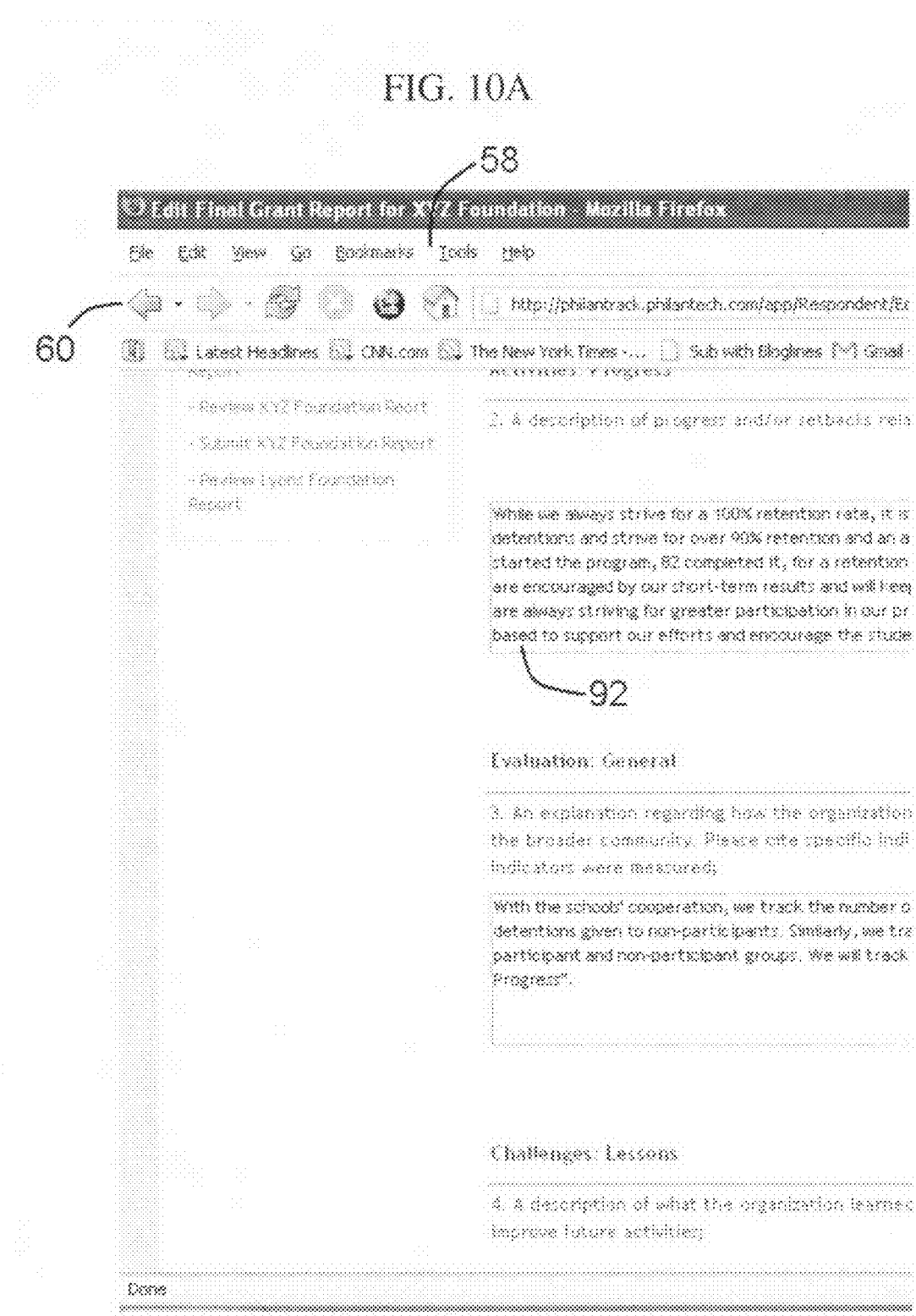

FIG. 13B → rt for XYZ Foundation

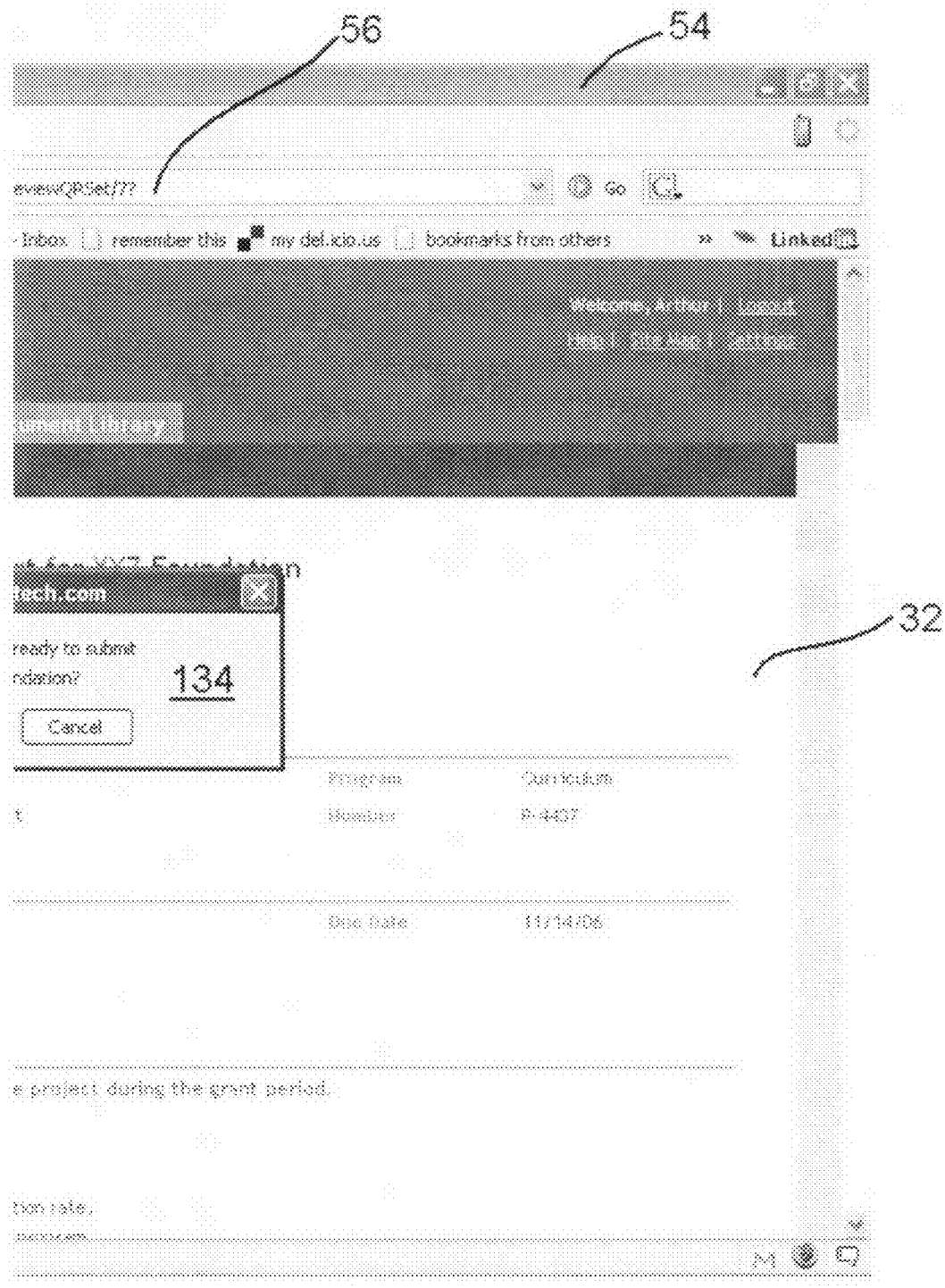

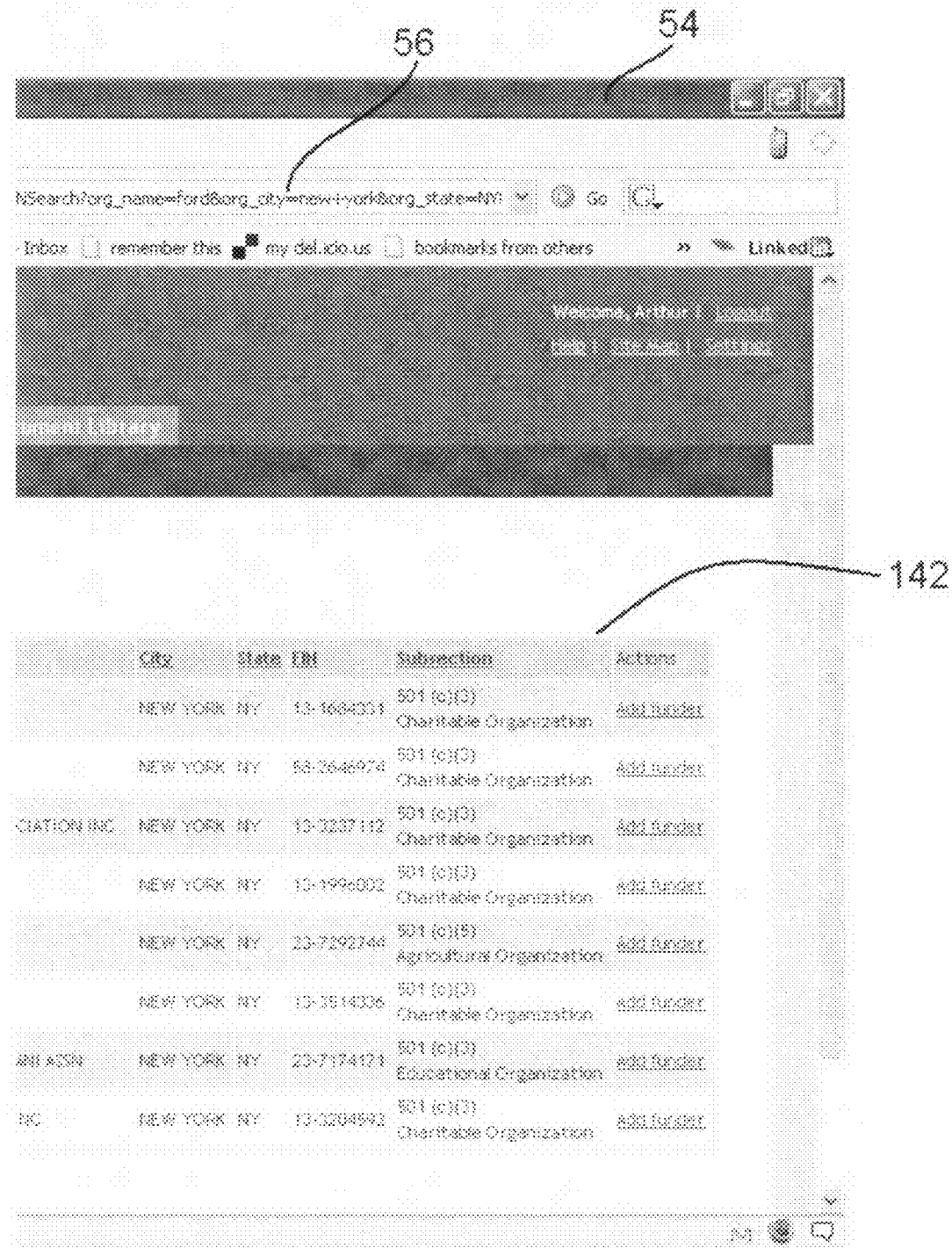

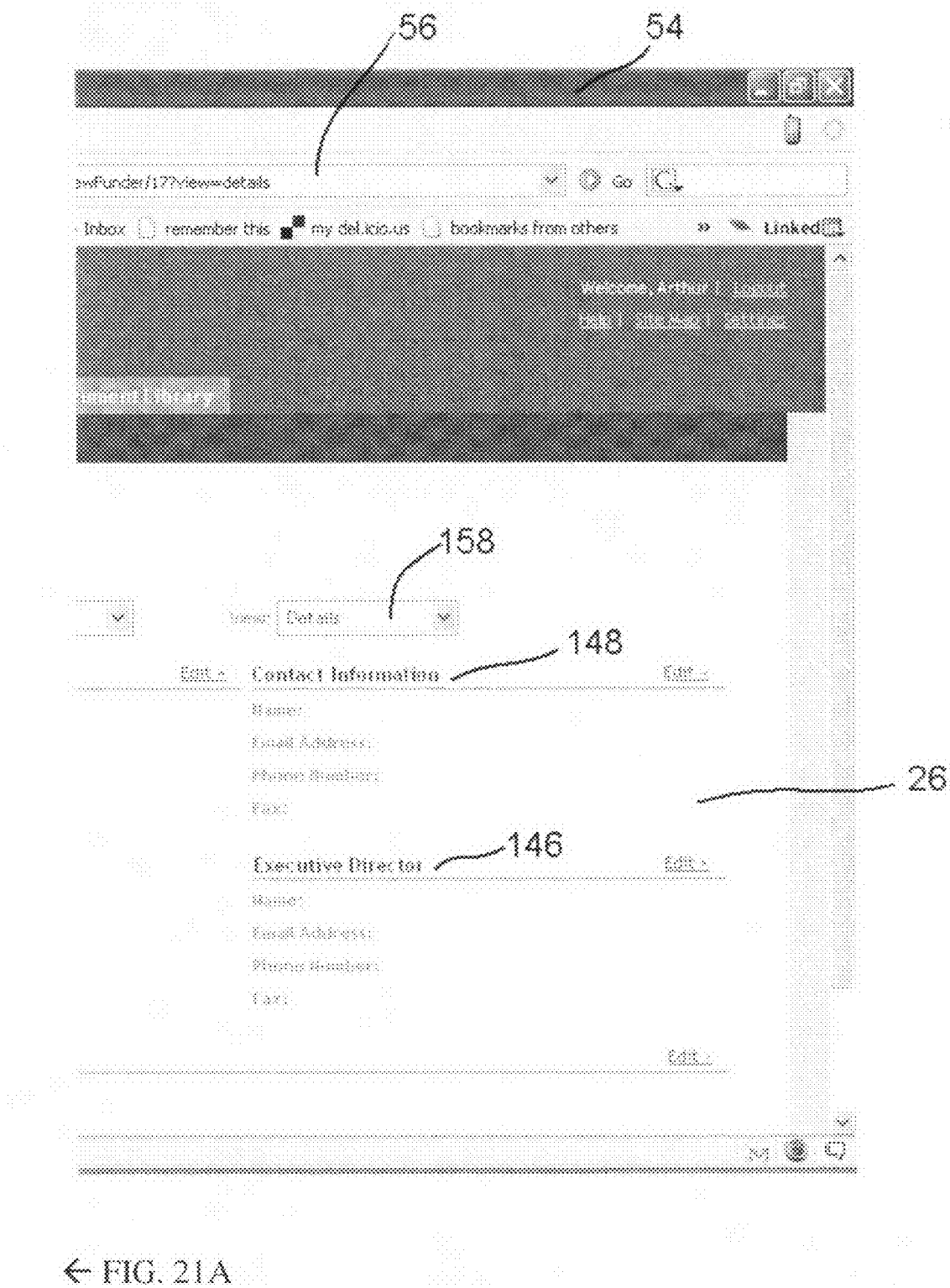

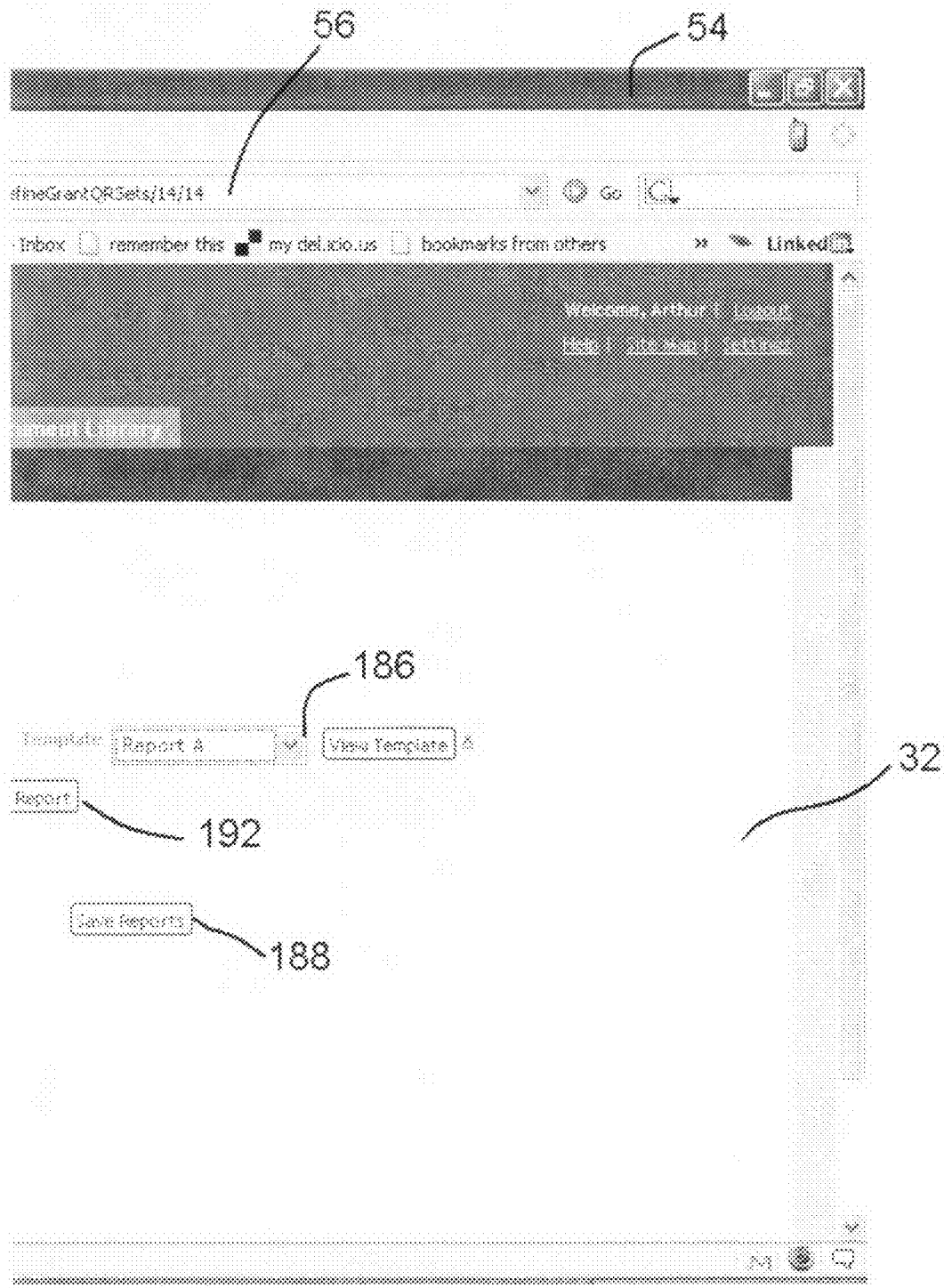

FIG. 24B →

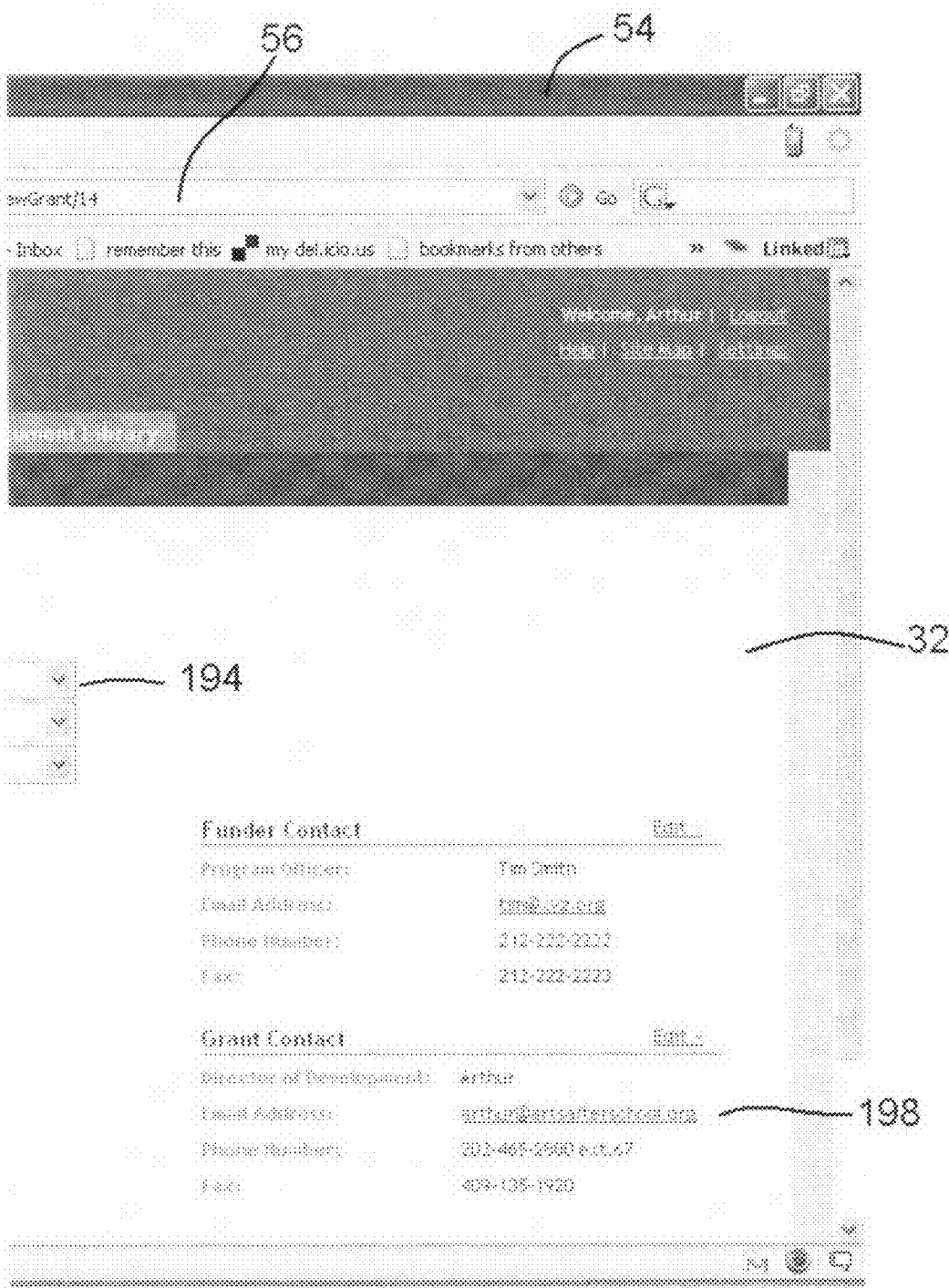

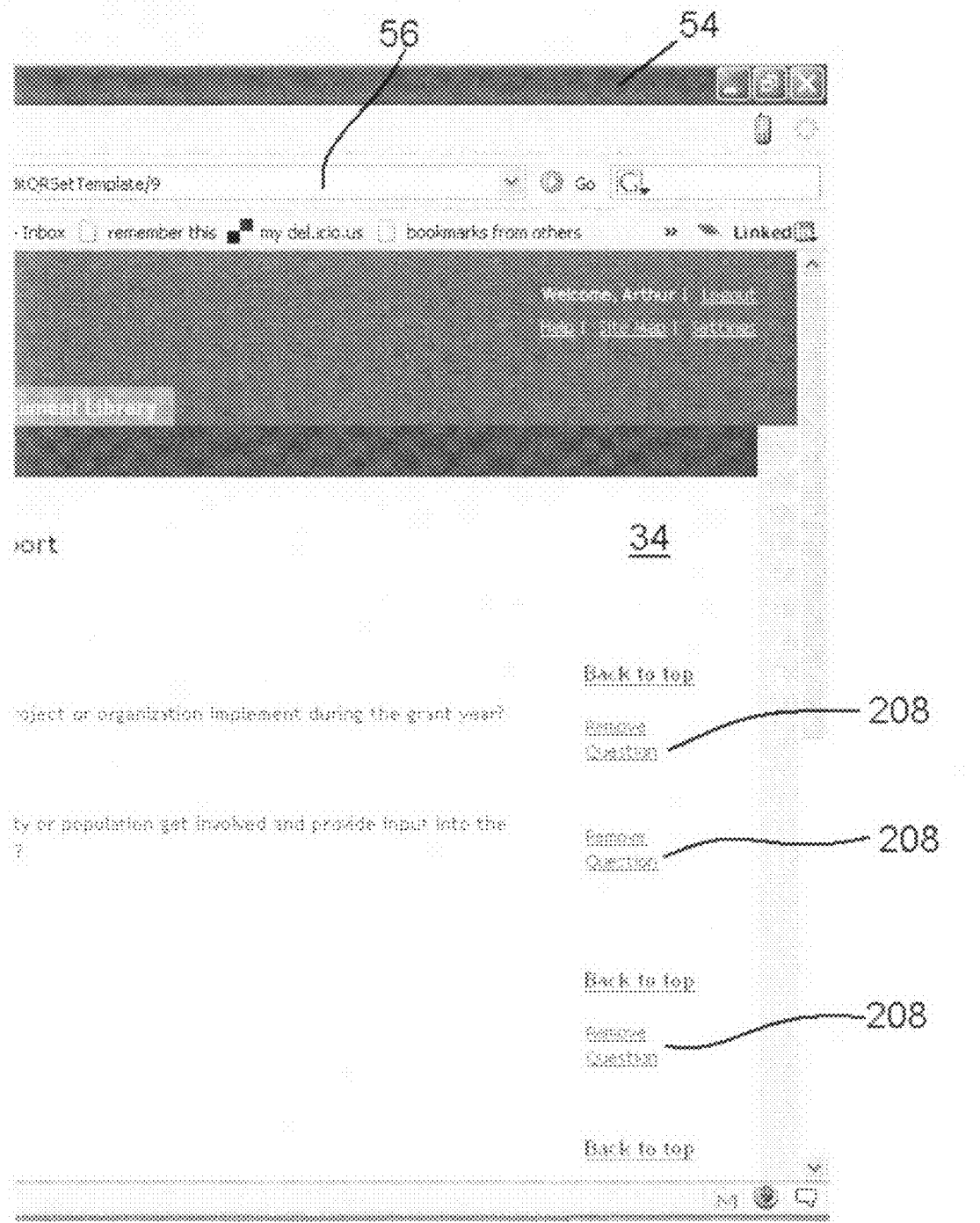

GRANT ADMINISTRATION SYSTEM

FIELD OF THE INVENTION

The present invention relates to the field of data processing and in particular to software systems that support information transfer between organizations.

BACKGROUND OF THE INVENTION

Non-profit organizations are able to exist and provide services largely due to financial grants provided by foundations and other sources of charitable donations. Administration of these grants by the non-profits and the foundations that make them is a central focus for these organizations. Grant administration primarily centers on preparing proposals and reports about the grant. The reports are typically submitted on a regular basis, such as quarterly. These reports typically consist of a description of the services rendered with the grant money during the reporting period, a description of the prospective services to be rendered during the upcoming reporting period, and budget data regarding how much of the grant money has been used and will be used. Generally the questions and answers to these recurring reports are repetitive, but not necessarily identical.

Non-profit organizations often receive multiple grants from multiple foundations. While receiving different grants from different foundations, the reporting requirements of different foundations are typically similar. The reports generally ask for similar information regarding the different grants in a similar manner. Thus, in addition to the repetitive nature of recurring reports, non-profits commonly have to complete similar reports for different foundations.

In many cases, foundations have very specific reporting requirements that include prepared questionnaire forms for completion by the non-profit organization. In other cases, the foundations have less formal reporting requirements in which case the non-profit organization has some discretion as to how they prepare their report on the administration of the grant. In either case, preparation of these proposals and reports on a regular basis requires a significant amount of data preparation and entry.

A number of software tools are currently known that support grant administration by non-profit organizations and foundations. These software tools generally consist of a template that integrates with a commonly available word processing program that enables non-profits to prepare and complete reports using a stand-alone computer.

SUMMARY OF THE INVENTION

A recent report by the Center for Effective Philanthropy concluded that 13% of every foundation grant dollar is spent on grants administration. Thirteen cents on every dollar granted—$4 billion annually—are therefore not being spent on service delivery. There is therefore a need to reduce the time and cost of grants administration to increase the amount of services delivered by non-profit organizations to maximize the value of existing grants.

A grant administration system uses computer-based software for facilitating communication about grants between nonprofit organizations (grantee organizations) and donor foundations (grantor organizations). Rather than submitting grant reports and proposals as conventional computer documents or email attachments, grantees submit reports and proposals to grantors through the computer based system over a computer network.

The grant administration system is a customizable online reporting and proposal tool which allows foundations to ask questions unique to their reporting processes. It also identifies common information (contact information, financials, etc.) so that information only has to be entered once by the nonprofit organization, regardless of the number of proposals and reports it submits, thereby reducing the time and resources required for administering the grant.

The grant administration system includes a software tool that facilitates the requesting, provision, and sharing of information between two or more parties. The system allows for a "many-to-many relationship," wherein multiple grantor organizations and multiple grantee organizations can communicate with each other.

The grant administration system includes a grantee module where grantee organizations can view and manage grants made by grantor organizations. The grant administration system includes a grantor module where grantor organizations can view and manage grants made to grantee organizations. The grantor and grantee modules are accessible to users from non-profit organizations and foundations over a computer network such as the internet through a graphical user interface in the grant administration system. The grantor user employs the grantor module to create a computerized questionnaire for the grantee user regarding the administration of the grant. The computerized questionnaire includes a plurality of questions.

The grant administration system supports the completion of the computerized questionnaire with a database that allows for reuse of previously-entered information by tagging similar questions and linking those questions to their respective answers. The grant administration system allows grantee users to search for and reuse a portion or all of an answer to a previously answered question that is the same as or similar to the currently presented question. This preferably is done for any question having relatively complex information, such as a prose discussion of goals or accomplishments in a reporting period, or budget information. Some simple fields may be pre-populated without being linked to similar questions, such as a date of a questionnaire or the name and address of a grantee. It therefore enables the grantee user to complete repetitive proposals and reports faster by being able to reuse responses to previously answered questions that are similar to the ones in the current proposal or report. The same or similar questions stored in the database are identified as similar by a database operator using tags. Alternately, grantees may be given access to add questions, search for and identify similar questions, and link similar questions similarly to the way a database operator would. The answers are linked respectively with the tagged questions and are accessible by a grantee for reuse in completing proposals and reports to grantors. The database preferably may be updated in near-real time so that answers may be added to the database before a grantee actually completes and submits a questionnaire to a grantor. Answers and links may be stored in other manner than a centralized database, such as in storage capacity at the grantee or grantor location or in an XML file.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings listed below.

FIGS. 4-28 illustrate screen shots of software screens for a grantee organization.

FIGS. 29-41 illustrate screen shots of software screens for a grantor organization FIG. 4 illustrates a screen shot of a grantee user screen.

FIG. 5 illustrates a screen shot of a calendar tool on a grantee user screen.

FIG. 6 illustrates a screen shot of an edit-report tool on a report screen.

FIG. 7 illustrates a screen shot of an edit-report screen.

FIG. 8 illustrates a screen shot of a find-similar-questions screen.

FIG. 9 illustrates a screen shot of a find-similar-questions screen displaying a previous response.

FIG. 10 illustrates a screen shot of an edit-report-screen populated with a previous response selected from the find-similar-questions screen.

FIG. 11 illustrates a screen shot of an edit-report-screen where external documents may be attached to the report.

FIG. 12 illustrates a screen shot of an edit-report-screen where budgetary information is provided.

FIG. 13 illustrates a screen shot of an edit-report-screen where a grantee may preview an edited report.

FIG. 14 illustrates a screen shot of an edited report in a PDF format.

FIG. 15 illustrates a screen shot of an edit-report-screen where a report may be submitted.

FIG. 16 illustrates a screen shot of a grantee screen showing a confirmation of a submitted report.

FIG. 17 illustrates a screen shot of a funder screen where a grantee user can add a funder to a list that tracks reports made to funders.

FIG. 18 illustrates a screen shot of a funder screen where a grantee user can add a funder to a list that tracks reports made to funders.

FIG. 19 illustrates a screen shot of a funder screen where a grantee user may add information about a funder.

FIG. 20 illustrates a screen shot of a funder screen where a grantee user may add information about a funder.

FIG. 21 illustrates a screen shot of a funder screen where information about a funder is viewed.

FIG. 22 illustrates a screen shot of an add-grant screen.

FIG. 23 illustrates a screen shot of an edit-grant screen where grant reports are defined.

FIG. 24 illustrates a screen shot of an edit-grant screen where grants are viewed.

FIG. 25 illustrates a screen shot of an edit-grant screen where grants are viewed.

FIG. 26 illustrates a screen shot of a template screen.

FIG. 27 illustrates a screen shot of an edit-template screen.

FIG. 28 illustrates a screen shot of a logout screen.

FIG. 29 illustrates a screen shot of a grantor user screen.

FIG. 30 illustrates a screen shot of a grant-report screen for viewing grants.

FIG. 31 illustrates a screen shot of a view/edit organizations screen.

FIG. 32 illustrates a screen shot of a view/edit organizations screen showing information for a particular grantee organization.

FIG. 33 illustrates a screen shot of an internal-report screen.

FIG. 34 illustrates a screen shot of a view-report-in-PDF-format screen.

FIG. 35 illustrates a screen shot of a view-analysis screen.

FIG. 36 illustrates a screen shot of a view-edit-template screen.

FIG. 37 illustrates a screen shot of an add-grant screen.

FIG. 38 illustrates a screen shot of a define-grant reports screen.

FIG. 39 illustrates a screen shot of a view-edit grants report screen.

FIG. 40 illustrates a screen shot of a view-analysis screen.

FIG. 41 illustrates a screen shot of a view-analysis screen.

DETAILED DESCRIPTION

Figure 1:
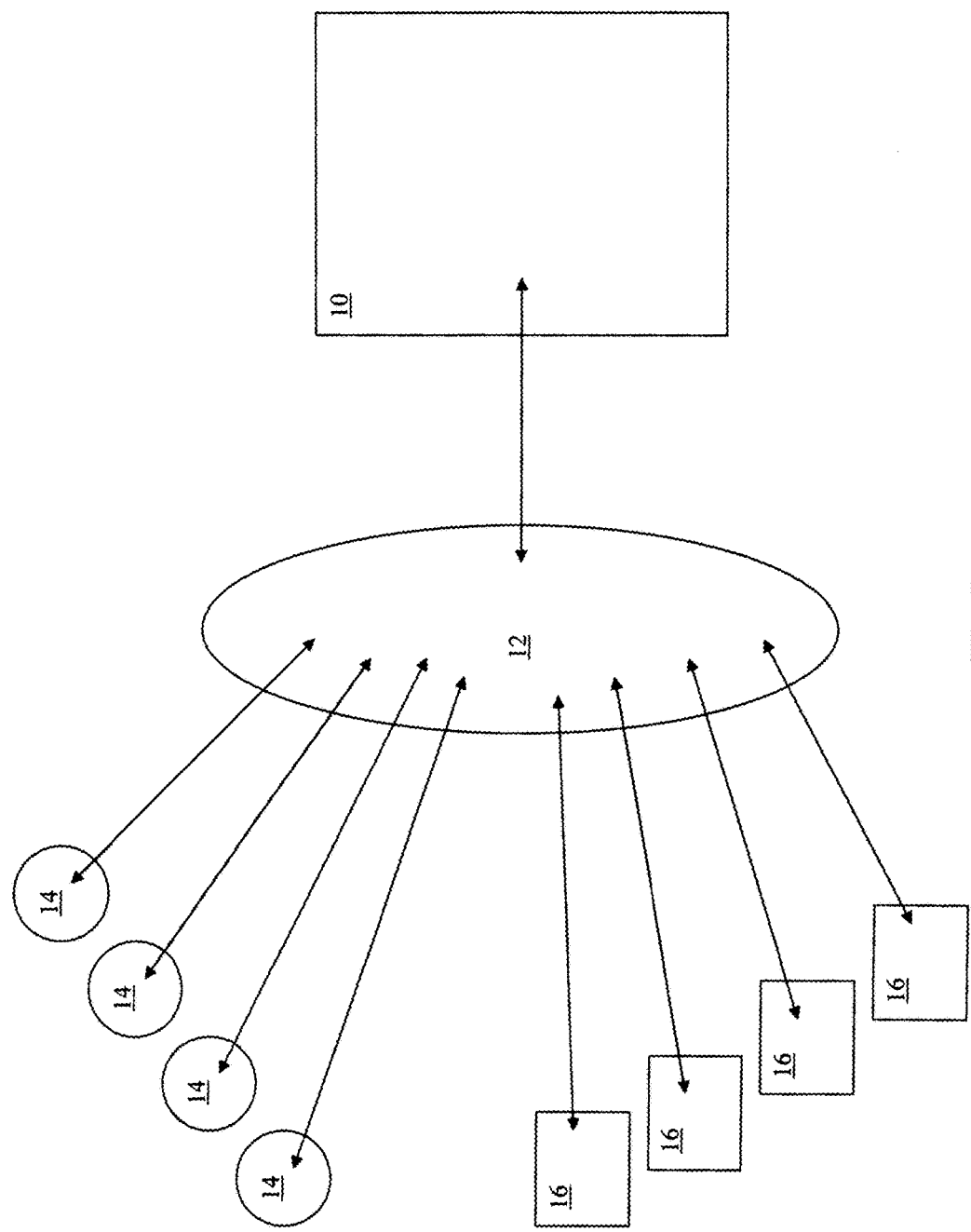
FIG. 1 illustrates a block diagram of a system for information transfer between organizations.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The grant administration system is a customizable online reporting and proposal tool which allows foundations to ask questions unique to their reporting processes. It also identifies common information (contact information, financials, etc.) so that information only has to be entered once by the nonprofit organization, regardless of the number of proposals and reports it submits, thereby reducing the burden of preparing these repetitive reports. Resources not devoted to grants administration can then be redirected toward programming, ultimately increasing both the nonprofit's and the foundation's social impact.

The grant administration system includes a software tool that facilitates the requesting, provision, and sharing of information between two or more parties. The system allows for a "many-to-many relationship," wherein multiple grantor organizations and multiple grantee organizations can communicate with each other.

The grant administration system includes a database that allows for reuse of previously-entered information. Grant administration primarily centers on preparing proposals and reports about the grant as well as tracking information about the grant. The reports are typically submitted on a regular basis, such as quarterly. Generally the questions and answers to these proposals and reports are repetitive. The grant administration system allows grantee users to reuse a portion or of all of an answer to a previously answered question that is the same as or similar to the currently presented question. This preferably is done for any question having relatively complex information, such as a prose discussion of goals or accomplishments in a reporting period or budget information. Some simple fields may be pre-populated without being linked to similar questions, such as a date of a questionnaire or the name and address of a grantee. It therefore reduces the burden on the grantee user of preparing these proposals and reports by being able to reuse responses to previously answered questions that are similar to questions in the report they are preparing. The same or similar questions stored in the database are identified by a database operator using tags. Alternately, grantees may be given access to add questions, search for and identify similar questions, and link similar questions similarly to the way a database operator would. The answers to these questions are linked respectively with the tagged questions and can be accessed by a grantee for reuse in completing reports to grantors. Alternately, users may be given an interface to update the database with links among similar questions. The database preferably may be updated in near real time so that answers may be added to the database before a grantee actually completes and submits a questionnaire to a grantor. Answers and links may be stored in other manner than a centralized database, such as in storage capacity at the grantee or grantor location or in an XML file.

The grant administration system includes a grantee module where grantee organizations can view and manage grants made by grantor organizations. The grant administration system includes a grantor module where grantor organizations can view and manage grants made to grantee organizations.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer may have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP).

One or more of the application programs may be installed on the internal or external storage of the general-purpose computer. Alternatively, in another implementation, application programs may be externally stored in and/or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link may include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage medium. A removable storage medium can include a floppy disk, magnetic tape, optical disk, etc., which can be removed from the storage drive used to perform read and write operations. As will be appreciated, the removable storage medium can include computer software and/or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between computer system and external devices. Examples of communications interfaces can include a modem, a network interface, (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in the main memory and/or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software may be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

In another embodiment, the computer-based methods can be accessed or implemented over the World Wide Web by providing access via a Web page to the methods described herein. Accordingly, the Web page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol (HTTP)). The selected page is then displayed to the user on the client's display screen. The client may then cause the server containing a computer program to launch an application to, for example, perform an analysis according to the described techniques. In another implementation, the server may download an application to be run on the client to perform an analysis according to the described techniques.

Referring to the figures by characters of reference, FIG. 1 illustrates a block diagram of a system 10 for information transfer between organizations. System 10 is a computer system configured to support software for communication through computer network 12. System 10 is in communication through a computer network 12 with a plurality of grantee organizations 14 and grantor organizations 16. Grantee organizations 14 are non-profit organizations that are seeking funding from grantor organizations 16. Grantor organizations 16 are foundations that are seeking to fund grantee organizations 14. System 10 facilitates the communication of information between grantee organizations 14 and grantor organizations 16 to reduce the time, cost, and burden of administering grants made by one or more grantor organizations 16 to one or more grantee organizations 16. System 10 is an internet based system accessible through interactive web pages. For example, system 10 may include a server though some of the functions may be imbedded in other devices or applications, such as an XML parser or JAVA application. System 10 is configured to enable multiple grantor organizations 16 to communicate with multiple grantee organizations 14.

Figure 2:
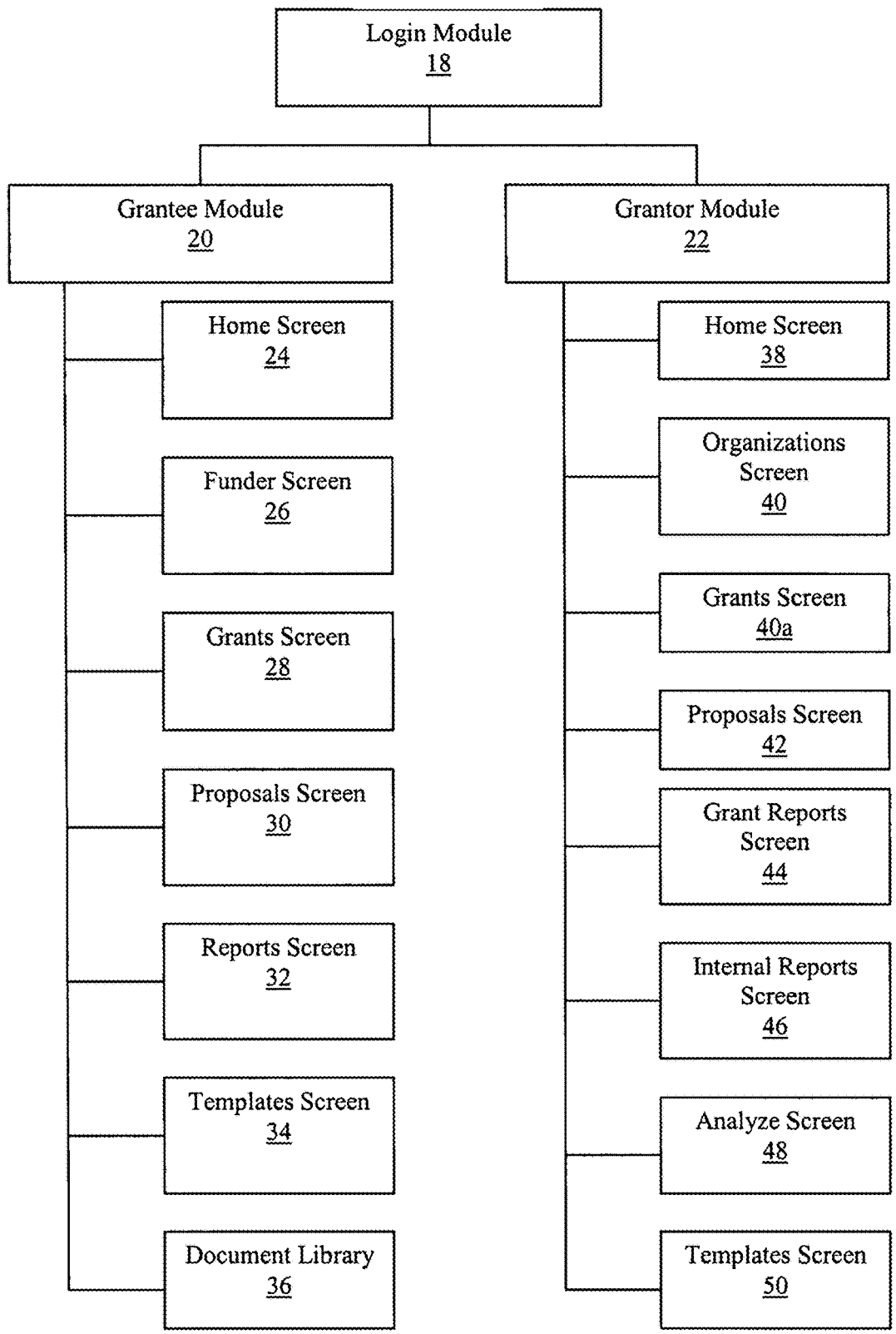
FIG. 2 illustrates an organizational diagram of a software system for information transfer between organizations.

System 10 includes a Graphical User Interface (GUI) (not shown) allowing the grantor or grantee users to access a login software module 18 that directs them respectively to a grantor software module 22 or a grantee software module 20 illustrated in FIG. 2. Login module 18 is a software routine that provides secure access to the grantor and grantee users. Login module 18 also distinguishes between grantor and grantee users and directs them to the appropriate grantee or grantor module 20 or 22. Grantee module 20 is a software module that supports the use and preparation of grant administration proposals and reports by a grantee organization 14. Grantor module 22 is a software module that supports the use and preparation of grant administration proposals and reports by a grantor organization. System 10 also includes a database 310, illustrated in FIG. 42, operatively connected to login module 18, grantor module 20, grantee module 22 and GUI 11. Grantee module 20 and grantor module 22 support the preparation and usage of computerized questionnaires by grantee and grantor users that grantee and grantor organizations 14 and 16 use for grant administration proposals and reports.

FIG. 2 illustrates an organizational diagram of software on system 10 for information transfer between organizations. System 10 supports internet Web page based software for facilitating communications and information transfer between grantor organizations 16 and grantee organizations 14. The software for system 10 includes a login module 18 where a user from either a grantor organization 16 or a grantee organization 14 would login through internet 12. Login module 18 would recognize whether the user attempting to login is user from a grantee organization 14 or a grantor organization 16. Based upon this user recognition, login module 18 would direct the user to a grantee module 20 for grantee organization 14 users, or a grantor module 22 for grantor organization 16 users.

Grantee Module 20 includes a home screen 24, a funder screen 26, a grants screen 28, a proposals screen 30, a reports screen 32, a templates screen 34, and a document library 36. Home screen 24 provides a grantee user an overview of grant information. Funder screen 26 allows the grantee user to view and manage grantor organizations 16, which are also referred to as "Funders." Grants screen 28 allows the grantee user to view and manage grant information. Proposals screen 30 allows a grantee user to generate a grant proposal to submit to a grantor organization 16. Reports screen 32 allows the grantee user to view and manage reports that are completed and sent to grantor organizations 16. Templates screen 34 allows the grantee user to create various documents, such as grant reports or grant proposals, from pre-made templates. Document library 36 stores documents created by the grantee user as well as documents sent to the grantee user by grantor organization 16. Grantee module 20 and the software that supports screens 24, 26, 28, 30, 32, 34 and 36 enable the grantee user to prepare and use computerized questionnaires that are the proposals and reports for the grantee organizations' 14 grant administration requirements.

Grantor module 22 includes a home screen 38, an organizations screen 40, a proposals screen 42, a grant-reports screen 44, an internal reports screen 46, an analyze screen 48, and a templates screen 50. Home screen 38 provides a grantor user with an overview of the grants and grantee organizations 14 that the grantor user is funding and considering funding. Organizations screen 40 provides the grantor user with an overview and the ability to manage grantee organizations 14 that it is funding. Proposals screen 42 provides the grantor user the ability to view and manage proposals it has received from grantee and prospective grantee 14. Grant reports screen 44 provides the grantor user with the ability to view and manage grants that grantor organization 16 has made. Internal reports screen 46 provides the grantor user with the ability to generate and view internal reports regarding grants and grantee organizations 14 that it funds. Analyze screen 48 provides an analysis tool for the grantor user to financially analyze its grants portfolio. Templates screen 50, illustrated in FIG. 36, provides the grantor user with the ability to create various documents, such as grant reports, from pre-made templates. Grantor module 22 and the software that supports screens 38, 40, 42, 44, 46, 48 and 50 enable the grantor user to prepare and use computerized questionnaires that are the proposals and reports for the grantor organizations' 16 grant administration requirements.

Figure 3A:
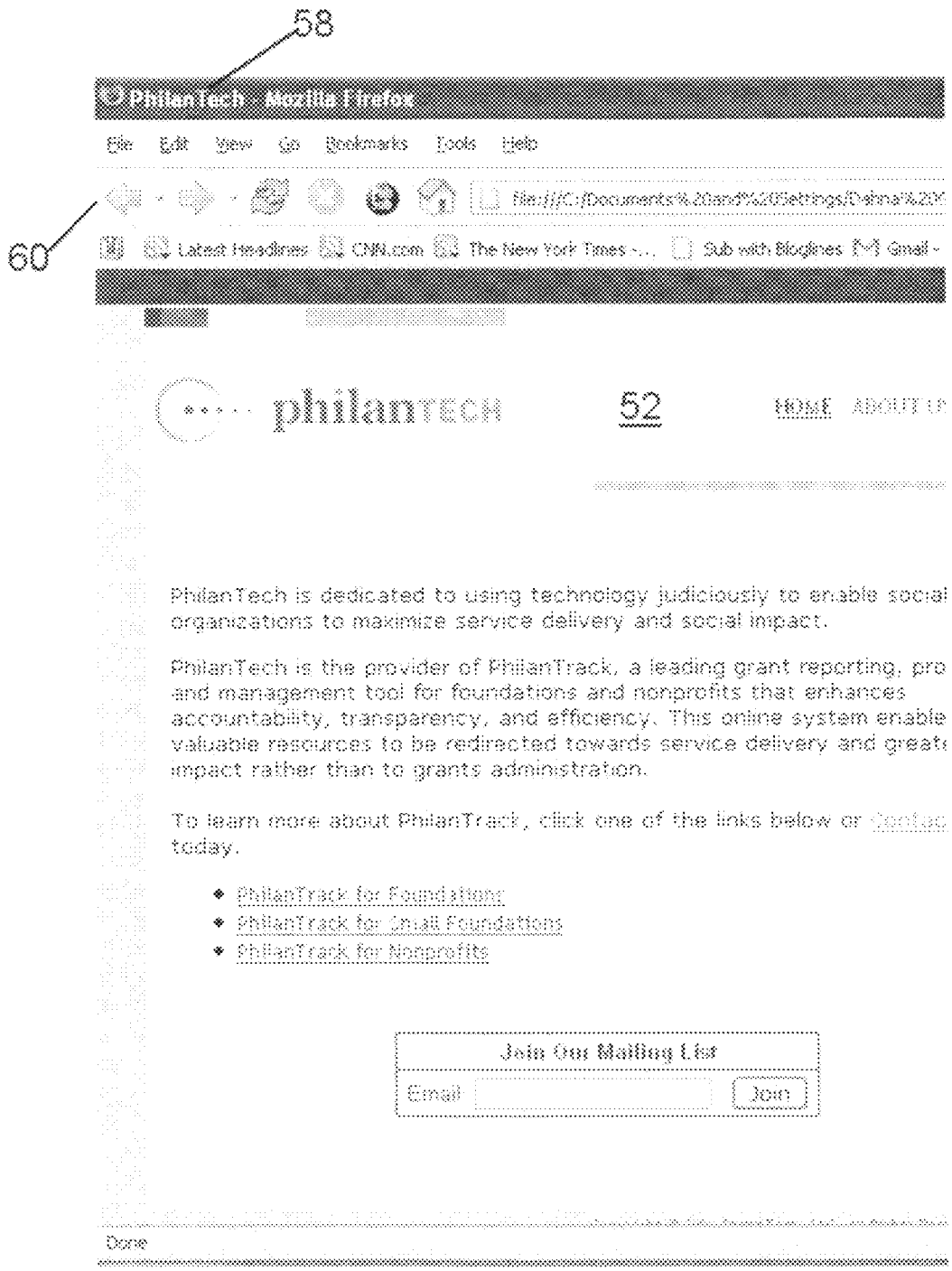
FIG. 3 illustrates a screen shot of a login screen.
Figure 3B:
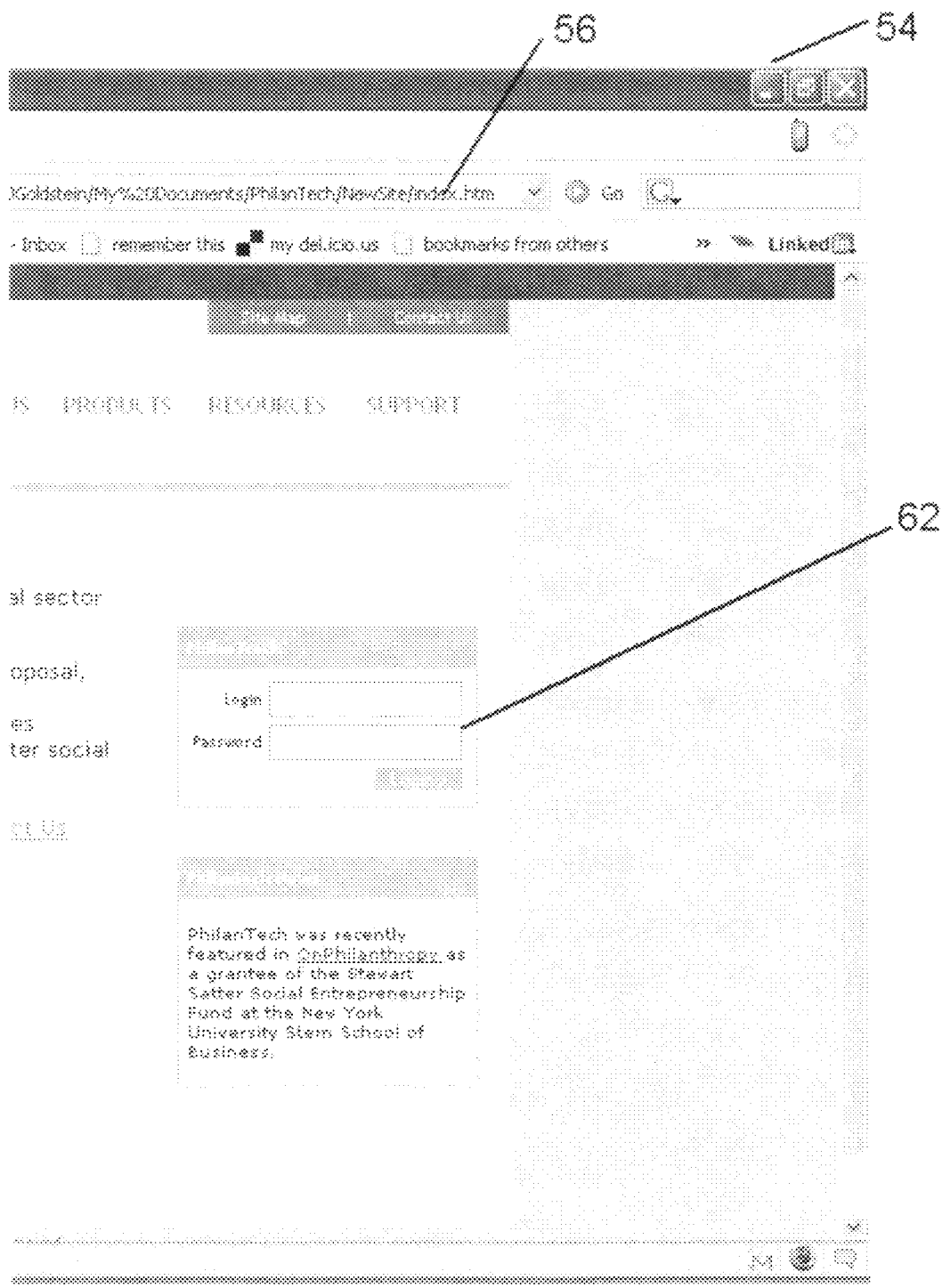

FIG. 3 illustrates a screen shot of a login screen 52 supported by login module 18. Login screen 52 is viewed through a conventional internet browser 54 that includes a box 56 for entering a URL, a series of menus 58 for managing the internet browser 54, and a plurality of graphical icons 60 for controlling internet browser 54. Users enter their login name and password in login box 62. Once the user enters this information, the user clicks on the login button at the base of login box 62. Login module 18 distinguishes between grantee/non-profit users and grantor/foundation users according to login name or other authentication method and directs the user to the appropriate home page 24 or 38. Grantees are directed to grantee screen 24, illustrated in FIG. 4. Grantors are directed to grantor screen 38, illustrated in FIG. 29.

FIGS. 4-28 illustrate screen shots of software screens for a grantee organization 14 accessible through grantee module 20 to grantee users.

Figure 4A:
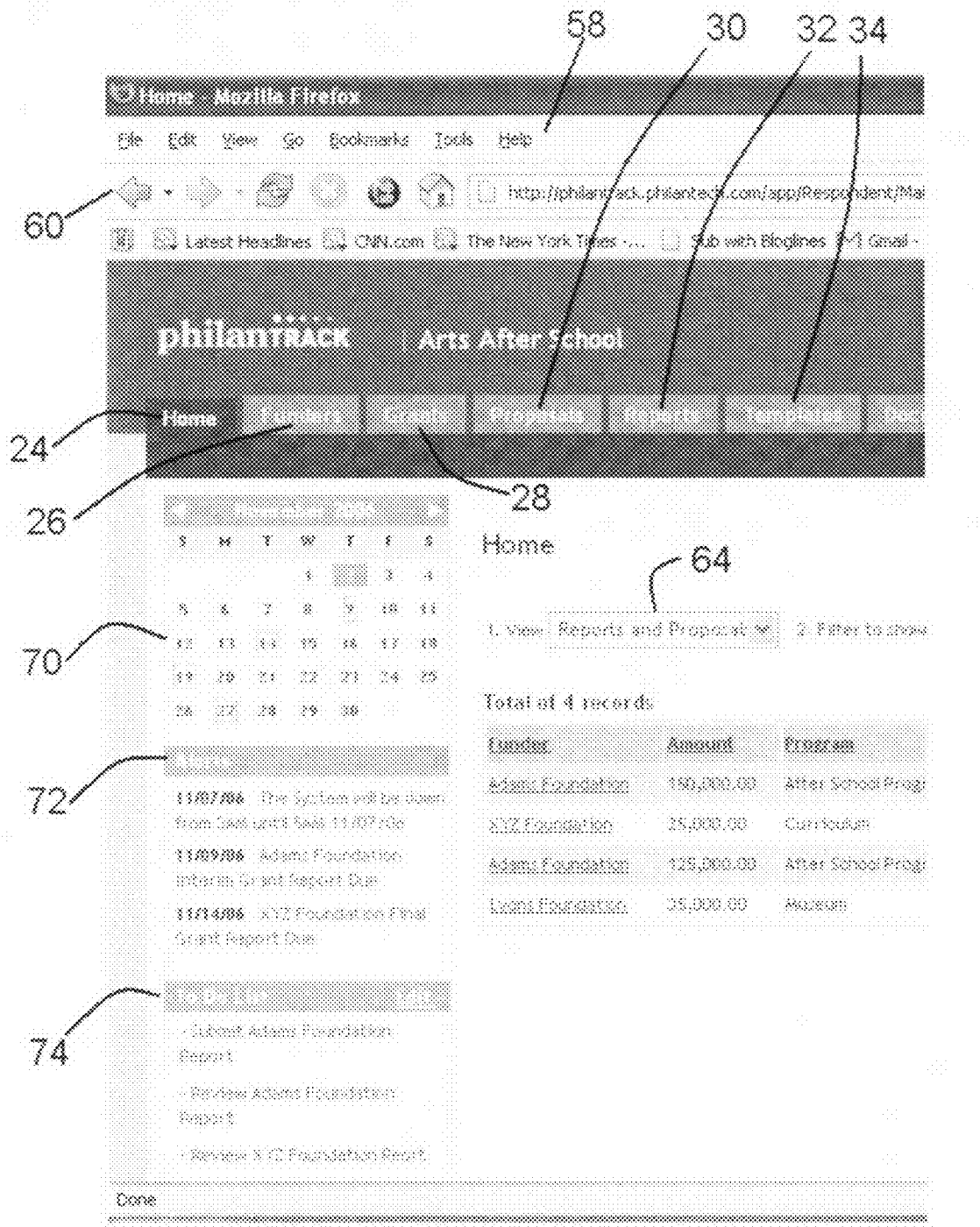

FIG. 4 illustrates a screen shot of a grantee-home screen 24. Grantee-home screen 24 includes graphical tabs enabling the grantee user to access funder screen 26, grants screen 28, proposals screen 30, reports screen 32, templates screen 34, and document library 36. Grantee home screen 24 allows a grantee user to view and manage grants received by grantor organizations 16. The grantee user may select questionnaire types to view with menu 64. The grantee user may select ranges of dates to filter the number of grants viewed with menu 66. Table 68 provides a listing of existing grants and grant information. The table of grant information 68 includes the name of the grantor organization 16, the amount of the grant, the name of the grant program, a listing of due dates and the type of due dates, such a grant reporting dates. Table 68 also includes links to proposals and reports to edit in compliance with the pending due dates. Grantee-home screen 24 also includes a calendar 70 having graphical icons showing pending due dates listed in table 68. Alert section 72 provides a listing of important due dates for the grantee user. Section 74 provides a user-editable 'to do' list for the grantee user.

FIG. 5 illustrates a screen shot of a calendar tool 70 on a grantee screen 24. Calendar tool 70 lists due dates from table 68 with graphical icons. Moving a screen pointing tool, such as a mouse icon, over the graphical icons in the calendar produces a message 76 that identifies what is due on that particular date.

Figure 5A:
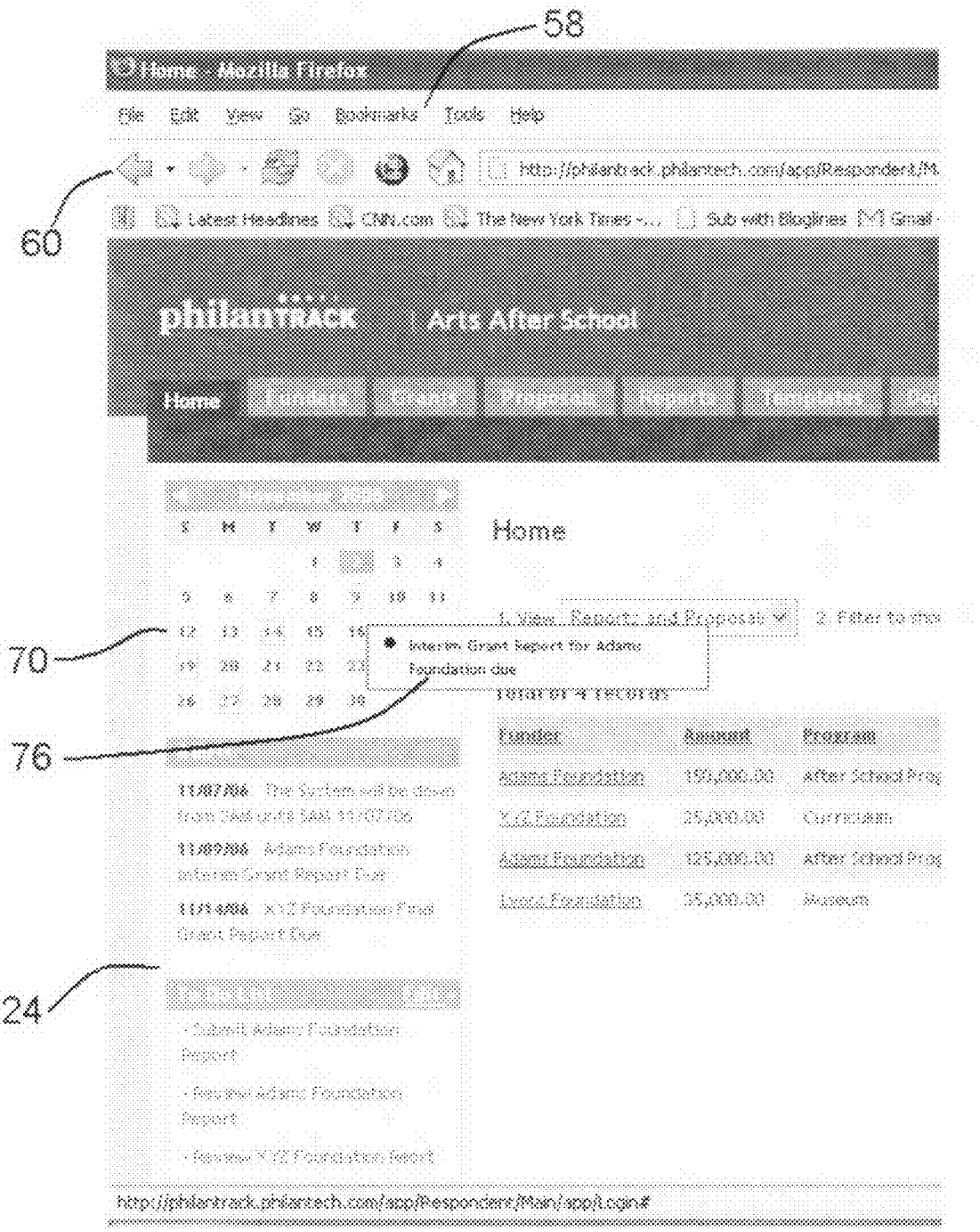
FIG. 5a illustrates a screen shot of a view all reports screen
Figure 5B:
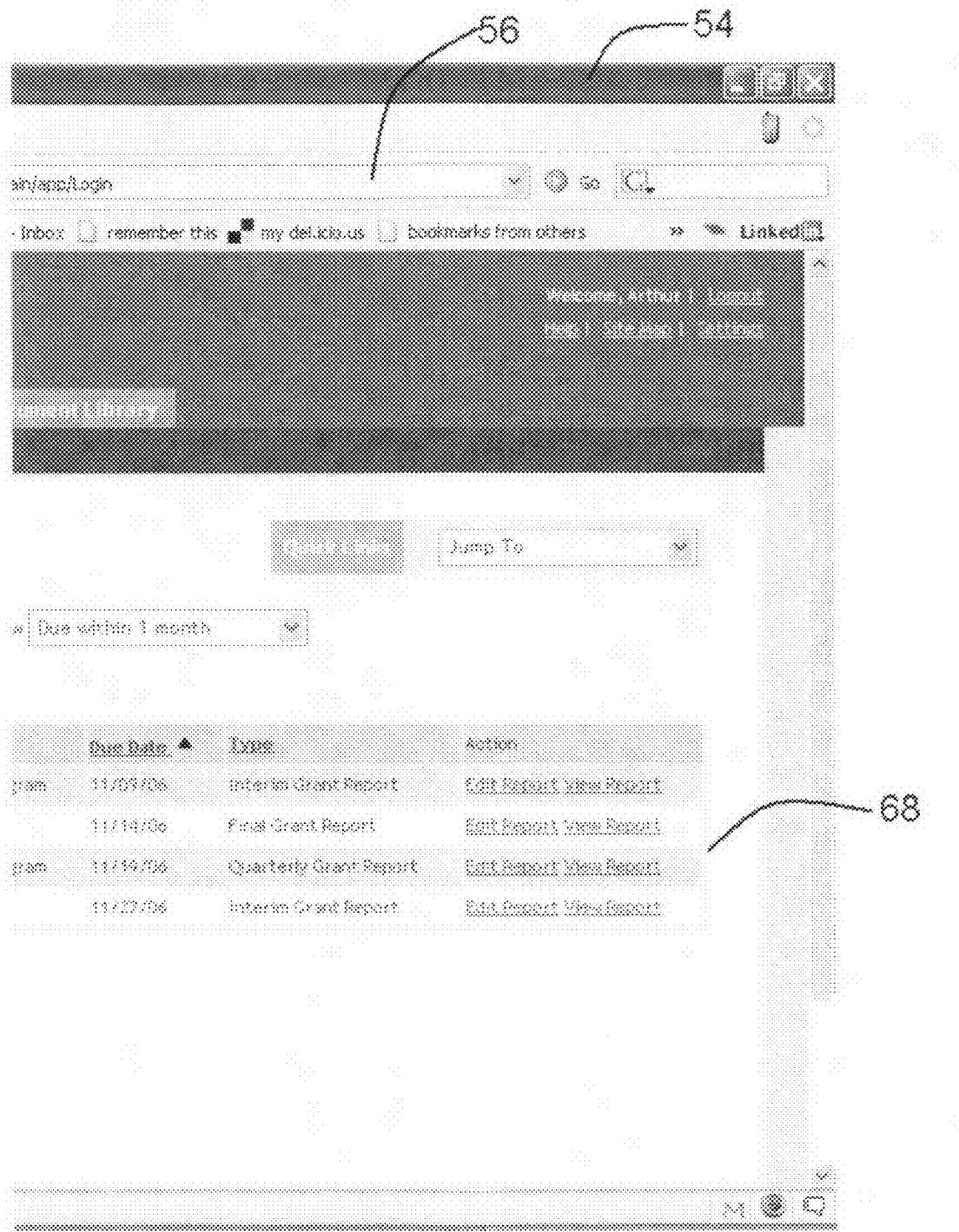
Figure 5A:
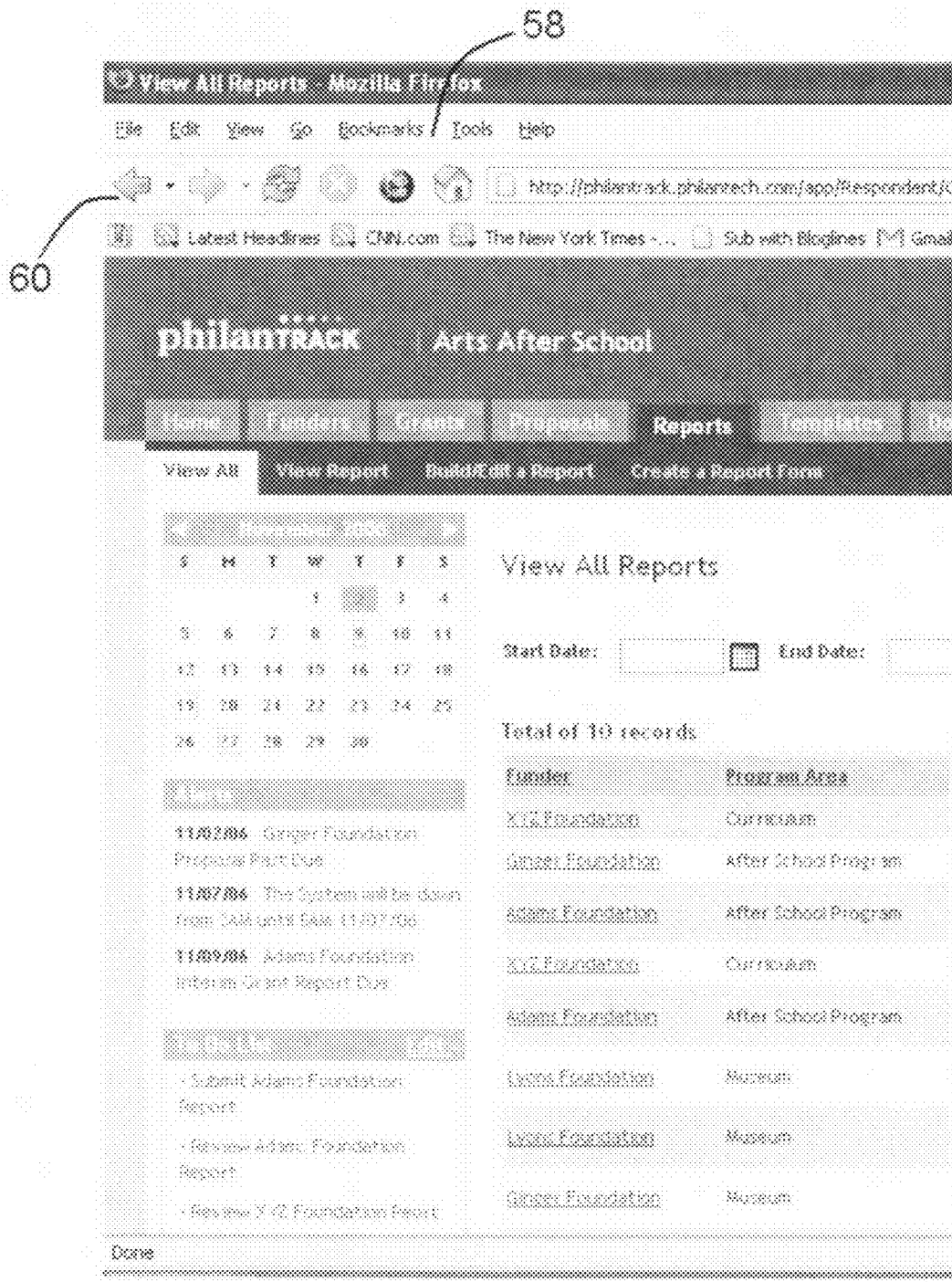
Figure 5A:
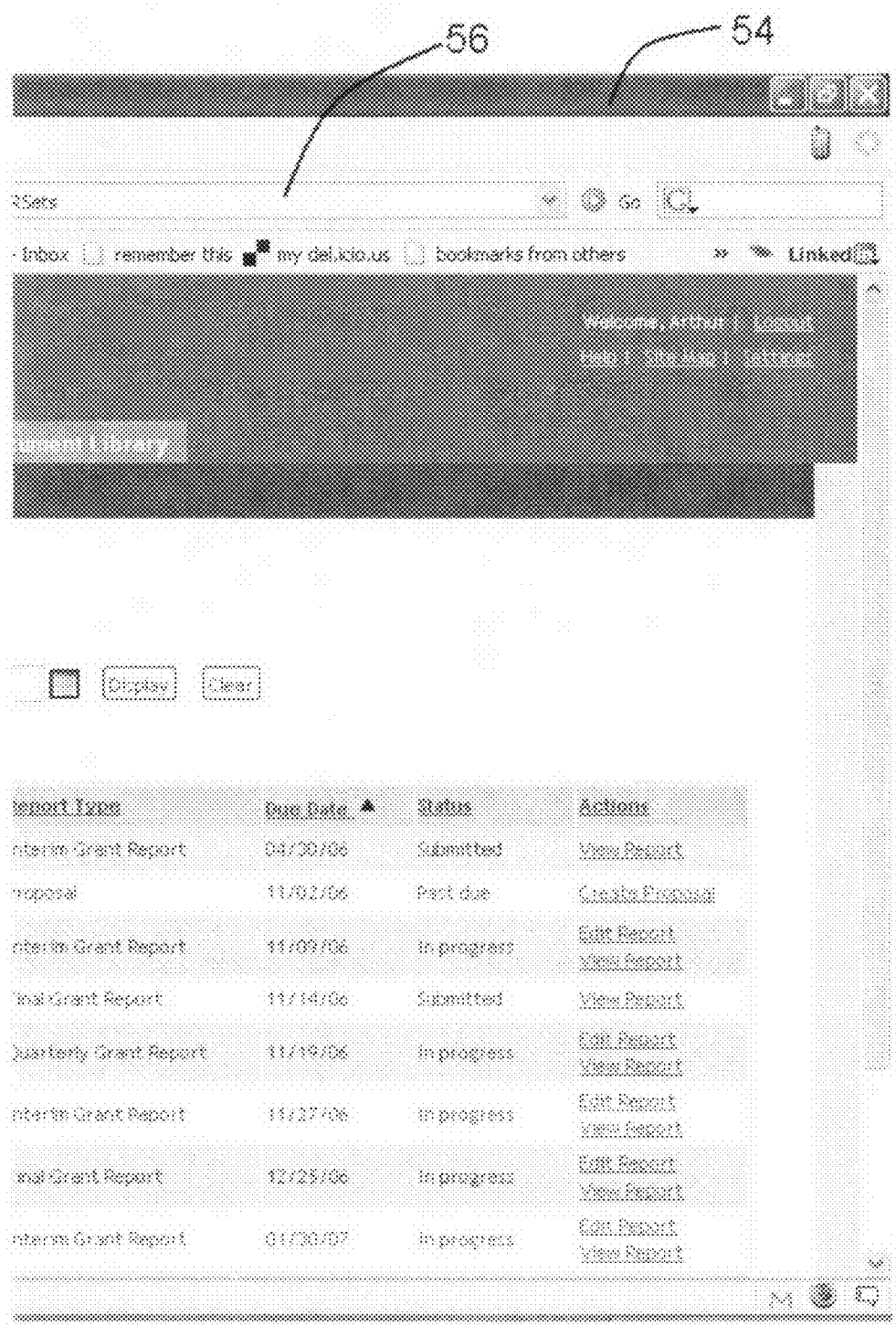

FIG. 5*a* illustrates a screen shot of a view all reports screen, where a grantee can view a list of reports that are due to funders with the name of the funder, the program area in which the grant is made, the type of report, the date due, the status of the report—submitted, past due, in progress—and actions that can be taken on the report—view, edit, create. The list of reports displayed on the screen can be narrowed with the start date and end date calendars.

Figure 6B:
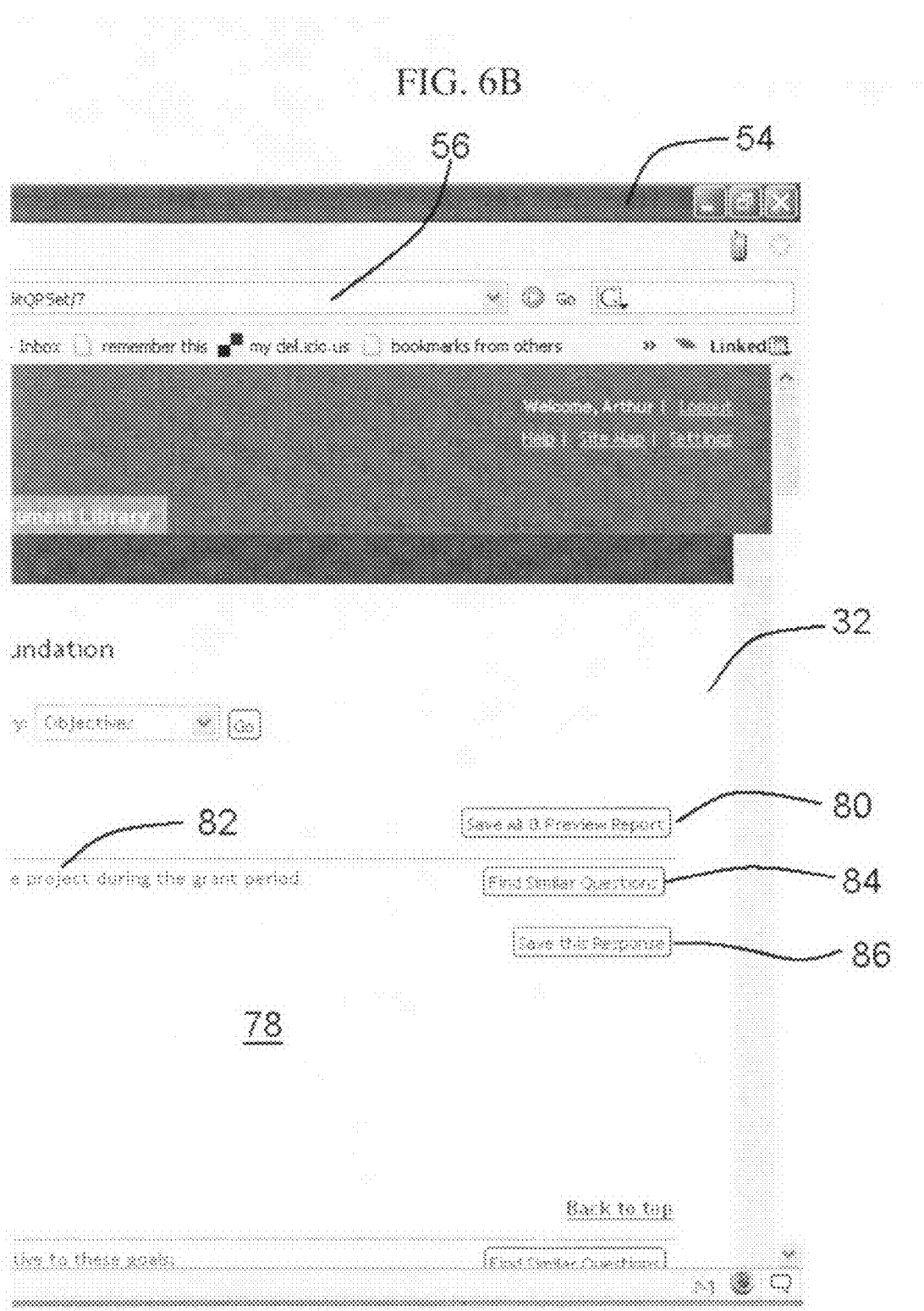

FIG. 6 illustrates a screen shot of an edit-report tool 78 on a report screen 32. The edit-report tool 78 provides the grantee user with the ability to complete a report for submission to the grantor organization 16. The report is an example of a computerized questionnaire, but questionnaires may take on other forms, such as unsolicited proposals, etc. The report includes a series of questions that the grantee user may answer by either typing in information in a text box, selecting an answer from a drop down menu, adding a document externally as an attachment, or another form of response. The report that the grantee user is editing could have been created in one of several ways. The grantor organization 16 may have created the report using templates screen 50. Alternatively, if the grantor organization 16 did not create a computer template for reporting on the grant, the grantee user could create a report template using templates screen 34. Edit-report tool 78 includes a button 80 for saving and previewing the report. The report includes a plurality of questions 82. Grantee organizations 14 that receive grants typically have to periodically report to the grantor organizations 16 on the status of the grant. These reports are typically repetitive and include the same or similar questions. Further, grants issued by different grantor organizations typically include reporting requirements that include the same or similar questions. To reduce the time spent on preparing these reports in compliance with the grant, system 10 includes a find-similar-questions button 84. By pressing find-similar-questions button 84, the grantee user accesses a database that stores all of the grantee user responses to reports. The database includes a listing of all questions answered by the grantee user. These questions are tagged such that similar questions are linked together. By pressing the find-similar-questions button 84, the user accesses the database and acquires a listing of all other similar questions answered by virtue of the tags. The answers to questions in each report are also linked in the database, typically to their associated question. The grantee user may therefore find the answers they previously used to answer similar questions by use of the find-similar-questions button 84. This option preferably is available for questions having relatively complex information, such as a prose discussion of goals or accomplishments in a reporting period or budget information. Some simple fields may be pre-populated without being linked to similar questions, such as a date of a questionnaire or the name and address of a grantee. Thus, grantee users can reduce the amount of time spent completing repetitive reports by using the find-similar-questions button 84 to reuse the answers to similar questions made in other reports. Button 86 allows the grantee user to save the response to the question 82. Text boxes 88 provide a space for the grantee user to answer question 82. The database preferably may be updated in near-real time so that answers may be added to the database before a grantee actually completes and submits a questionnaire to a grantor. Answers and links may be stored in other manner than a centralized database, such as in storage capacity at the grantee or grantor location or an XML file.

Figure 7B:
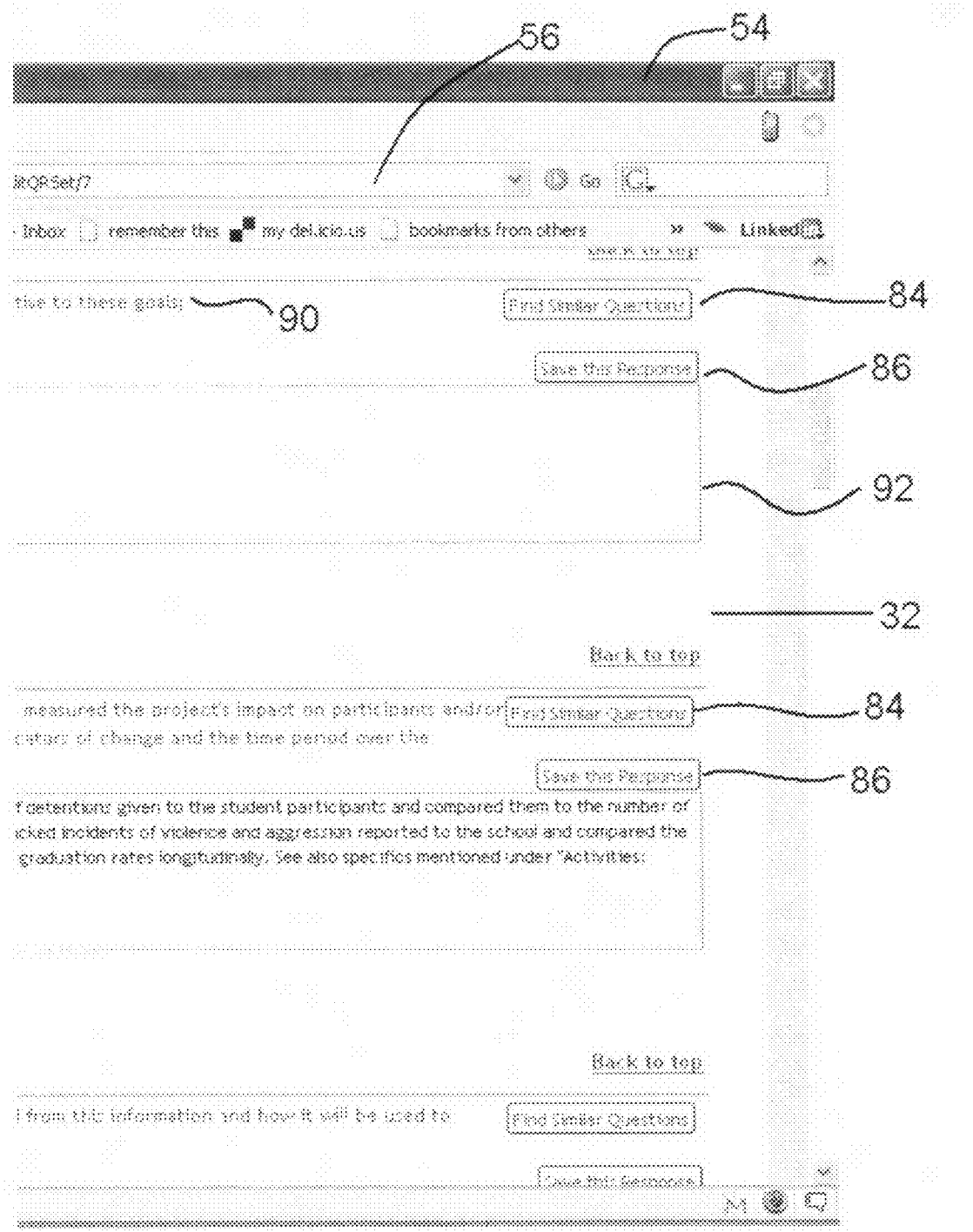
Figure 8B:
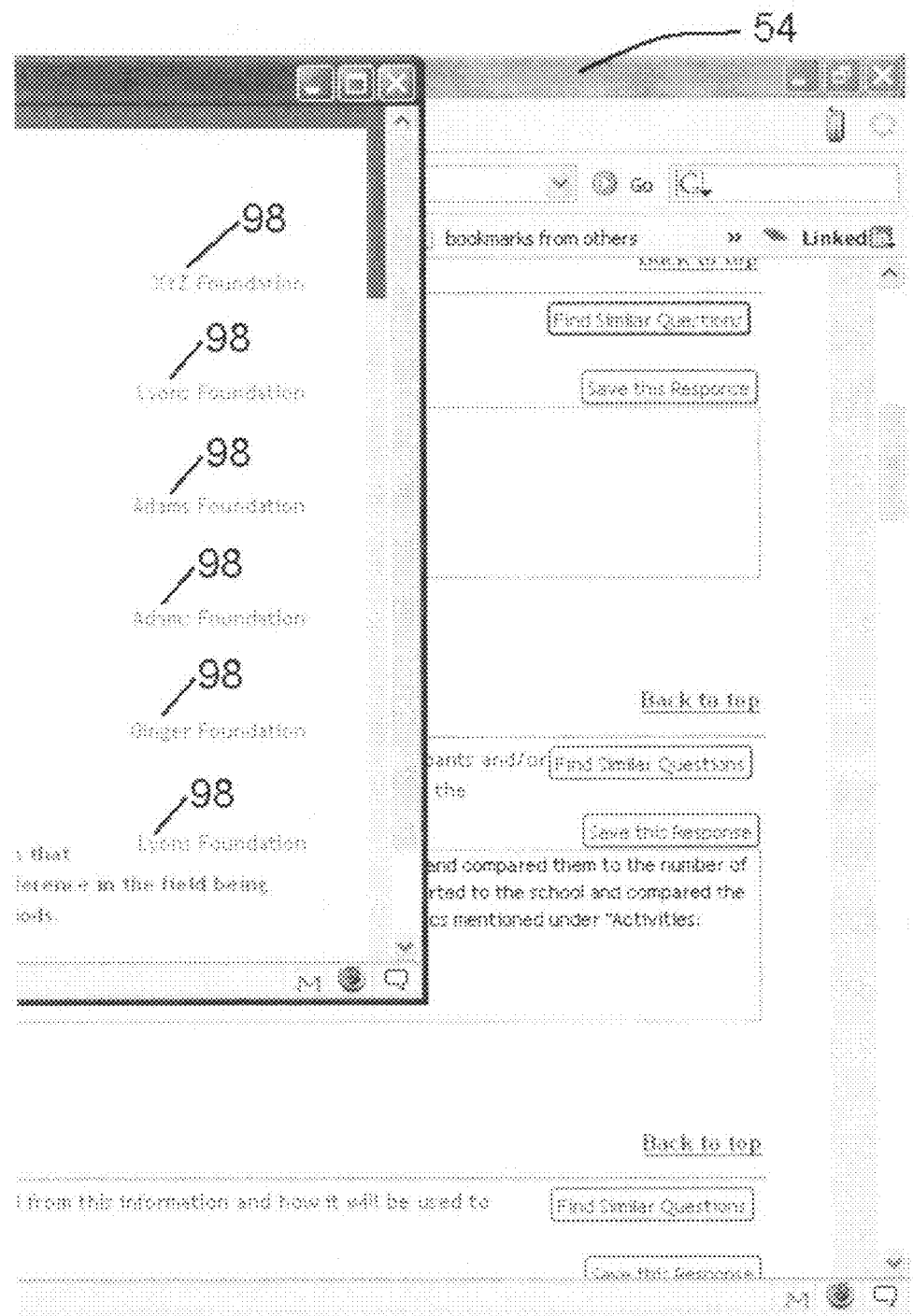

FIG. 7 illustrates a screen shot of an edit-report screen 32. Edit-report screen 32 includes a second question 90 having a text box 92 where the grantee user can type a response. By pressing the find-similar-questions button 84, the grantee user accesses the find-similar-questions screen 94 shown in FIG. 8. FIG. 8 illustrates a screen shot of a find-similar-questions screen 94. Find-similar-questions screen 94 lists the original question 96 and identifies an organization 98, which asked the question. Screen 94 also lists similar questions 100, identified as questions 102, 104 and 106. Screen 94 also lists the organizations 98 that asked these similar questions. Screen 94 then provides a link 108 to an answer to the similar question. By clicking this link 108, the grantee user may view the answer. Identifiers 110 inform the user when similar questions 104 and 106 remain unanswered.

Figure 9B:
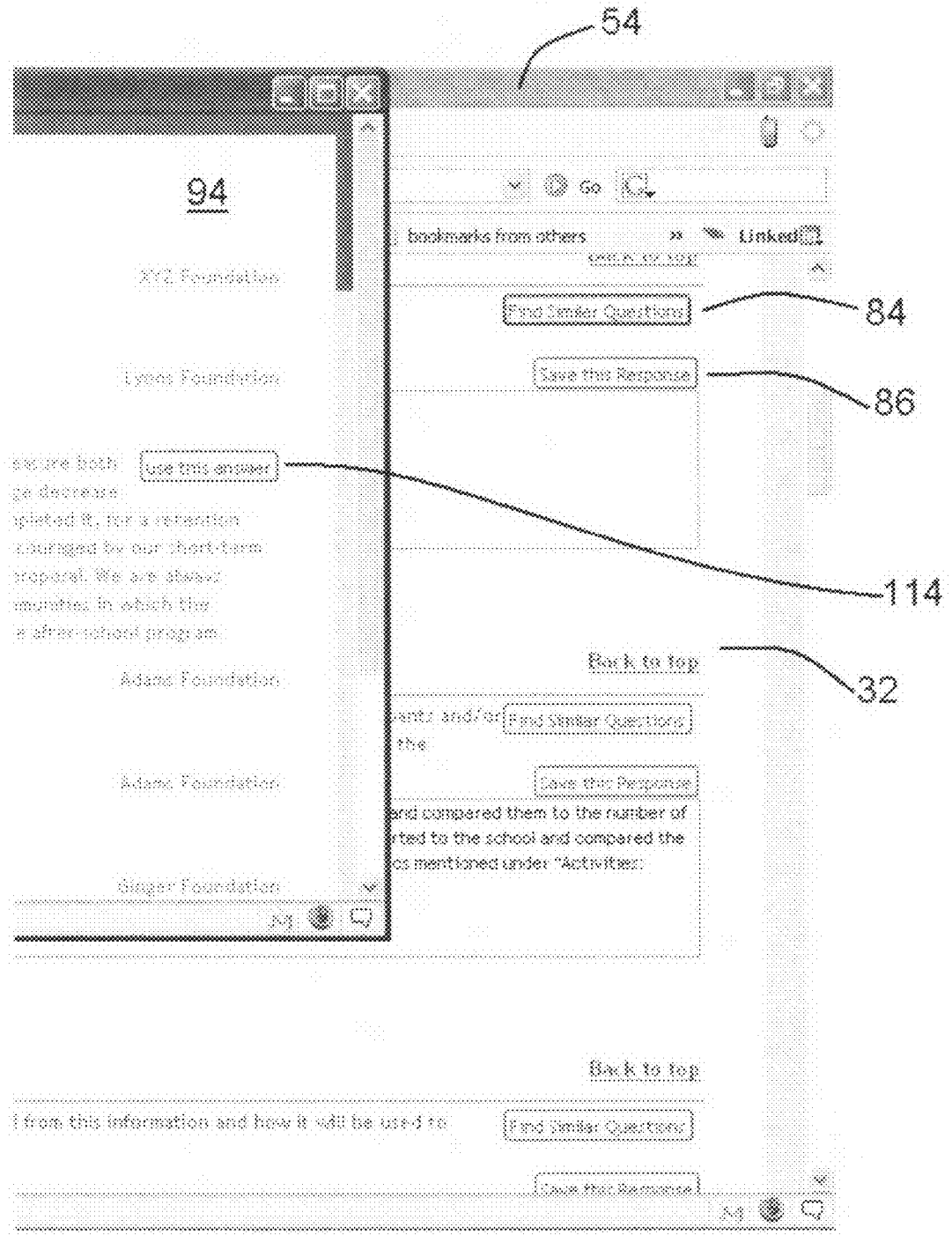

FIG. 9 illustrates a screen shot of a find-similar-questions screen 94 displaying a previous response acquired through link 108. By accessing link 108, the grantee user acquires answer 112 that the grantee user used to answer the previous similar question 100. The grantee user may then select the use-this-answer button 114 to use this previous answer as an answer to the original question 90 posed in the report.

Figure 10B:
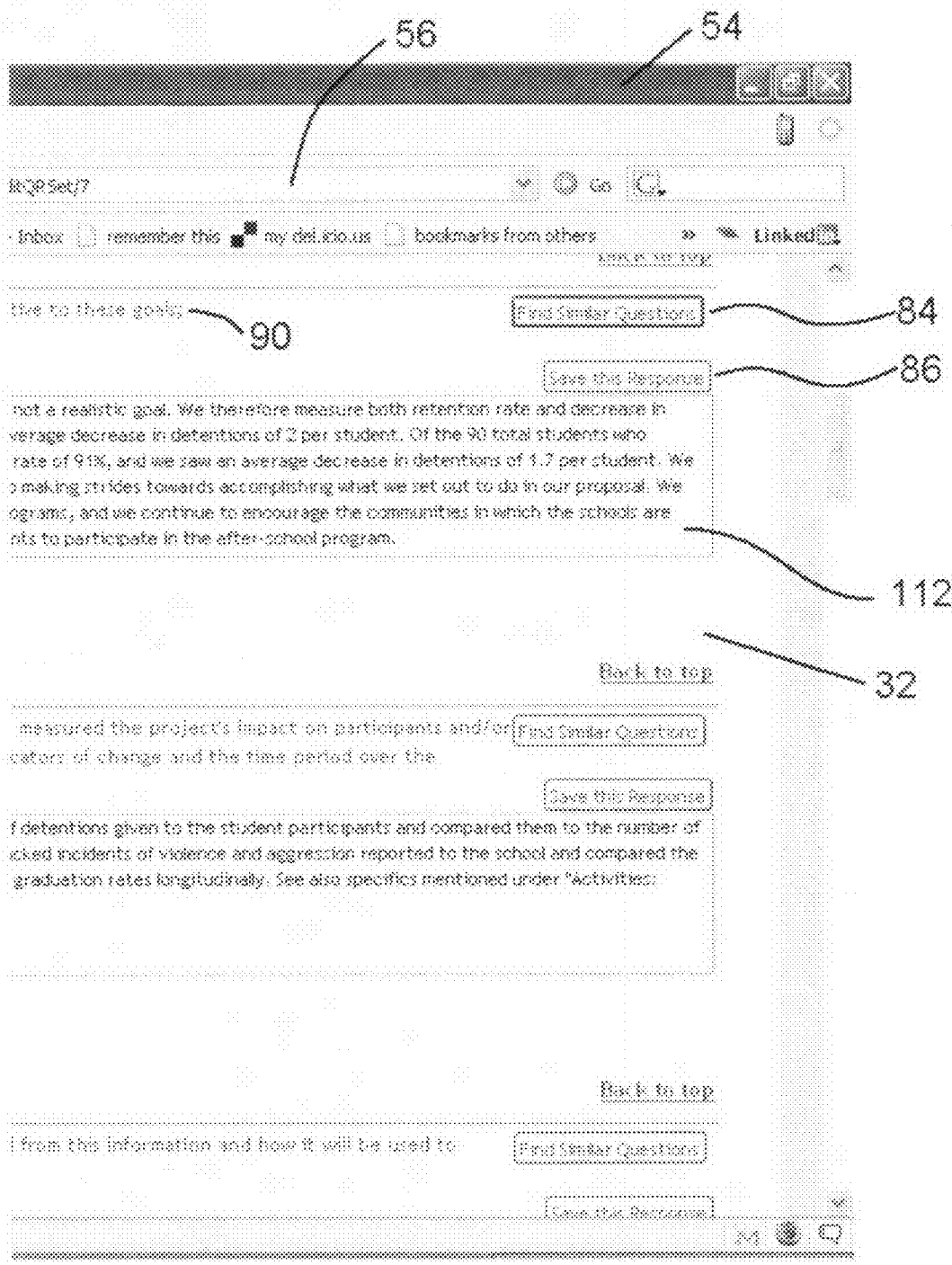

FIG. 10 illustrates a screen shot of an edit-report screen 32 populated with a previous response 112 selected from the find-similar-questions screen 94. By pressing the use-this-answer button 114, the grantee user populates text box 92 with previous answer 112. FIGS. 7 and 8 illustrate a find-similar-questions software routine for finding similar questions through the use of button 84 and screen 94. FIGS. 9 and 10 illustrate a use-this-answer software routine for using answers from previously answered similar questions.

Figure 11A:
Figure 11B:
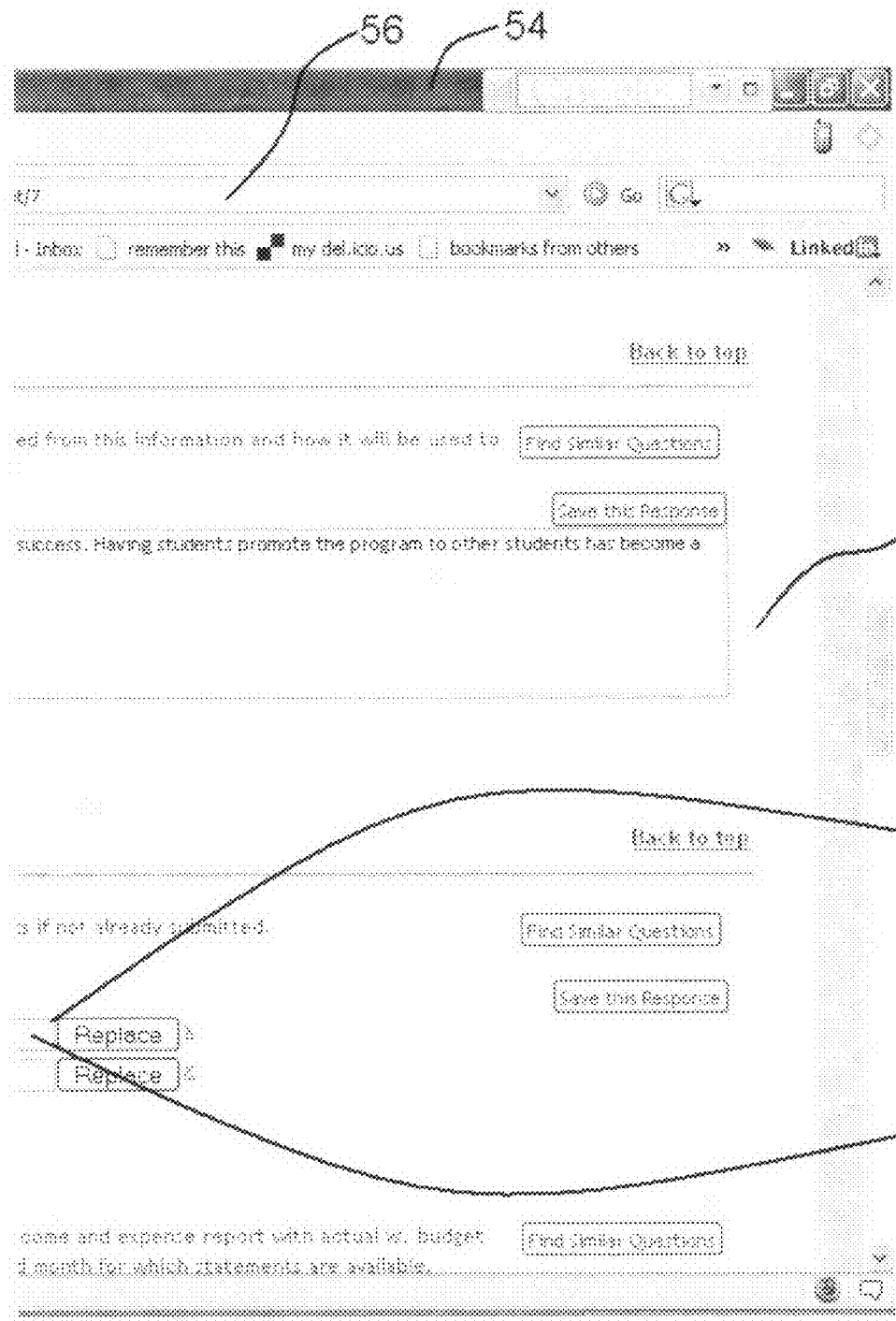

FIG. 11 illustrates a screen shot of an edit-report screen 32 having boxes 116 where external documents 118 may be attached to the report. These documents, by means of a non-limiting example, may include MS WORD documents, PDF files, and the like.

Figure 12A:
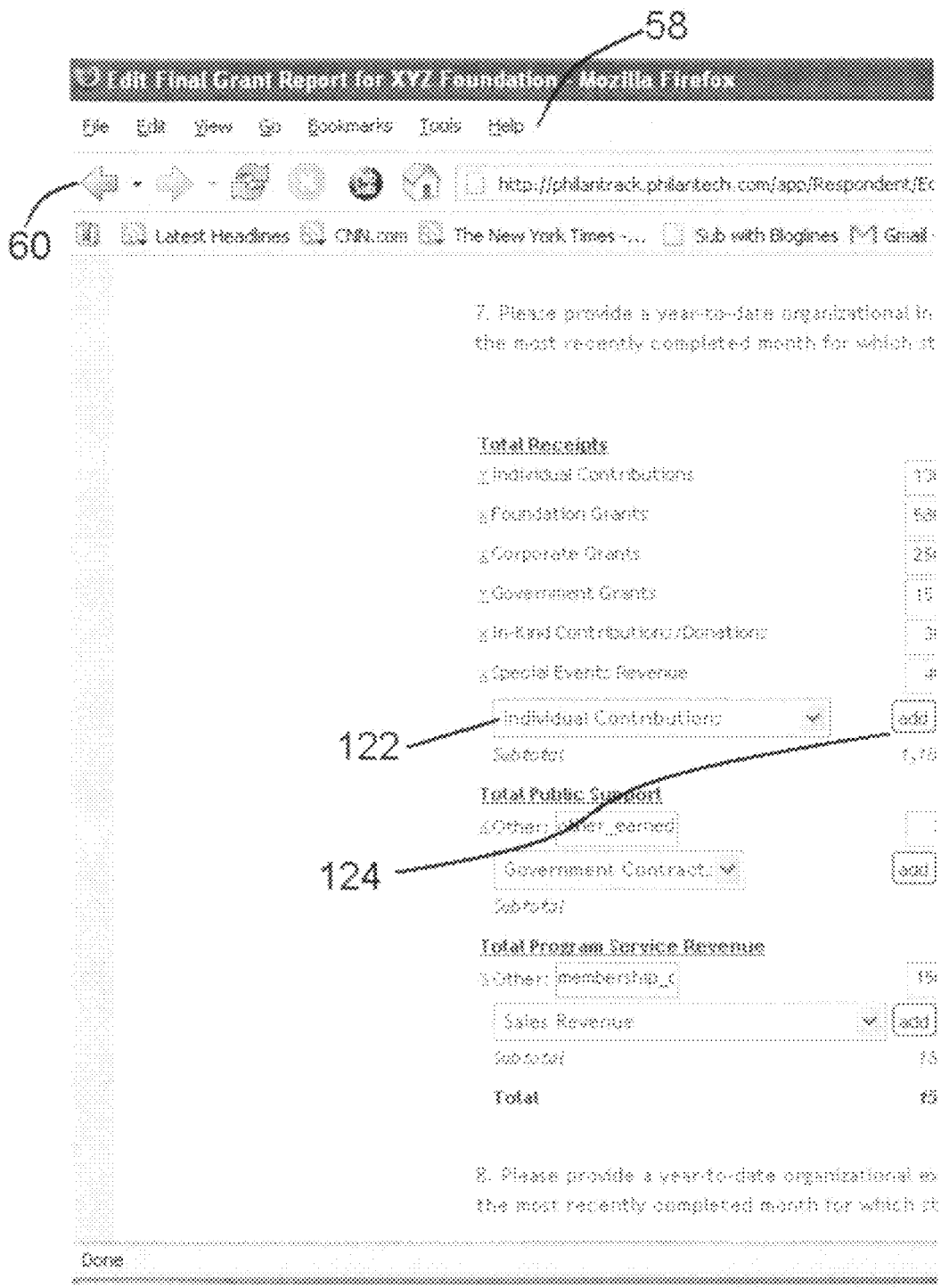
Figure 12A:
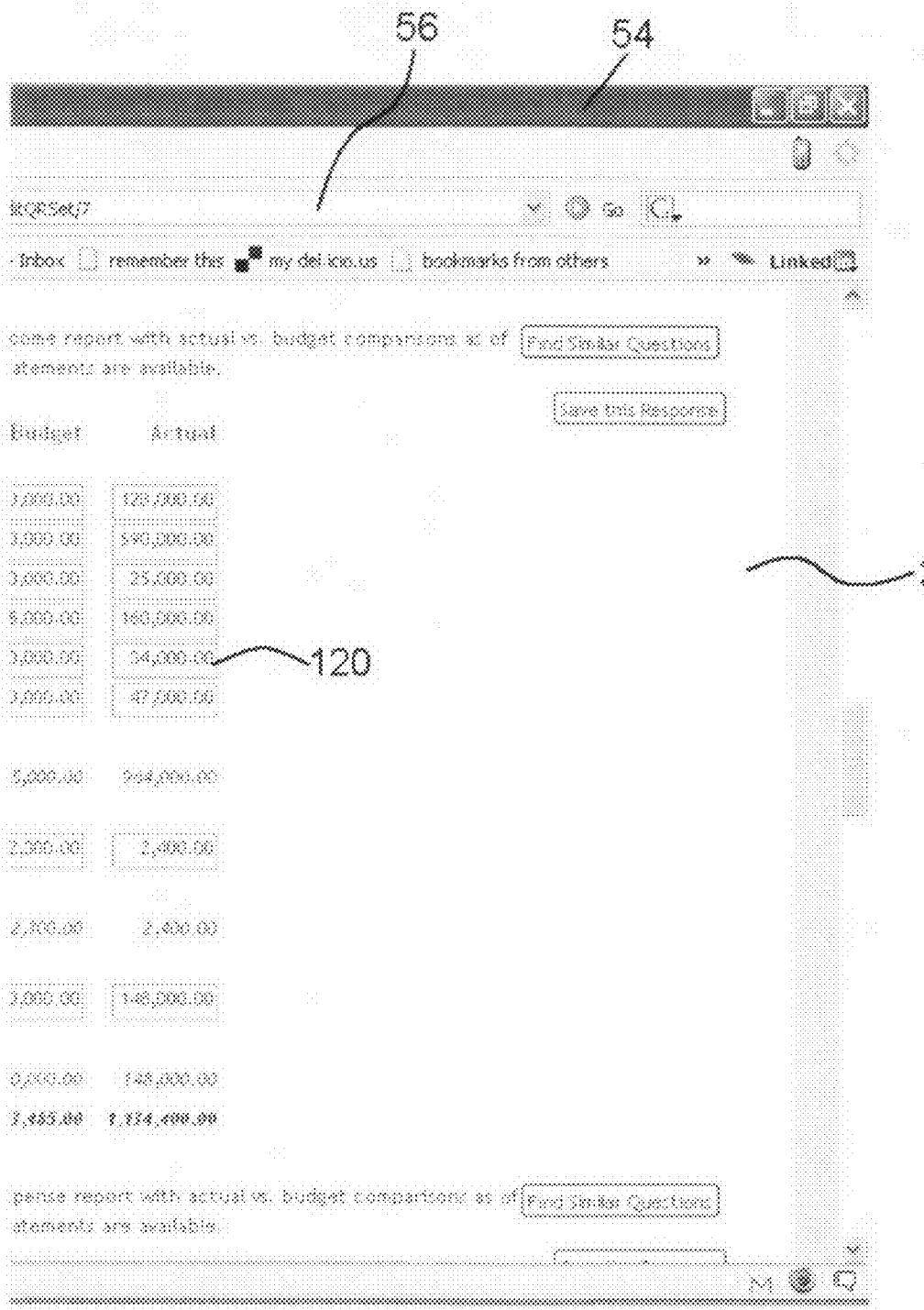

FIG. 12 illustrates a screen shot of an edit-report screen 32 where budgetary information 120 is provided. The report to the grantor organization 16 may include budgetary information 120 that is entered into text boxes by the grantee user. The grantee user may select additional text boxes to add to the budgetary information 120 from drop down menu 122. Button 124 allows the grantee user to add the item selected from menu 122 to the budgetary information 120.

Figure 13A:
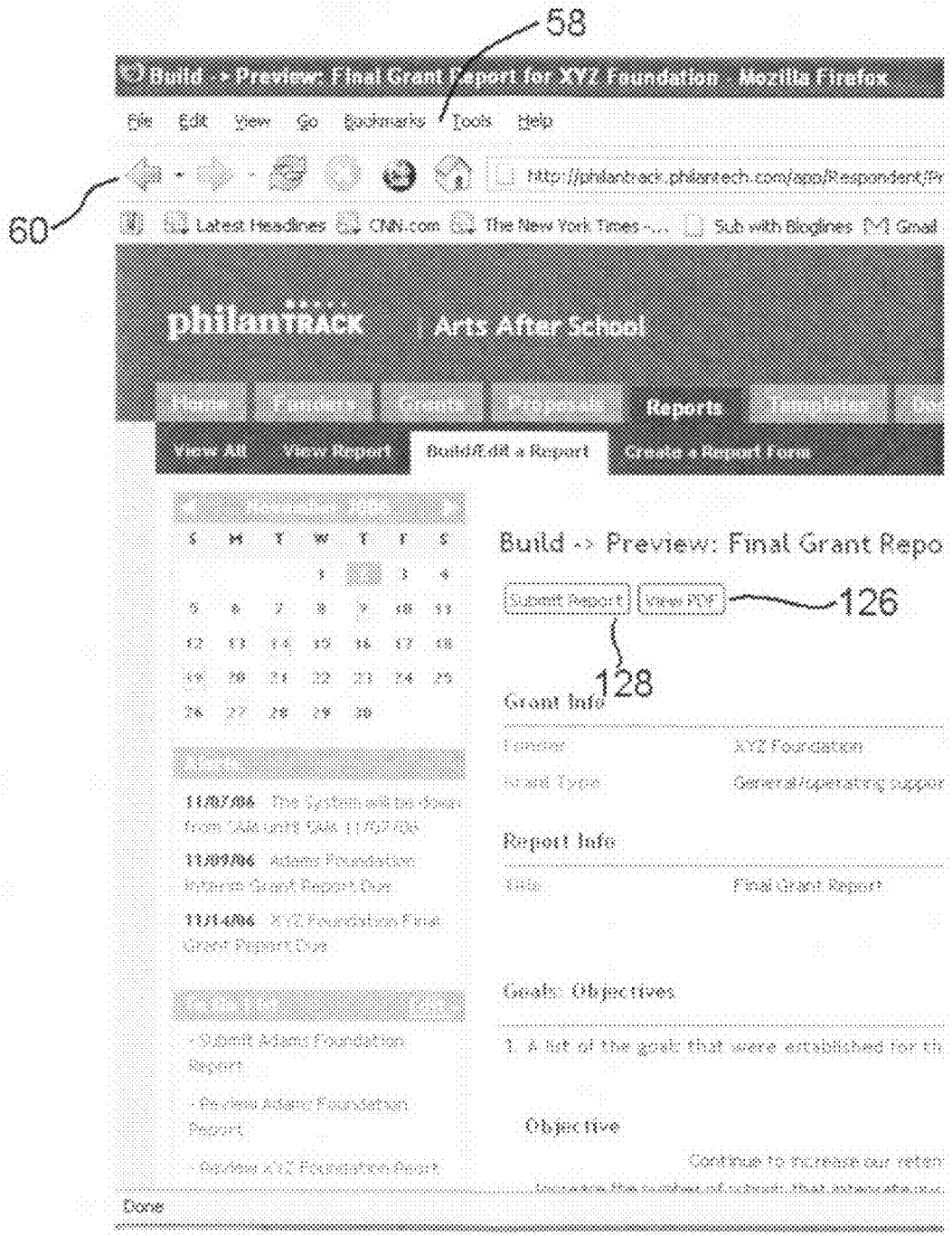
Figure 13B:
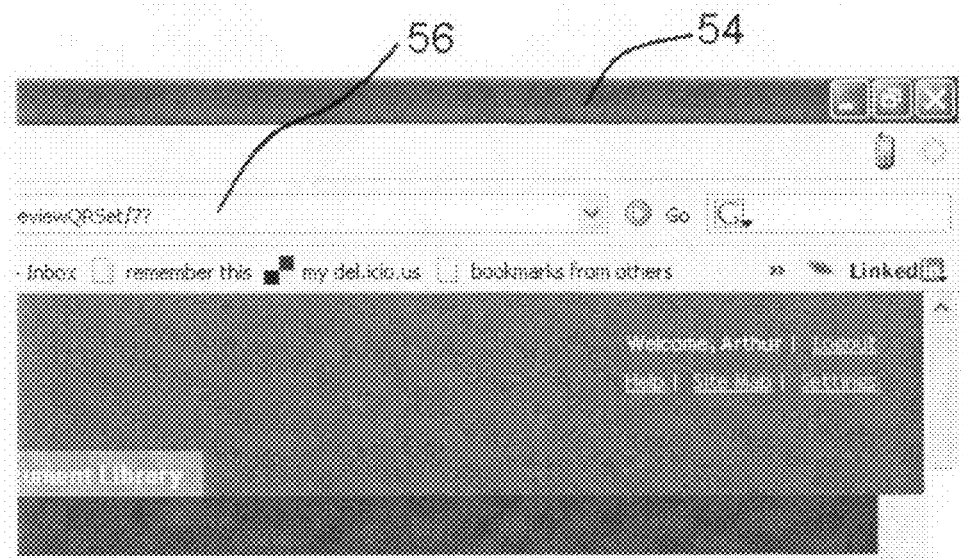
Figure 13B:
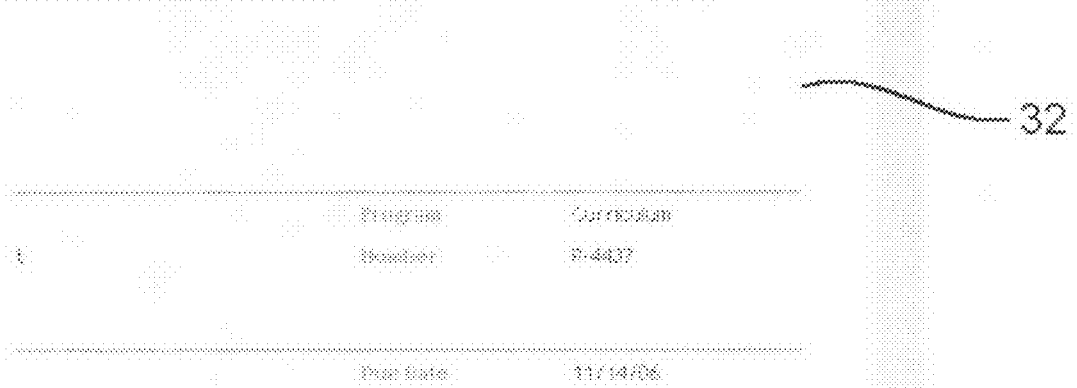

FIG. 13 illustrates a screen shot of an edit-report screen 32 where a grantee user may preview an edited report. The grantee user may view the edited report as a PDF or word processing file with button 126. The grantee user may submit the report through system 10 to the grantor organization 16 with button 128.

Figure 14A:
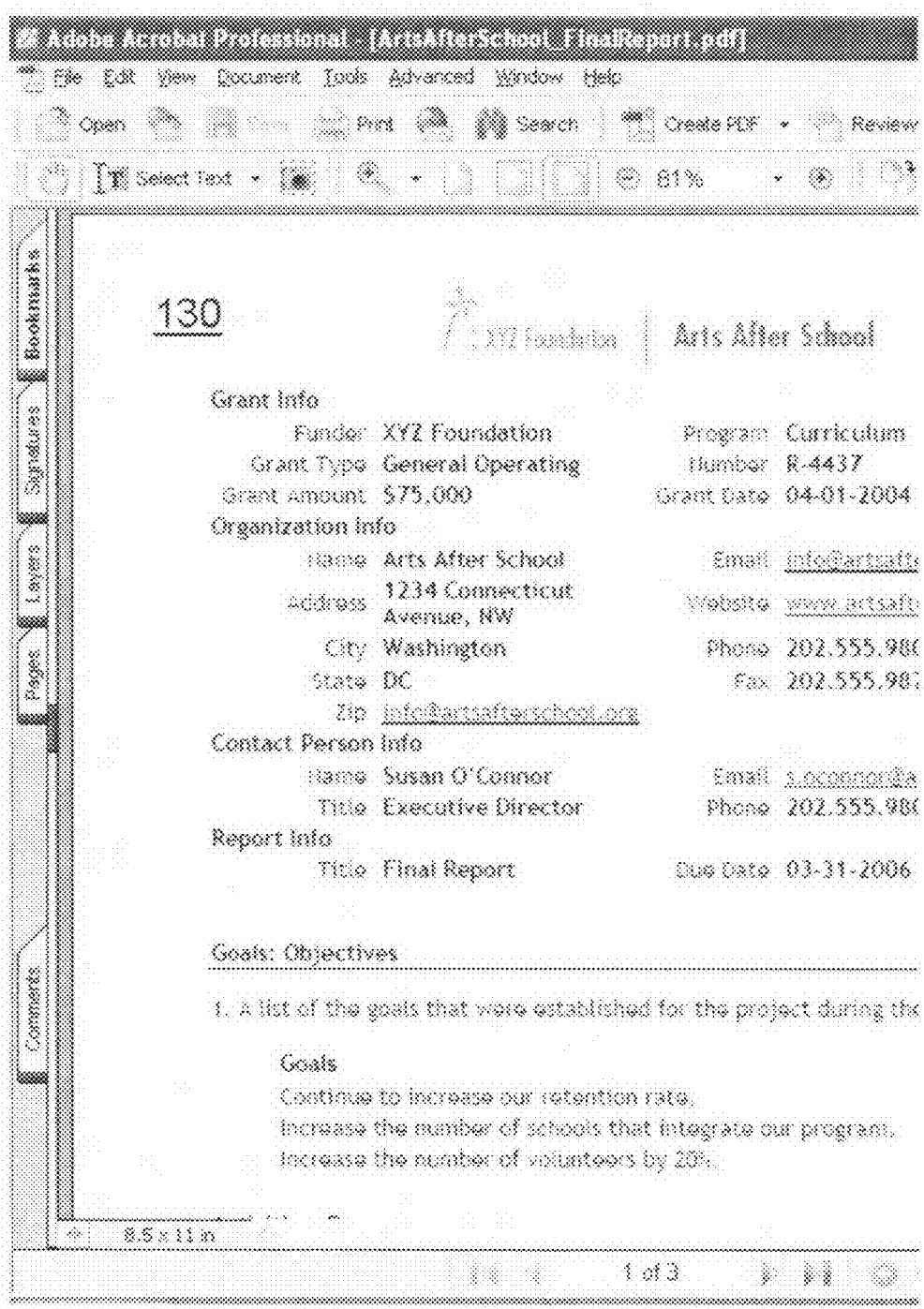
Figure 14B:
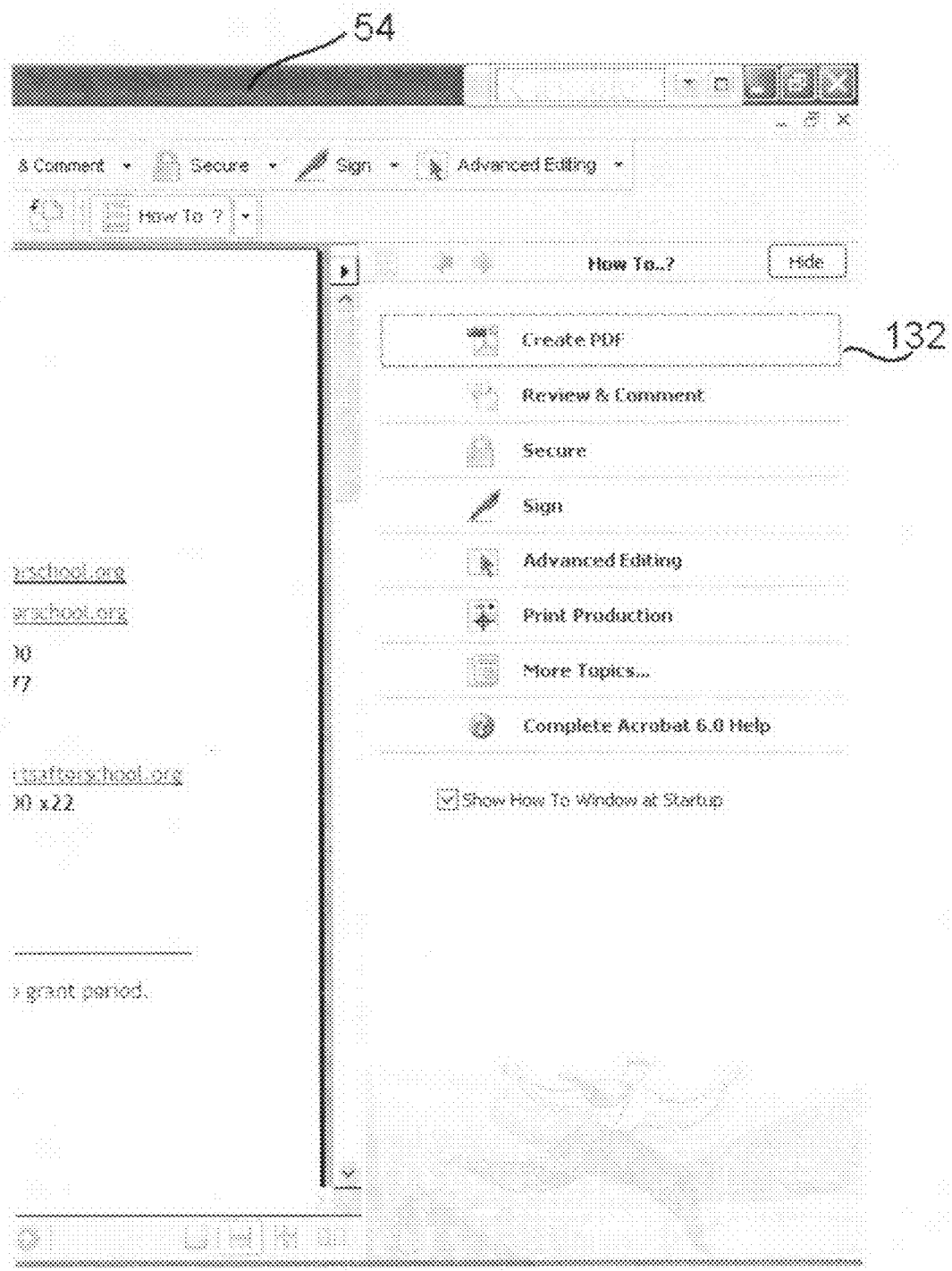

FIG. 14 illustrates a screen shot of an edited report 130 in a PDF or word processing format. A menu of options 132 is provided for the grantee user to manage the edited report 130 in PDF or word processing format.

Figure 15A:
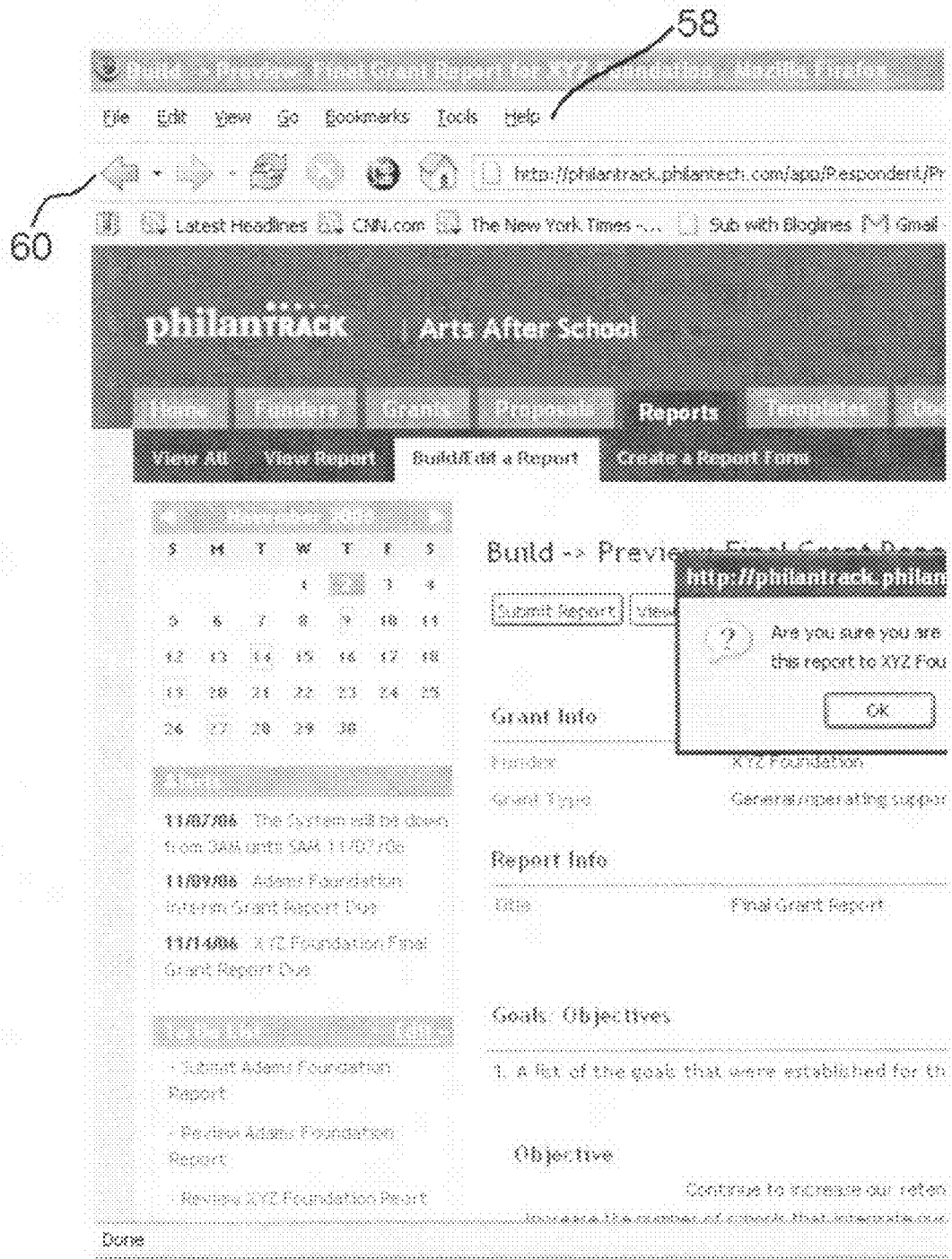

FIG. 15 illustrates a screen shot of an edit-report screen 34 where a report may be submitted by selecting "OK" from the confirmation screen 134. The grantee user may decline to send the report by pressing "CANCEL."

Figure 16A:
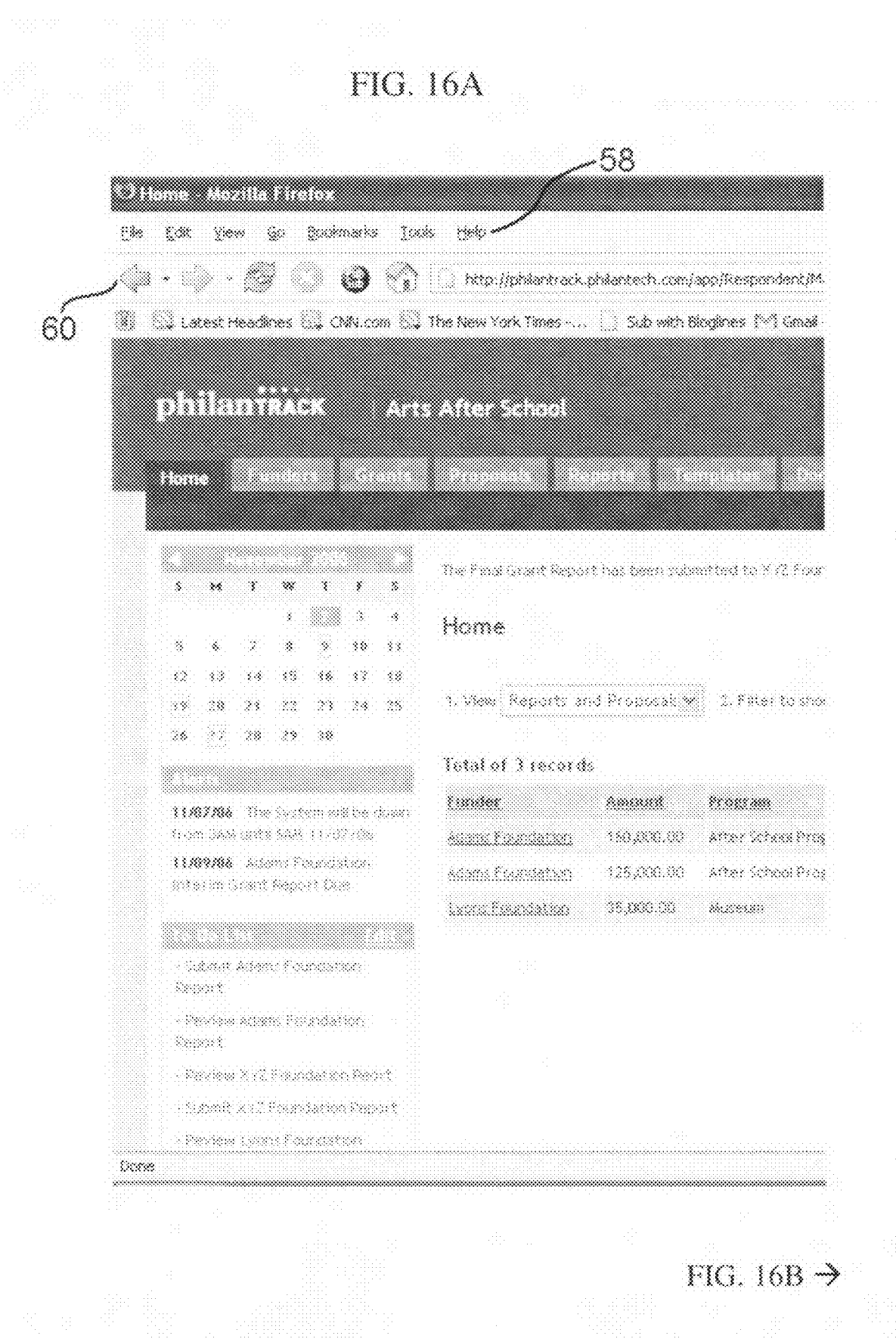
Figure 16B:
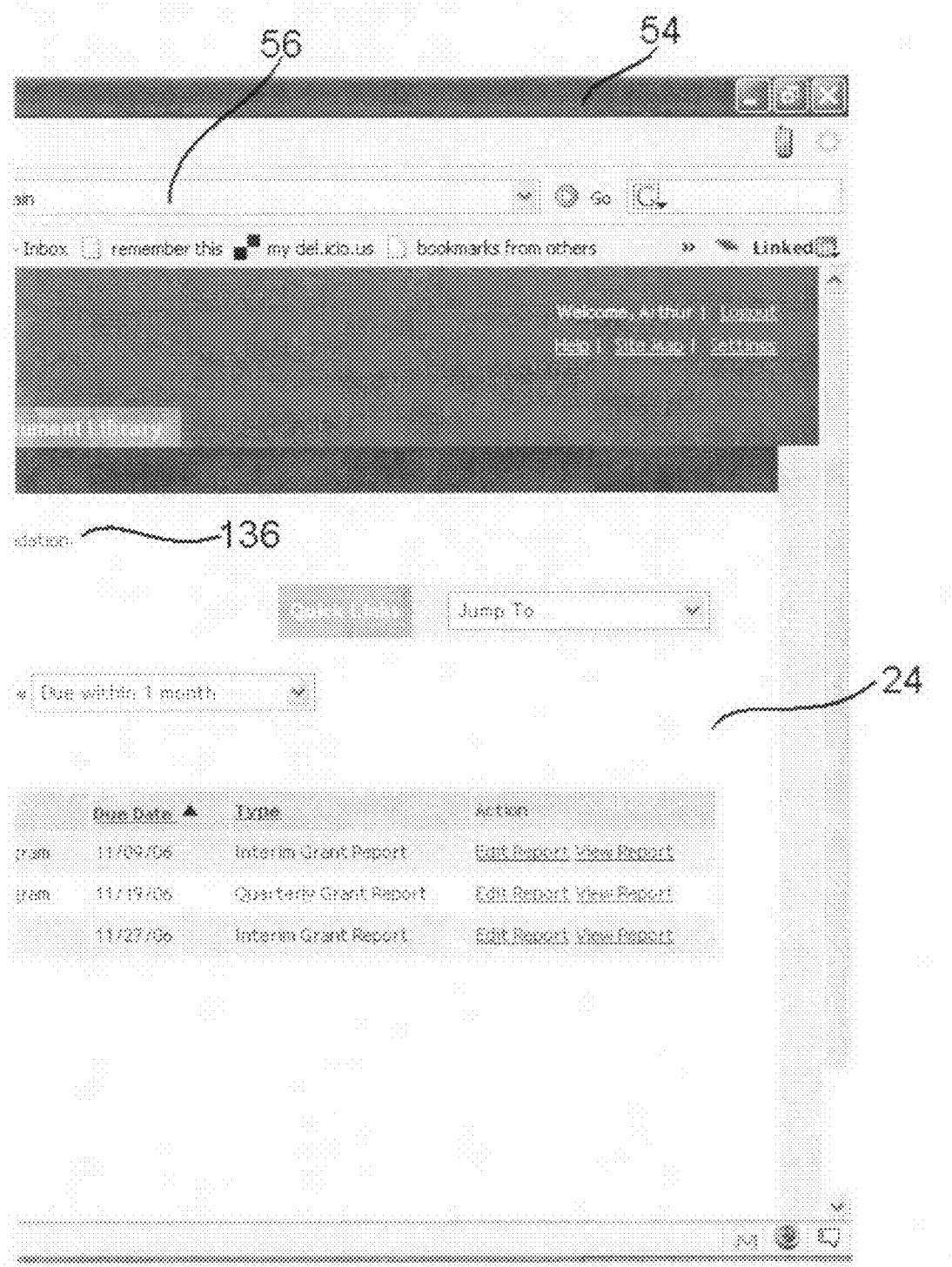

FIG. 16 illustrates a screen shot of a grantee screen 24 showing a confirmation message 136 confirming the submission of the submitted report.

Figure 17A:
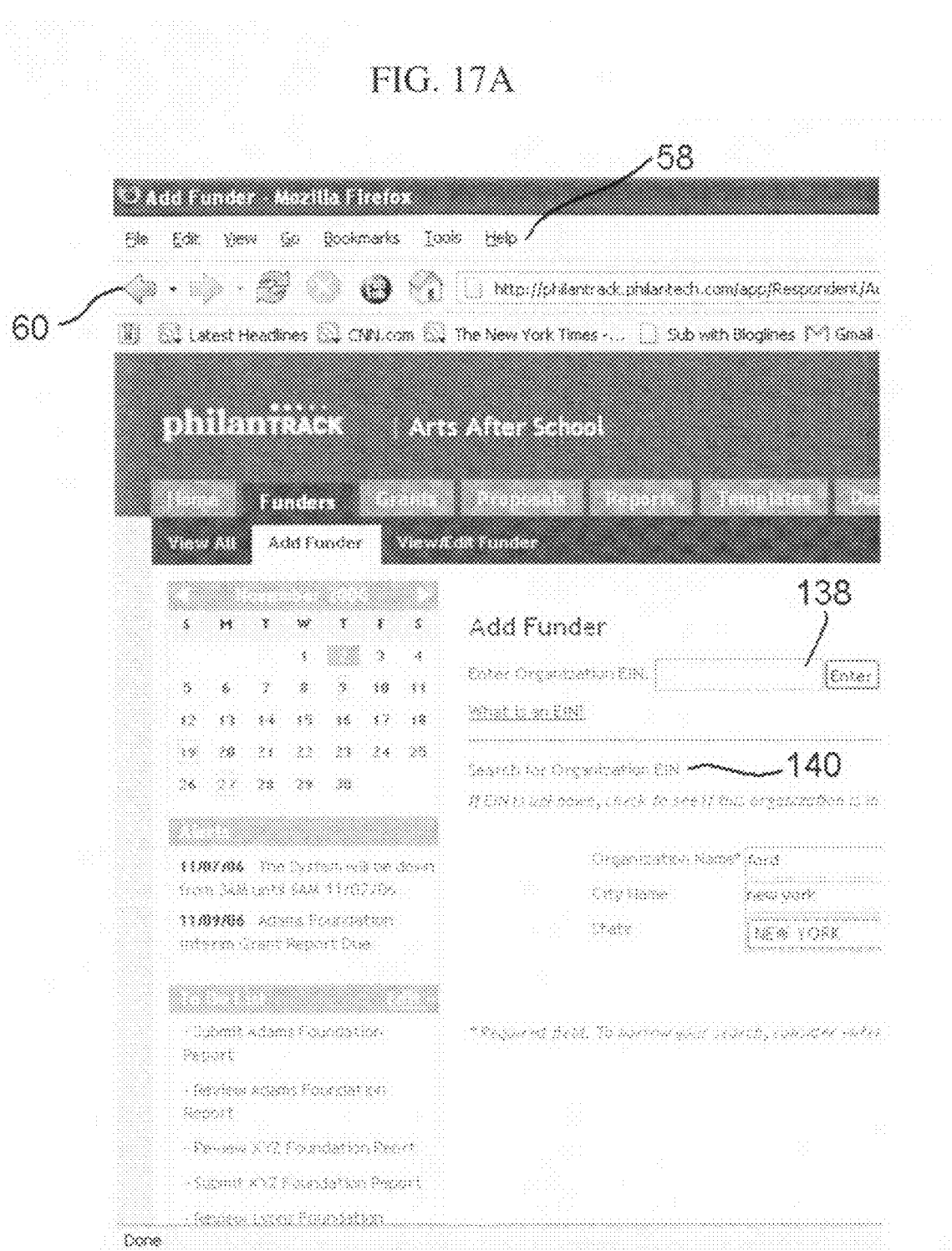
Figure 17B:
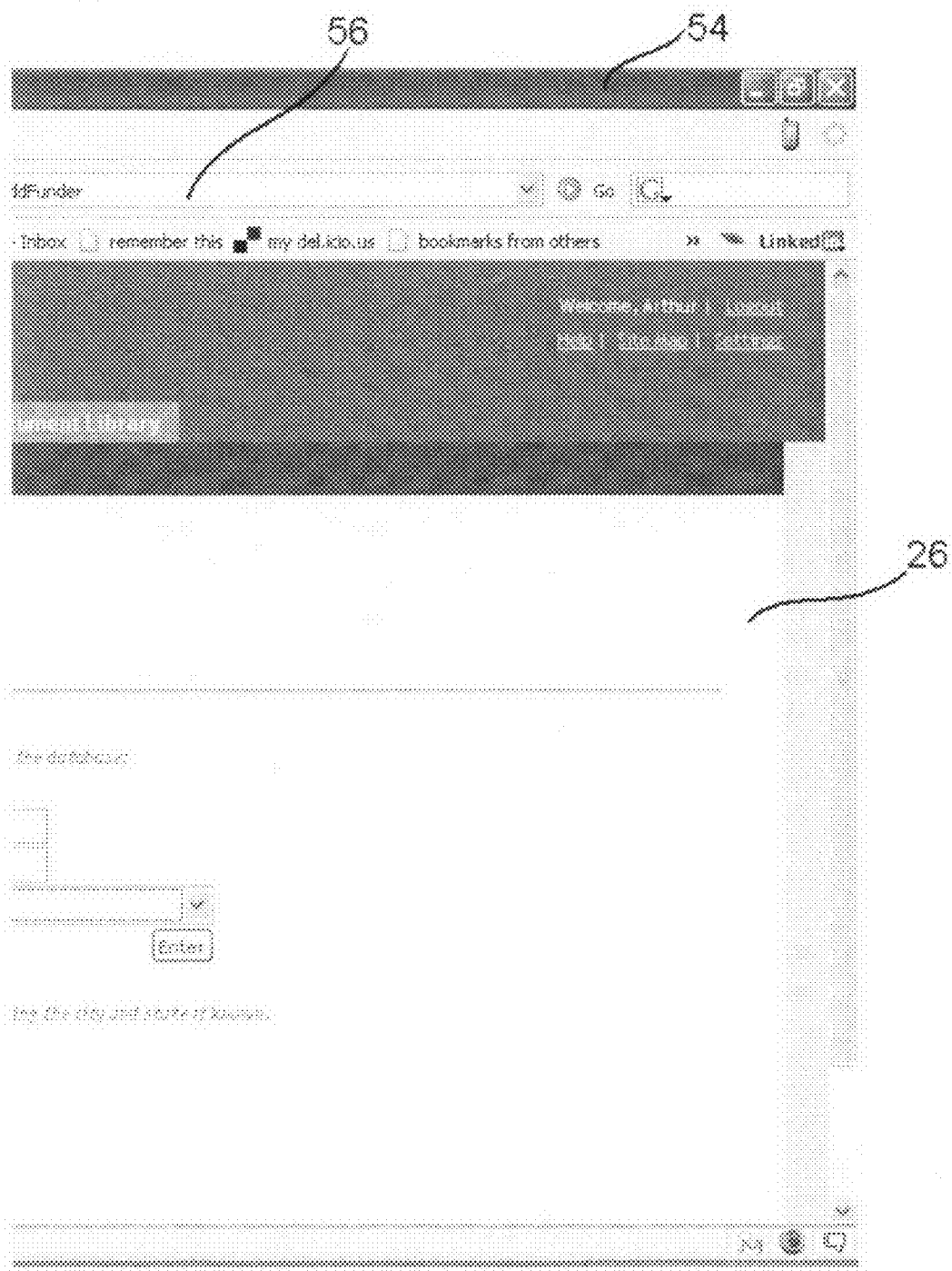

FIG. 17 illustrates a screen shot of a funder screen 26 where a grantee user can add a funder to a list that tracks proposals and reports made to funders. Funders are grantor organizations 16, such as, by means of a non-limiting example, a foundation that supports non-profit organizations through grants. A grantee user may add a funding organization to their list of funding organizations using the add funder feature 138 on screen 26. The grantee user may search for a grantor organization's 16 Federal IRS assigned Employer Identification Number (EIN) number using tool 140. Entering either the EIN or the name/city/state searches the IRS list of exempt organizations. An EIN database in system 10 takes text files posted by the IRS for all tax-exempt organizations in the United States, and parses the text files into a database of organizations, their EINs, and contact information for tool 140.

Figure 18A:
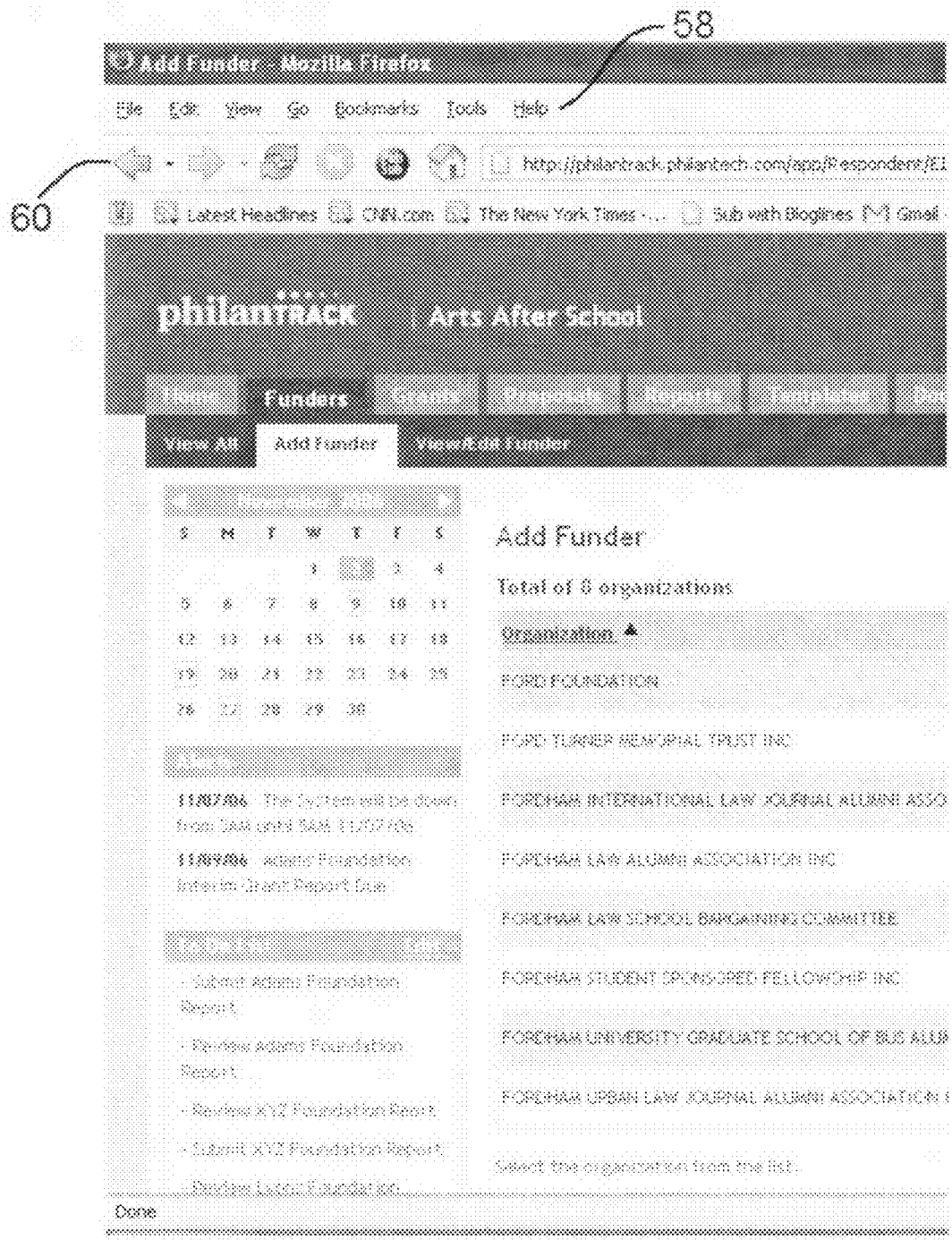

FIG. 18 illustrates a screen shot of a funder screen 26 where a grantee user can add a funder from a table 142 to track reports made to selected funders. Table 142 provides a listing of all of the grantor organizations 16 that were identified by tool 140 in response to the information provided by the grantee user. Table 142 includes the name of the grantor organization 16, its address, EIN, organization information, and a list of actions. The list of actions provides links for the grantee user to add the identified grantor organization to its list of grantor organizations.

Figure 19A:
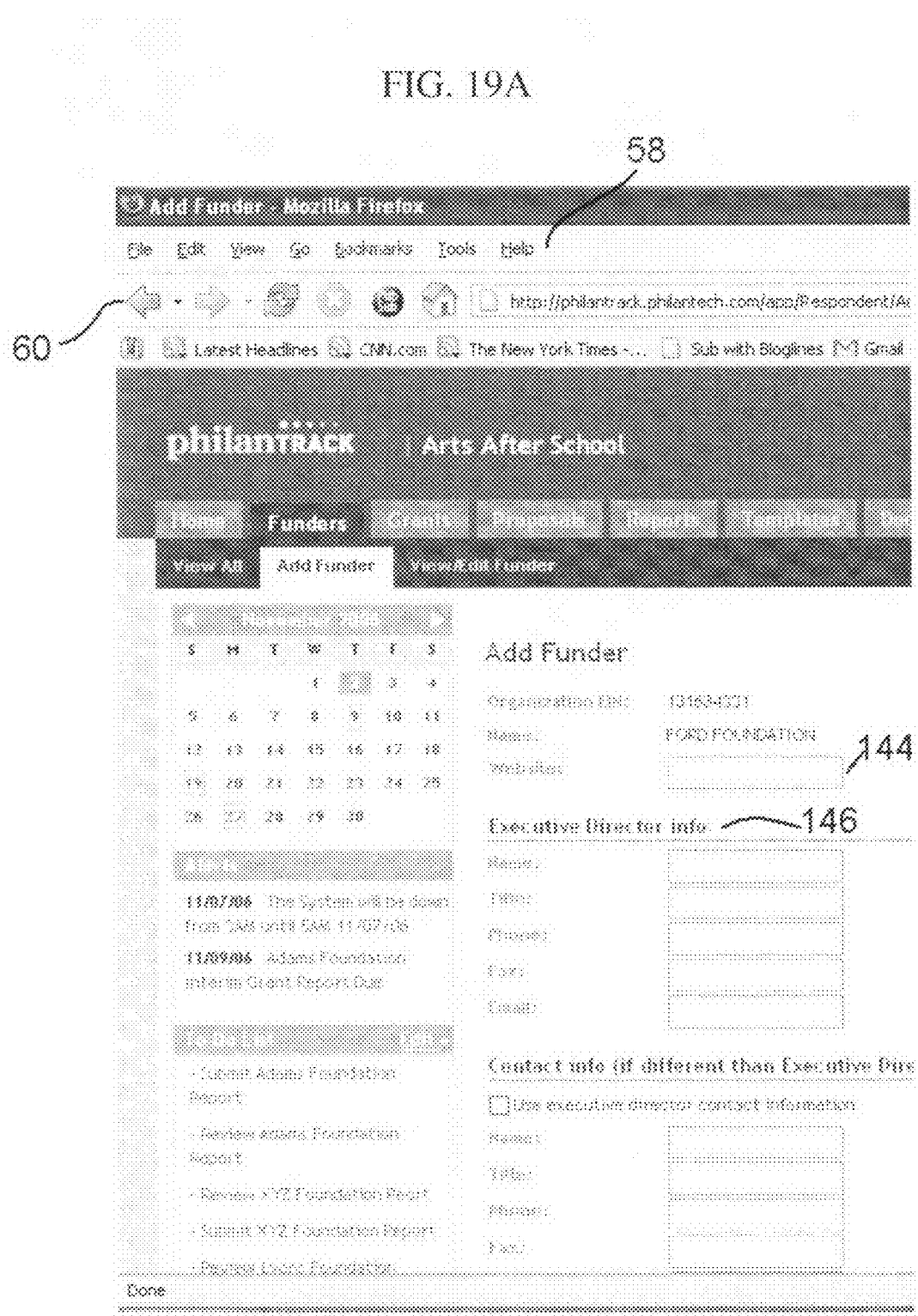
Figure 19B:
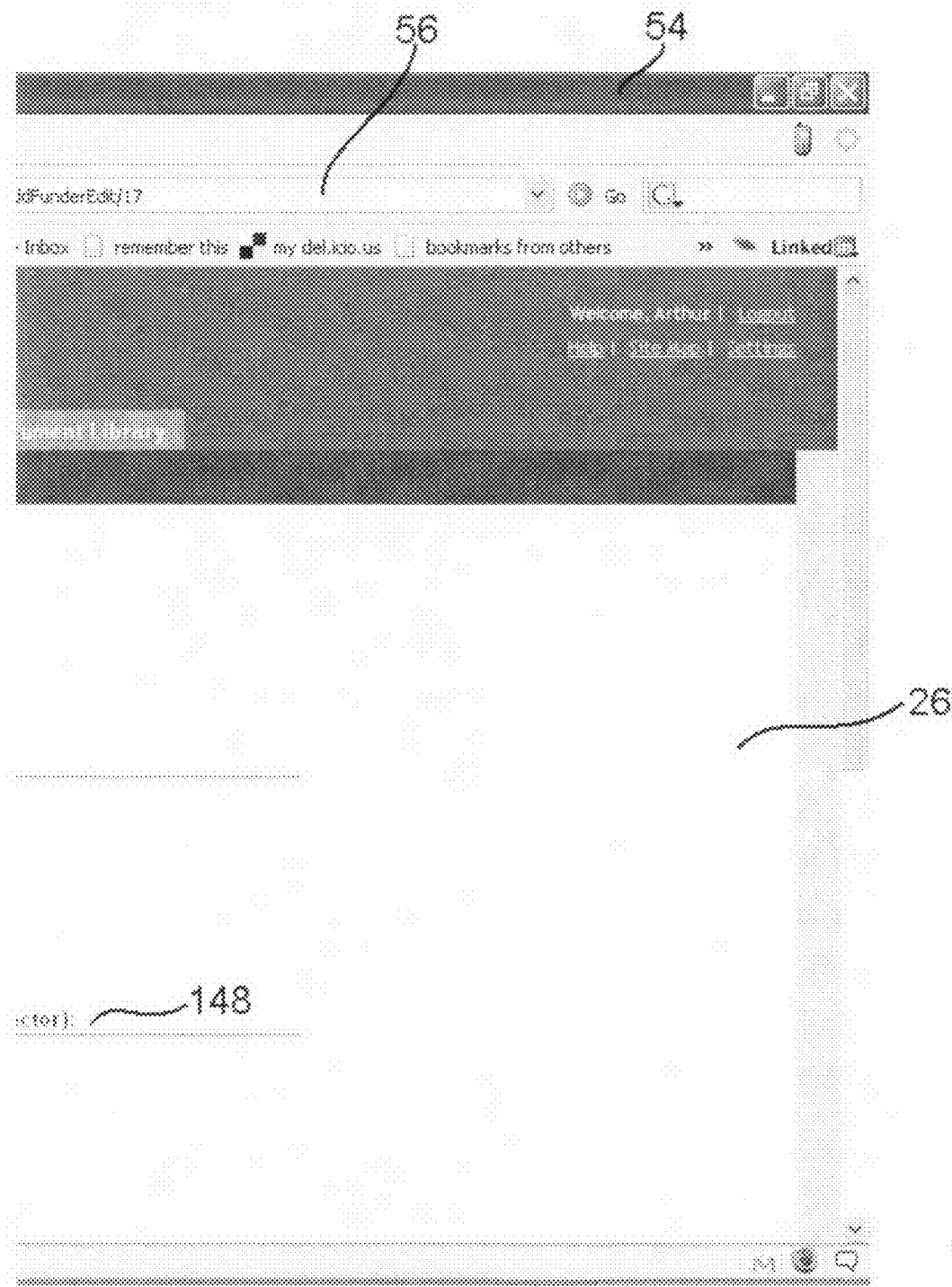
Figure 20A:
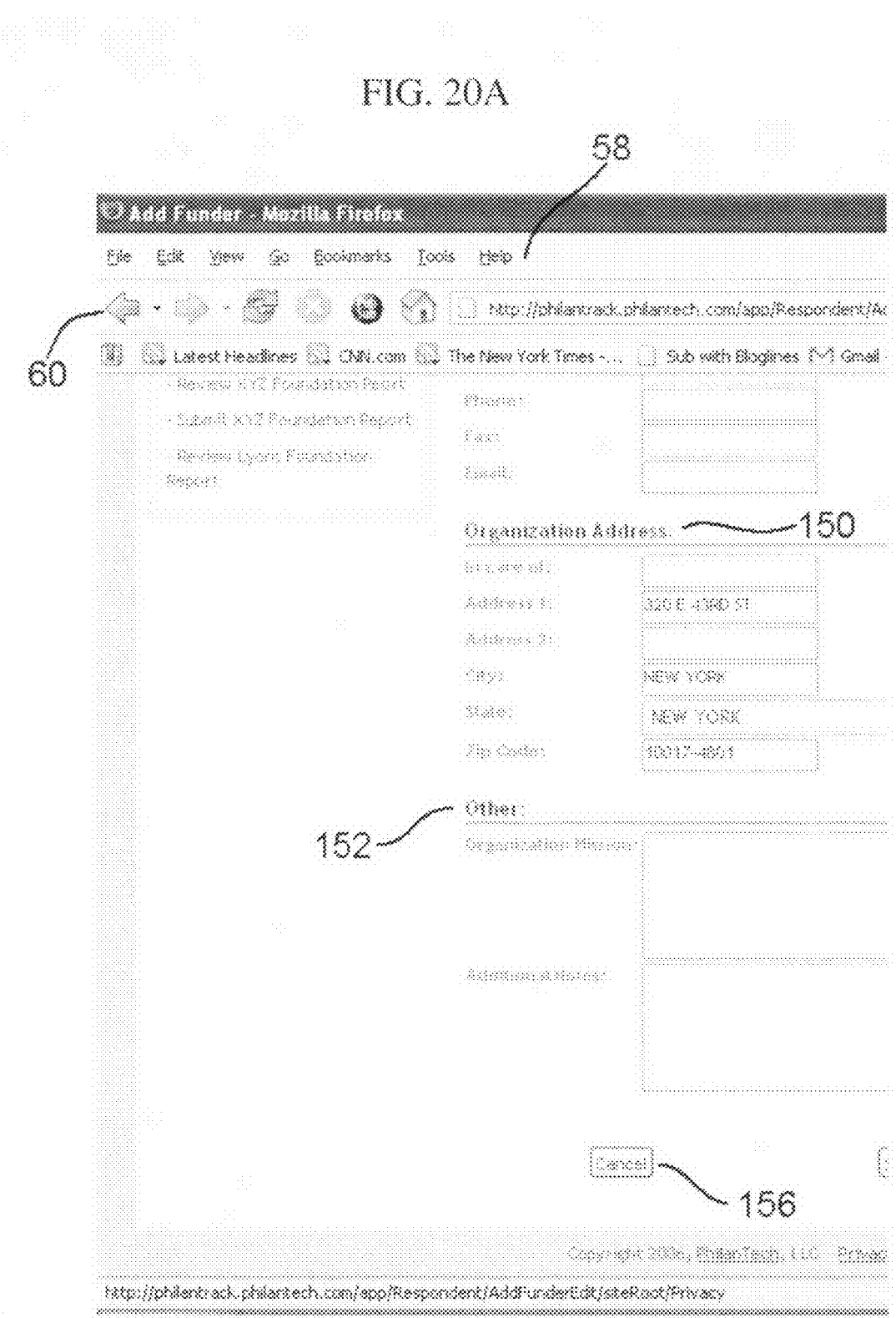
Figure 20B:
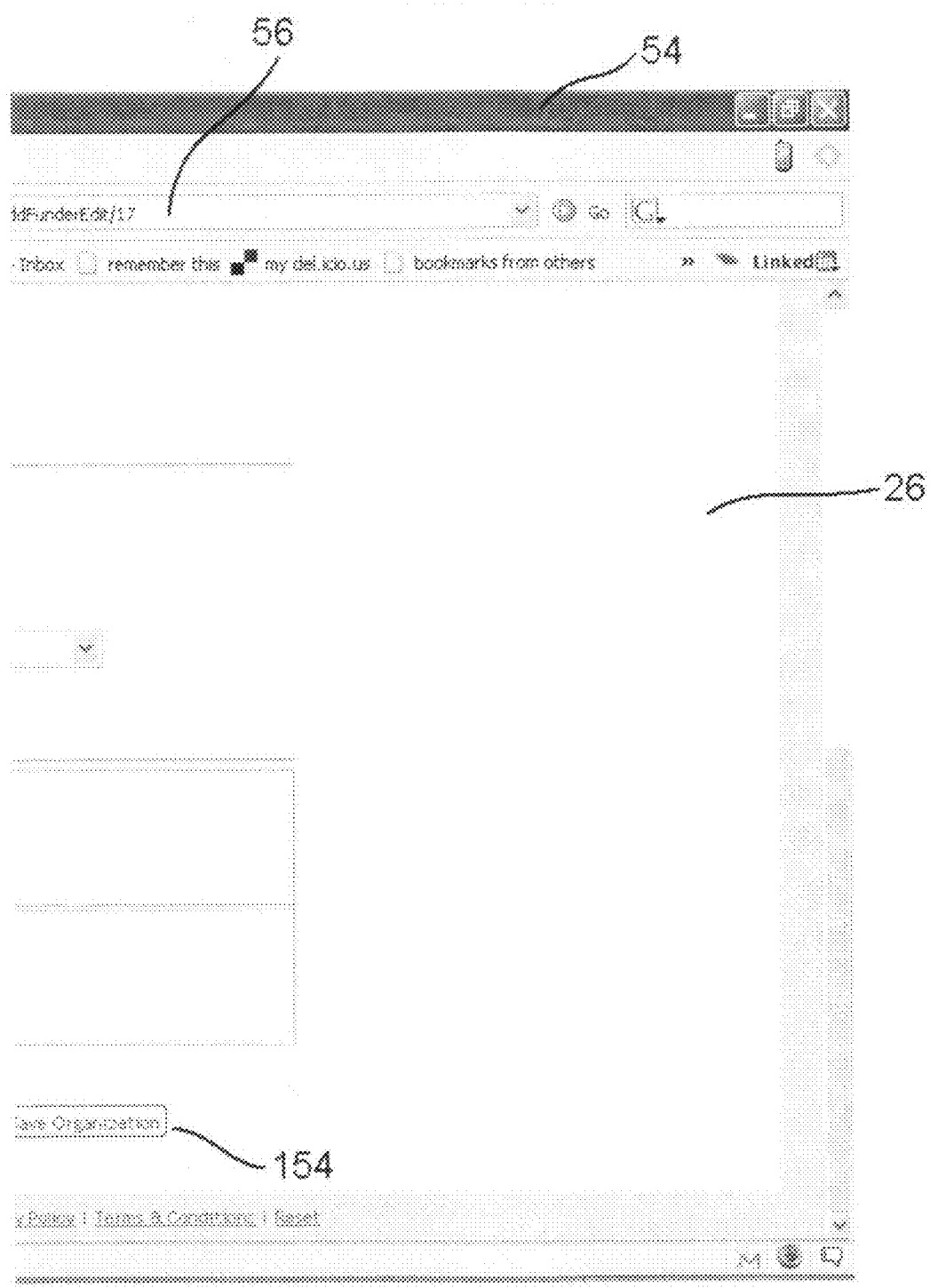
Figure 21A:
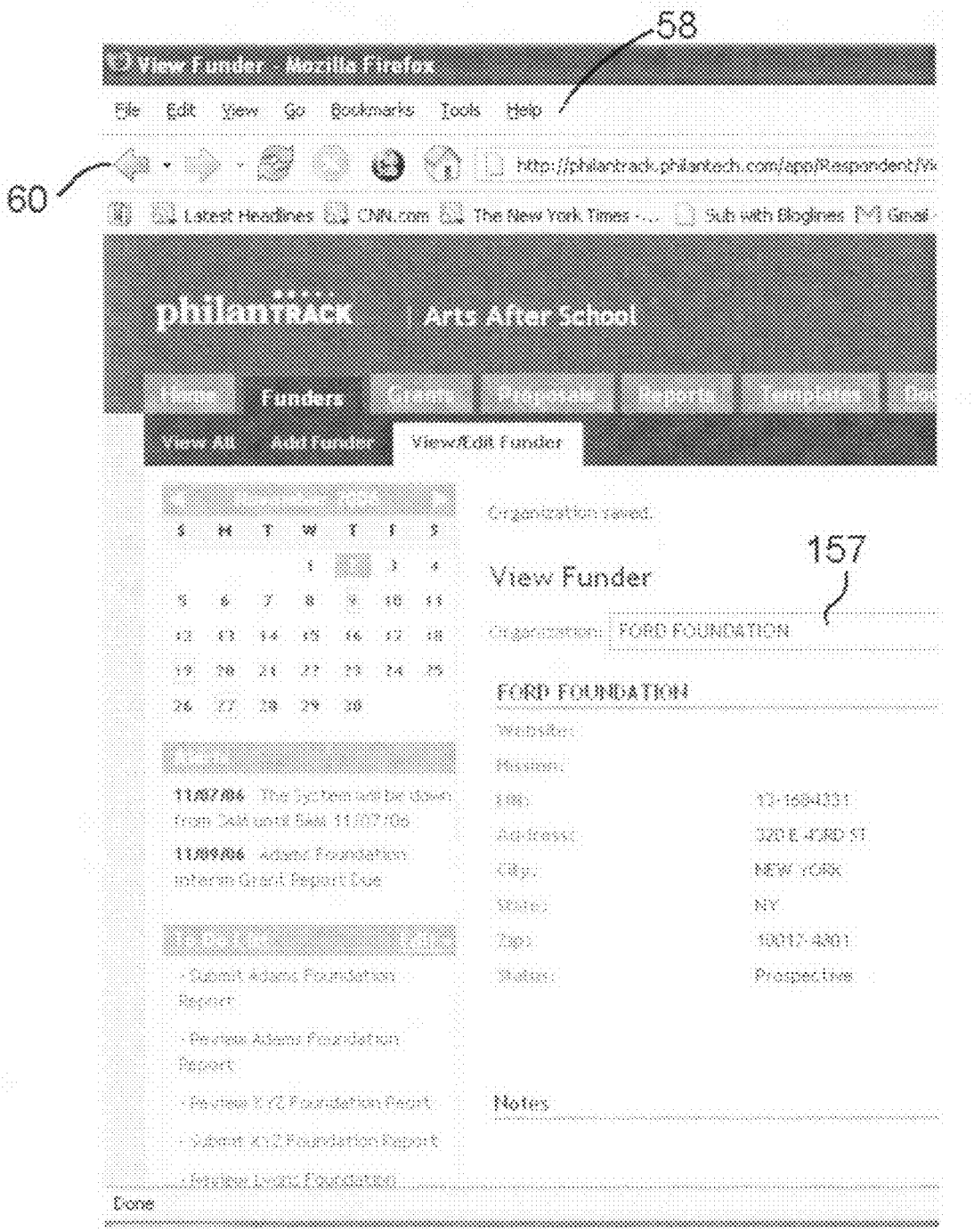

FIG. 19 illustrates a screen shot of a funder screen 26 where a grantee user may add information about a funder, such as the funder/grantor organization's 16 website in text box 144, executive director information in text boxes 146, and contact information for the funder/grantor organization 16 in text boxes 148. FIG. 20 illustrates an additional view of the screen shot of a funder screen 26 shown in FIG. 19 where a grantee user may add information about a funder. The grantee user may enter in the grantor organization's 16 address in text boxes 150. The grantee user may also enter other information about the grantor organization 16 in text boxes 152. The grantee user may then save this information with button 154, or cancel saving the information using button 156. FIG. 21 illustrates a screen shot of a funder screen 26 where information about a funder is viewed. Menu 157 allows the grantee user to select a grantor organization 16 to view. Menu 158 allows the grantee user to specify what information the grantee user wishes to view about the grantor organization 16. In the present example, contact information 148 and executive director information 146 are shown.

Figure 22A:
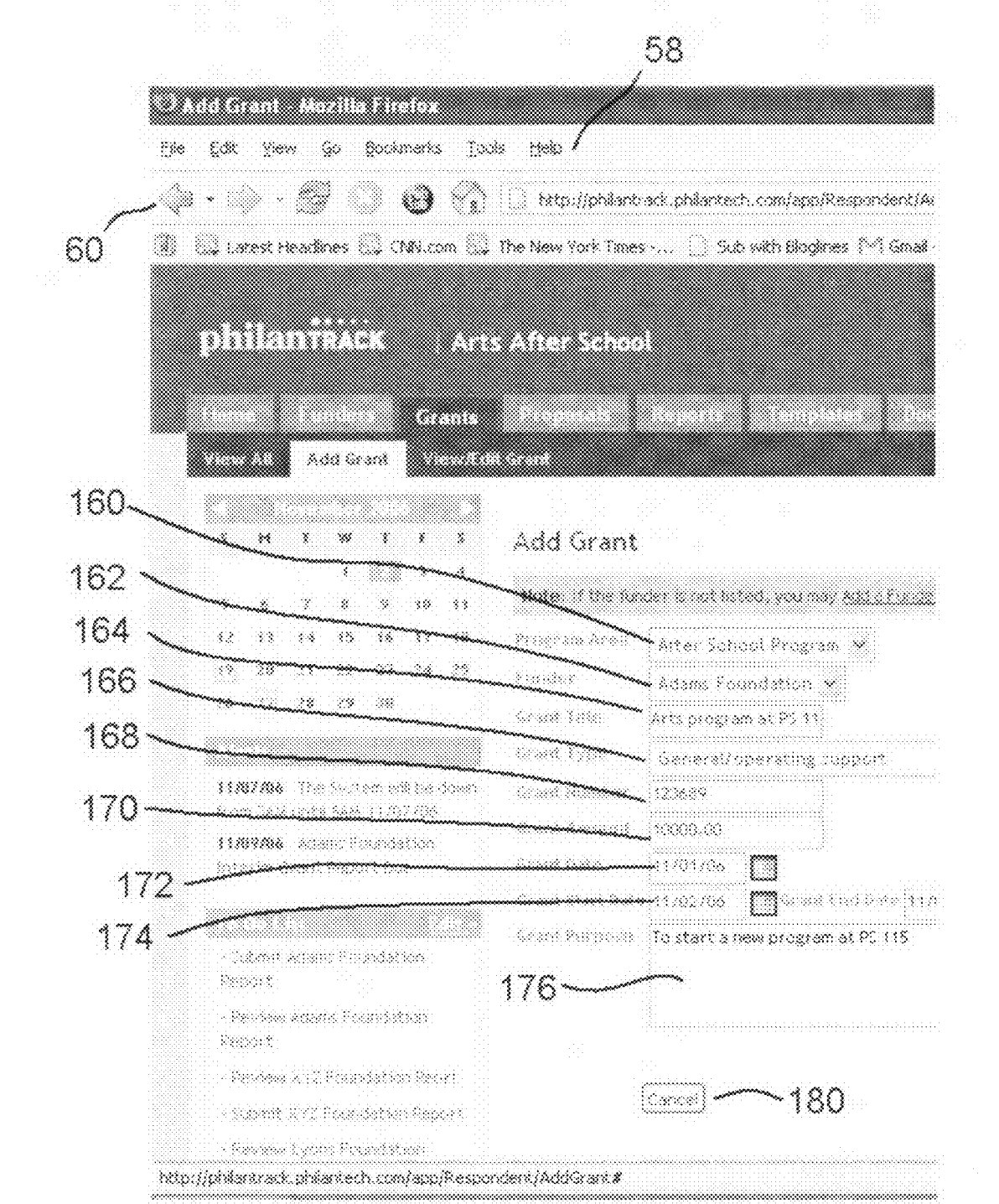
Figure 22B:
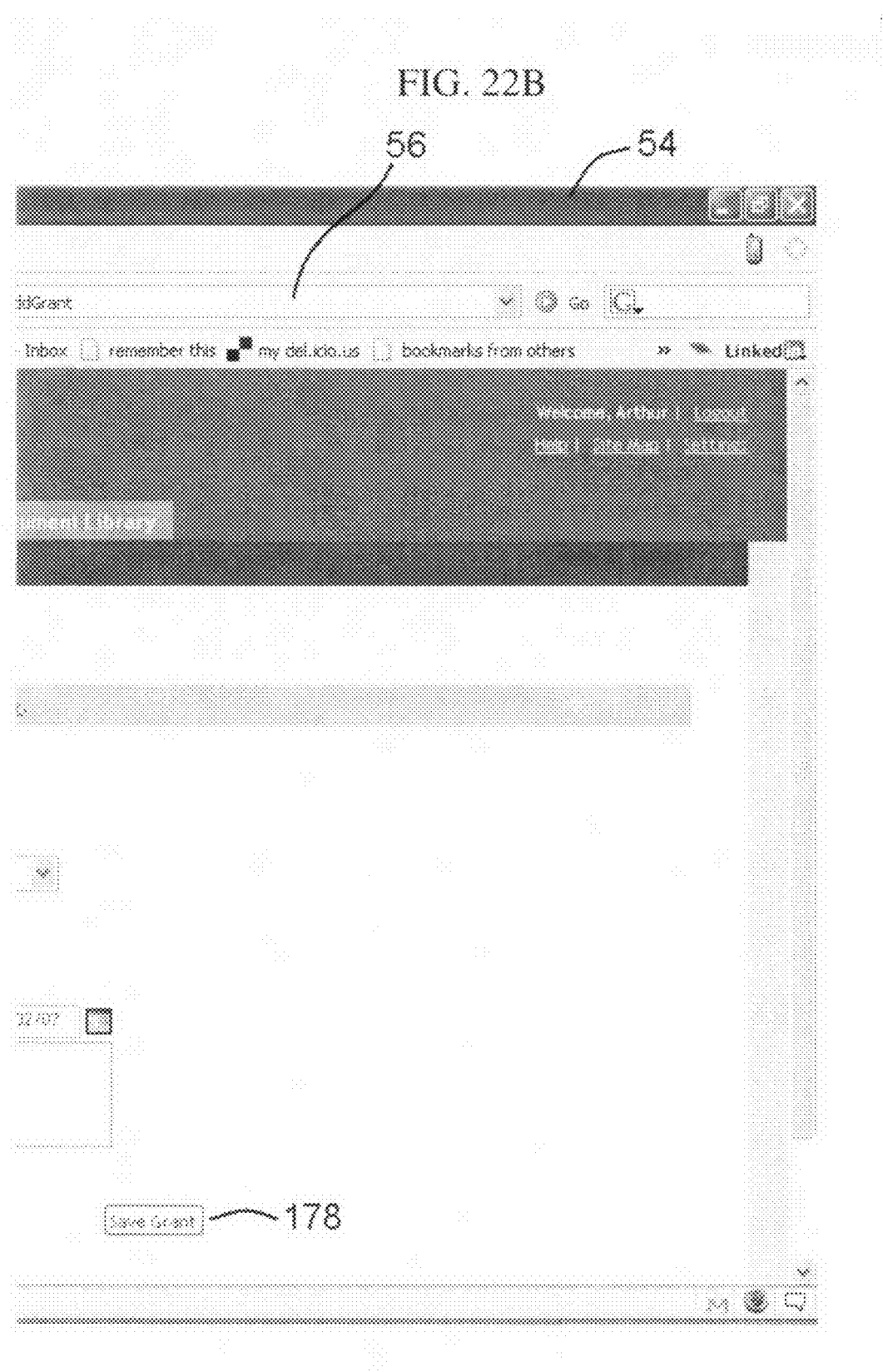

FIG. 22 illustrates a screen shot of an add grant screen 28. Add grant screen 28 allows the grantee user to add information about a particular grant. This information can include the program area from menu 160, funder name from menu 162, grant title 164, grant type from menu 166, grant number 168, grant amount 170, date of the grant 172, the start date of the grant 174, and the purpose of the grant 176. The grantee user may then save this information with button 178, or cancel the entry of data with cancel button 180.

Figure 23A:
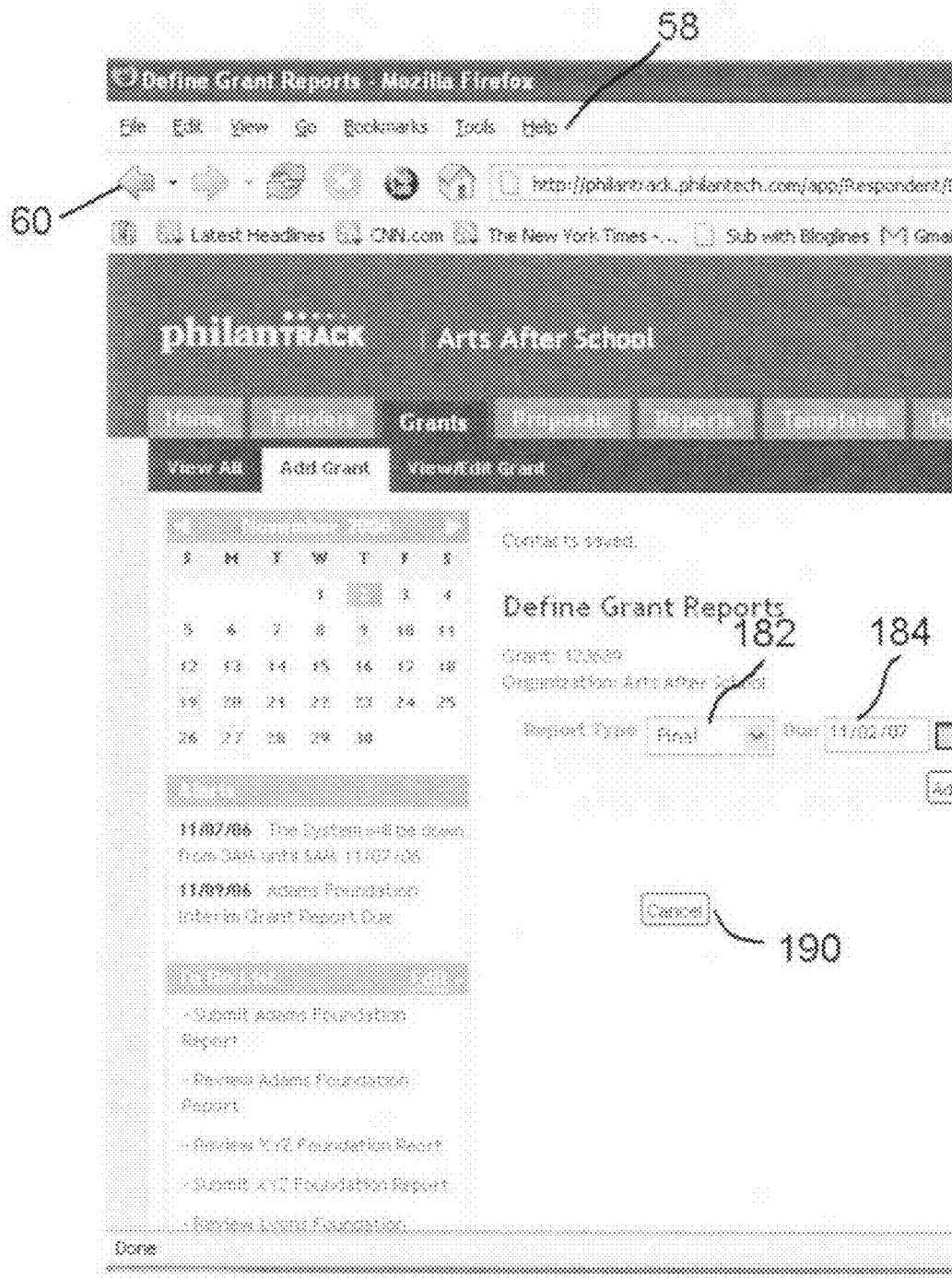

FIG. 23 illustrates a screen shot of an edit-grant screen 32 where grant reports are defined for inclusion with table 68.

The grantee user defines the type of report with menu 182. The grantee user selects the due date with menu 184. The grantee user may select a template for the report with menu 186. The grantee user may add additional reports, each with a type from menu 182, due date from menu 184, and template from menu 186 with add report button 192. The grantee user may save the reports and add them to FIG. 25 199 with button 188 or cancel the entry of data with cancel button 190.

Figure 24A:
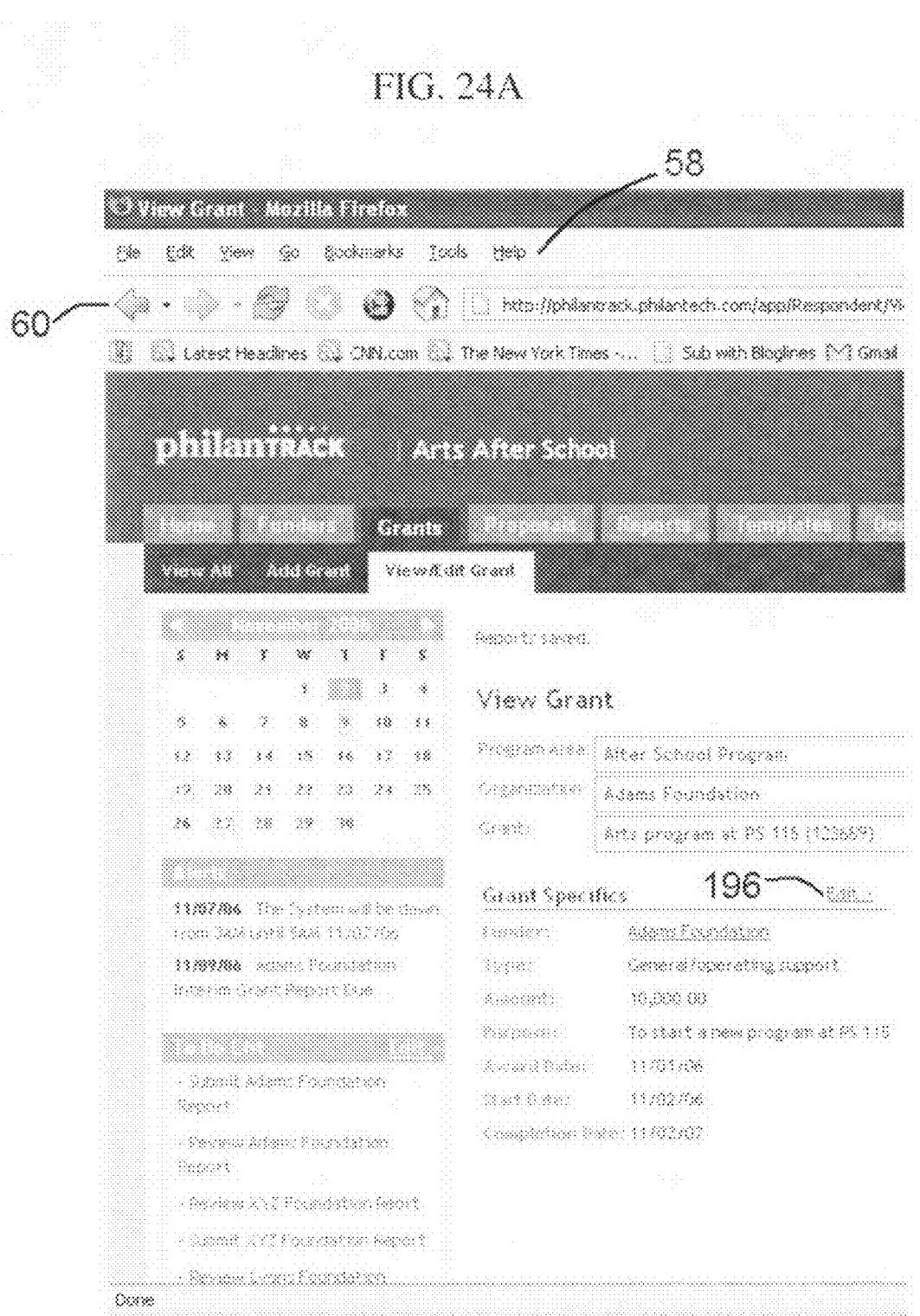
Figure 25A:
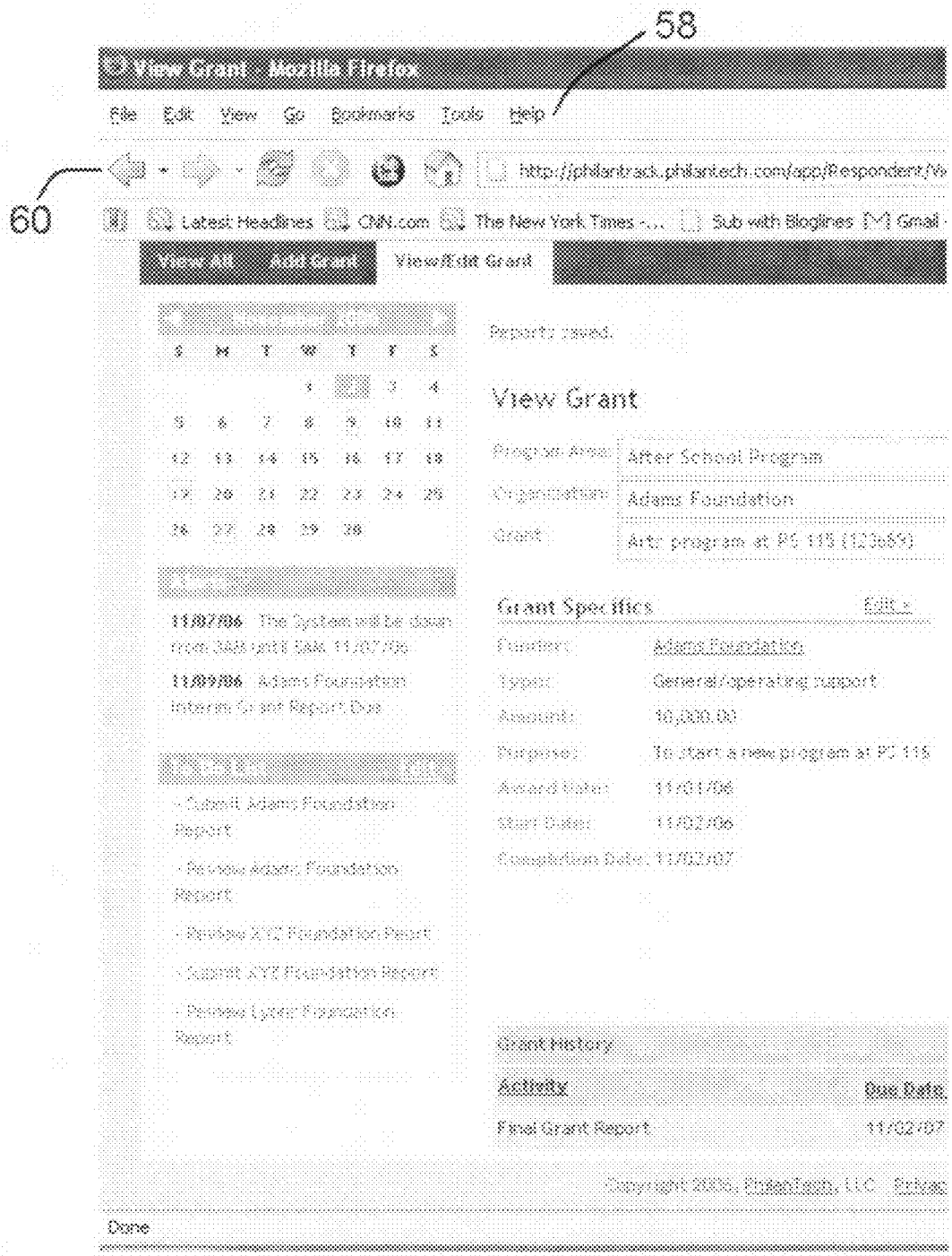
Figure 25B:
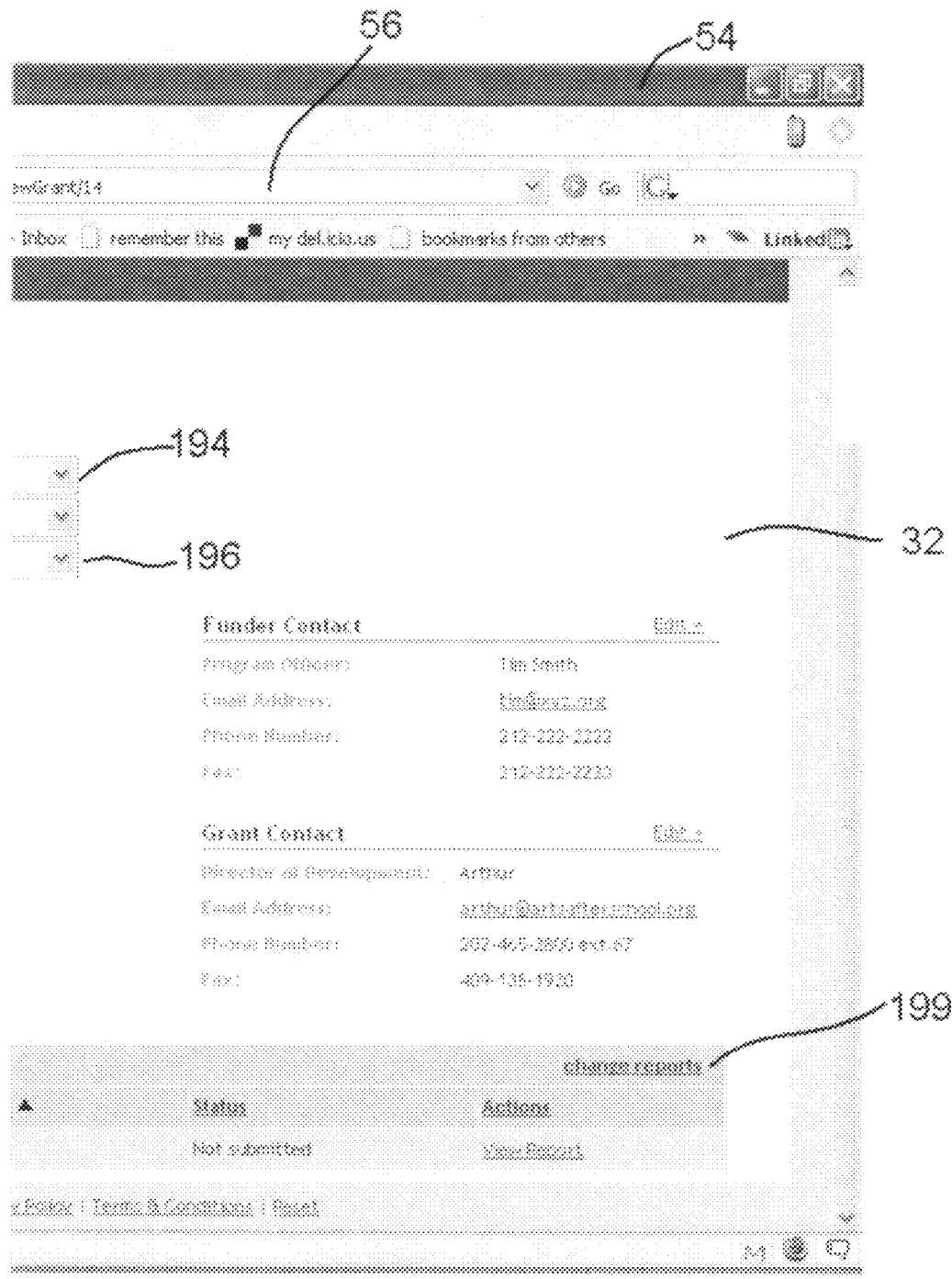

FIGS. 24 and 25 illustrate a screen shot of an edit-grant screen 32 where grant information is viewed. Using menus 194 that identify grants by program area, organization, and grant name, the grantee user can select a specific grant whose specifics 196 are shown below. Table 198 lists and allows editing of contact information for a grant. Table 199 illustrates activity with respect to the selected grant. Activity includes an identification of grant reports and proposals, due dates, and status of the report as to whether or not it has been submitted.

Figure 26A:
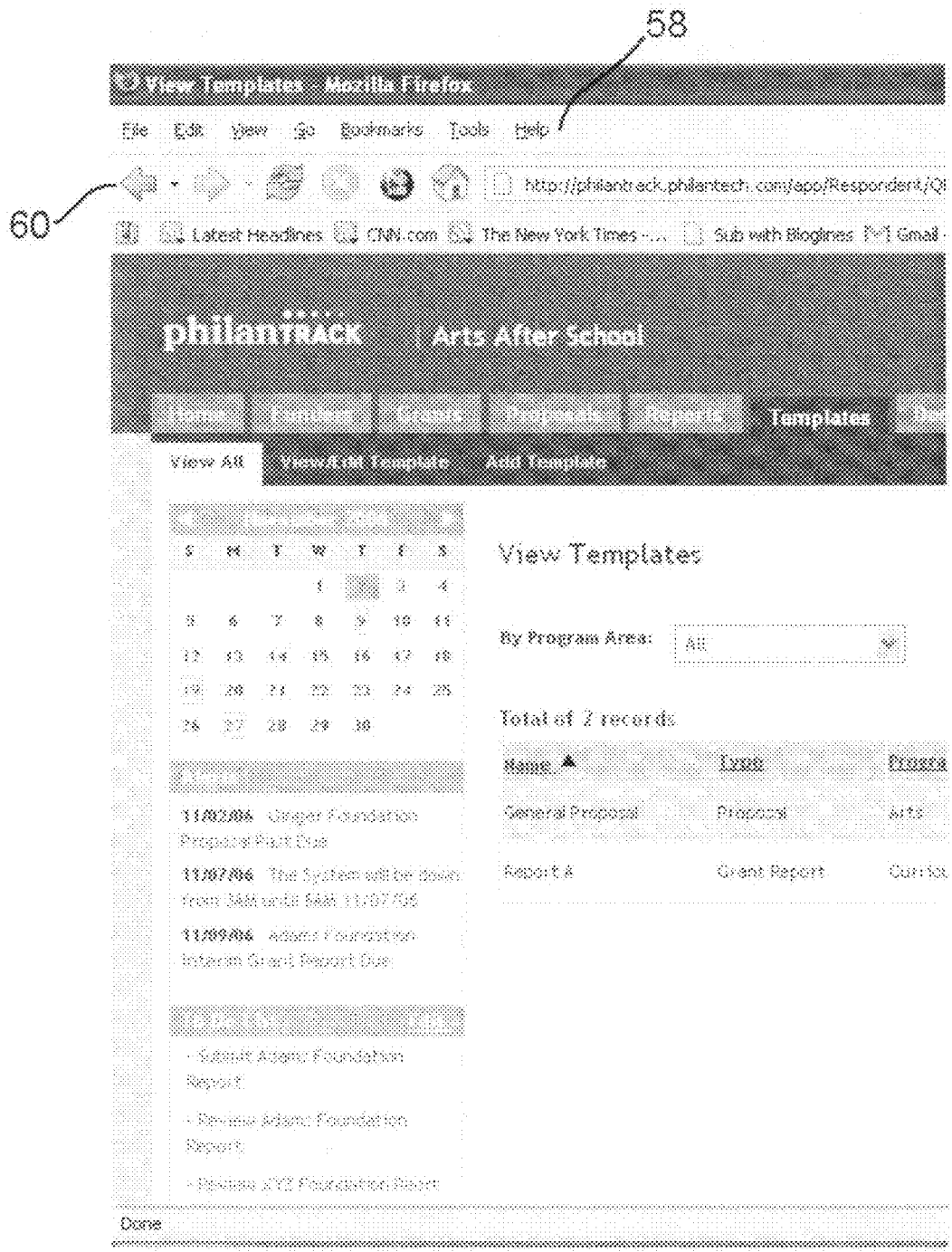
Figure 26B:
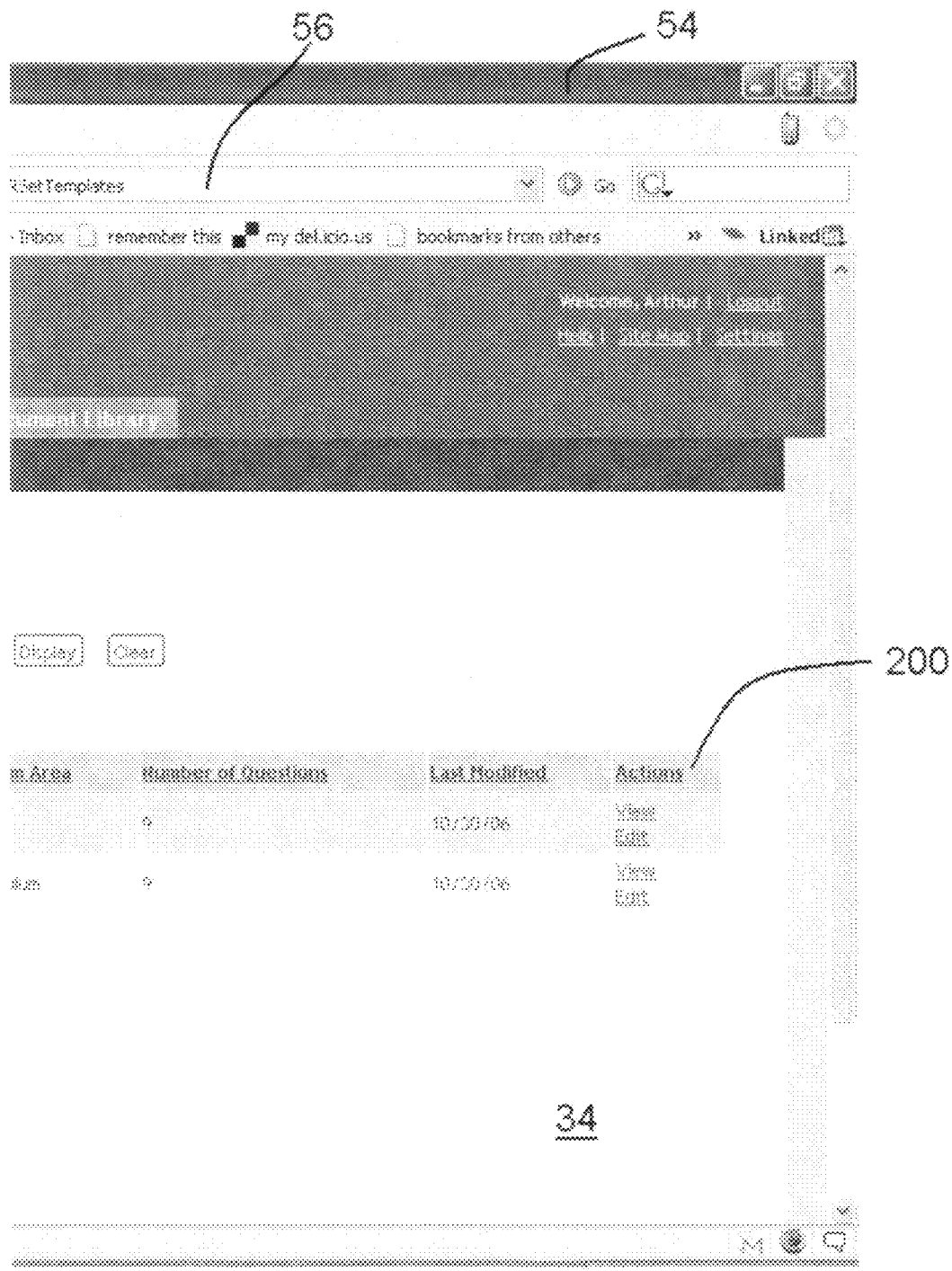

FIG. 26 illustrates a screen shot of a view all templates screen 34, where a grantee user can view all templates including name, type, funding area, number of questions, date last modified, and actions to be taken. The list of templates displayed can be narrowed by program area. Some grantor organizations provide proposal and reporting forms in system 10 for use by grantee users. However, some do not. Thus, template screen 34 enables grantee users to prepare forms for use in preparing proposals and reports using system 10 for grantor organizations 16 who do not prepare proposal or reporting forms for use by the grantee user.

FIG. 27 illustrates a screen shot of an edit template screen 34. Using menu 202, the grantee user may select a report template to edit. The report template includes a plurality of buttons 204 that allow the grantee user to move questions 206 within the report template. Buttons 208 allow the grantee user to remove questions 206 from the report template.

Figure 27A:
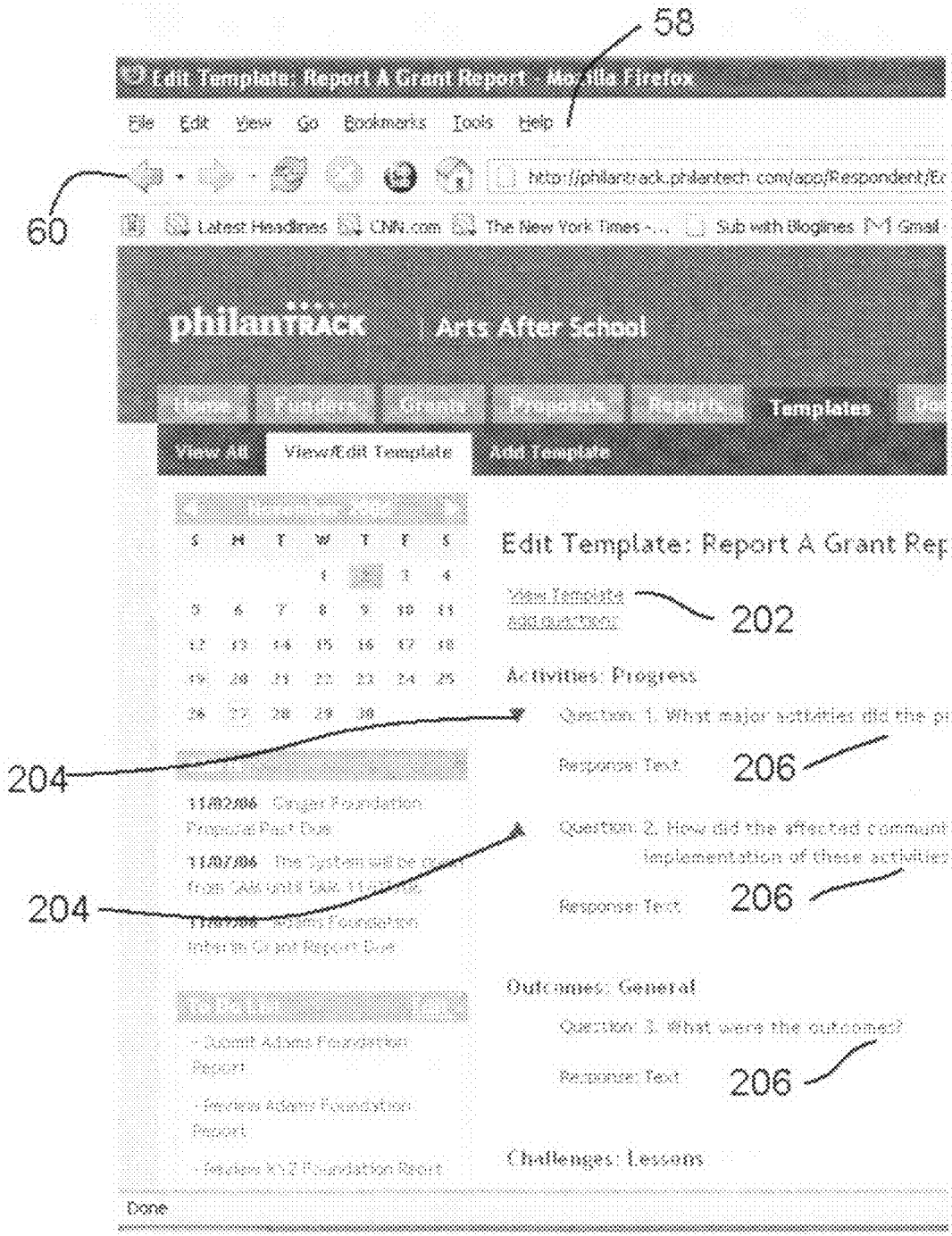
FIG. 27a illustrates a screen shot of a build-template tool on a template screen.
Figure 27A:
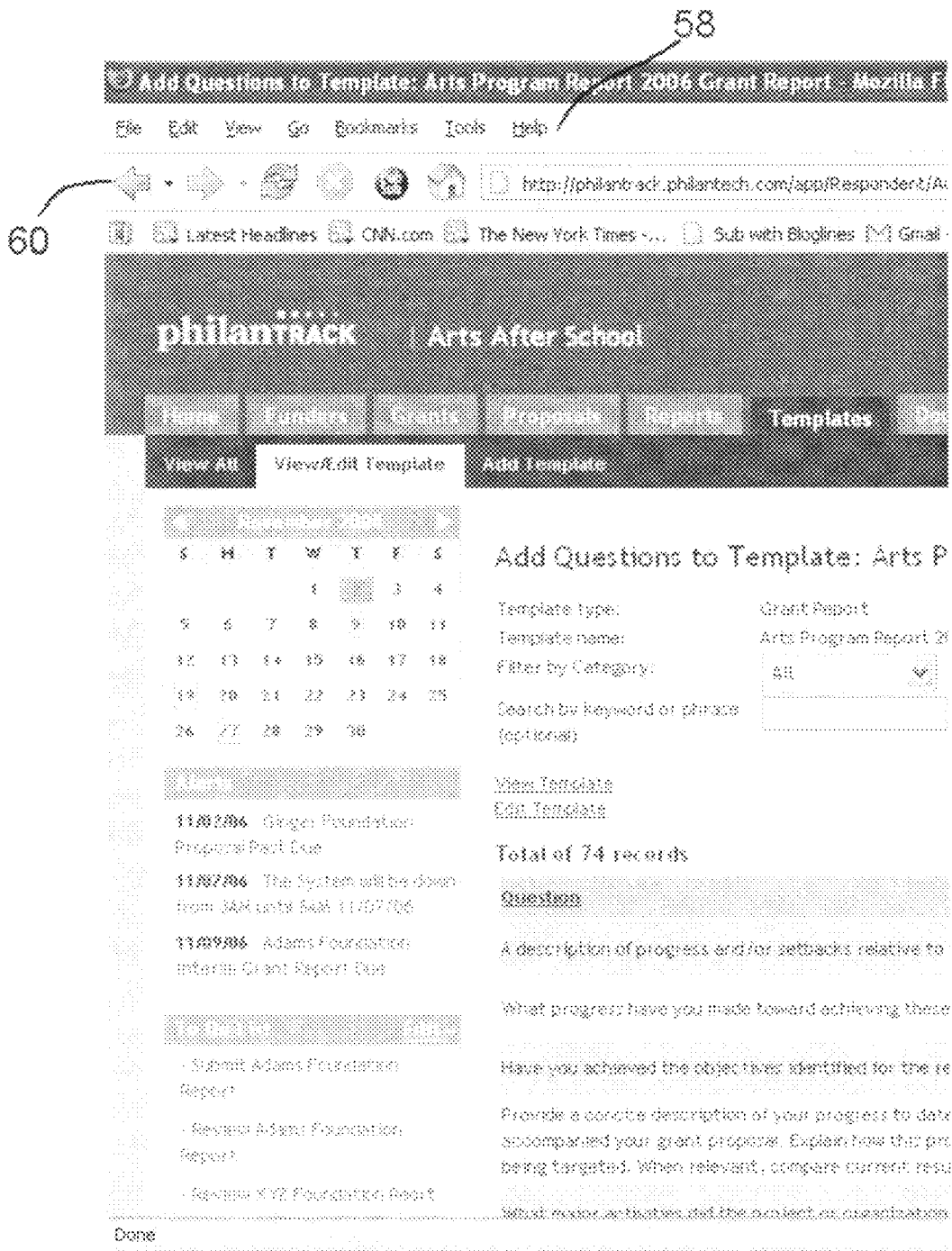
Figure 27A:
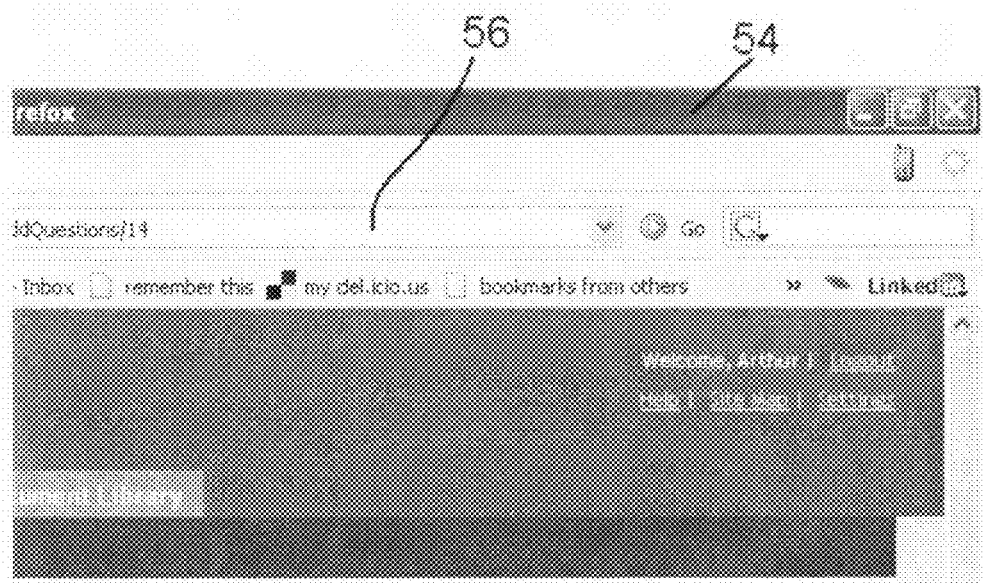

FIG. 27a illustrates a screen shot of a build-template tool on a template screen. The build template tool provides the grantee user with the ability to search for and select questions from the PhilanTrack database for inclusion into the template. The grantee user can then add a question from a list of search results to the template for a grant report or a grant proposal.

Figure 27B:
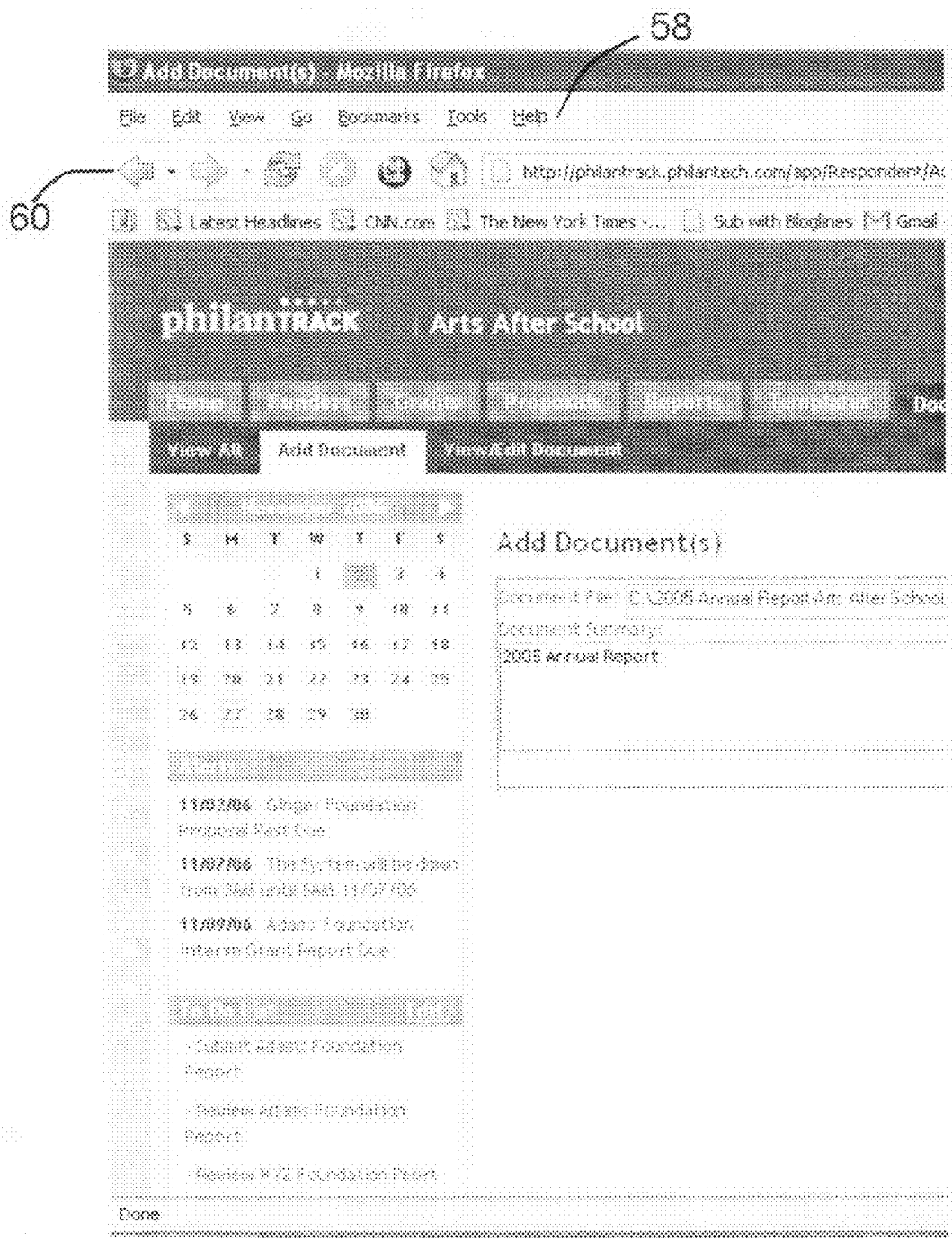
FIG. 27b illustrates a screen shot of an add-document tool on a document library screen.
Figure 27B:
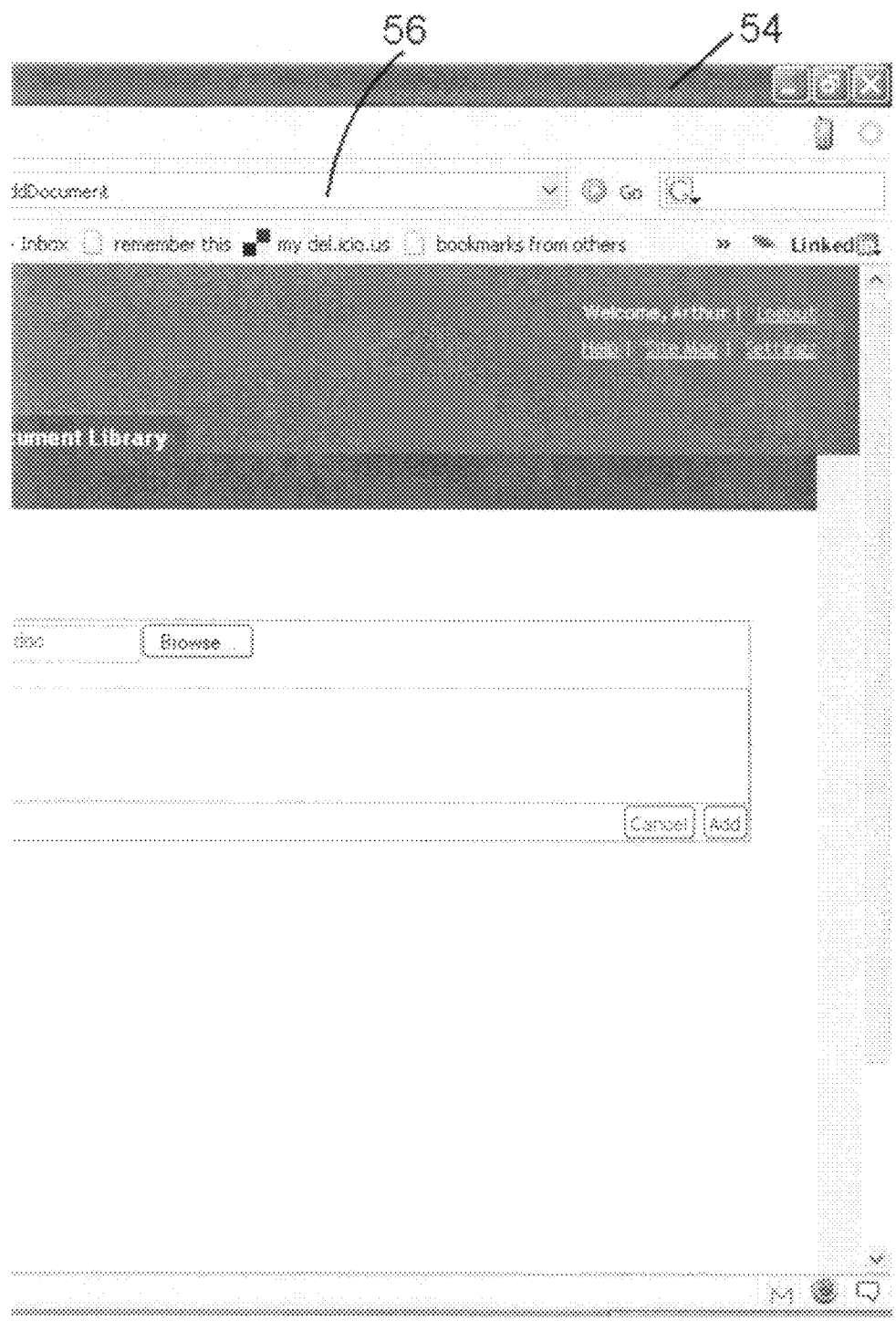

FIG. 27b illustrates a screen shot of an add-document tool on a document library screen. Grantee users can add documents to the document library by searching for the document on their computer or network, and typing in a description of the document. Grantee users can then save that document to the document library for use in grant reports or grant proposals.

Figure 27C:
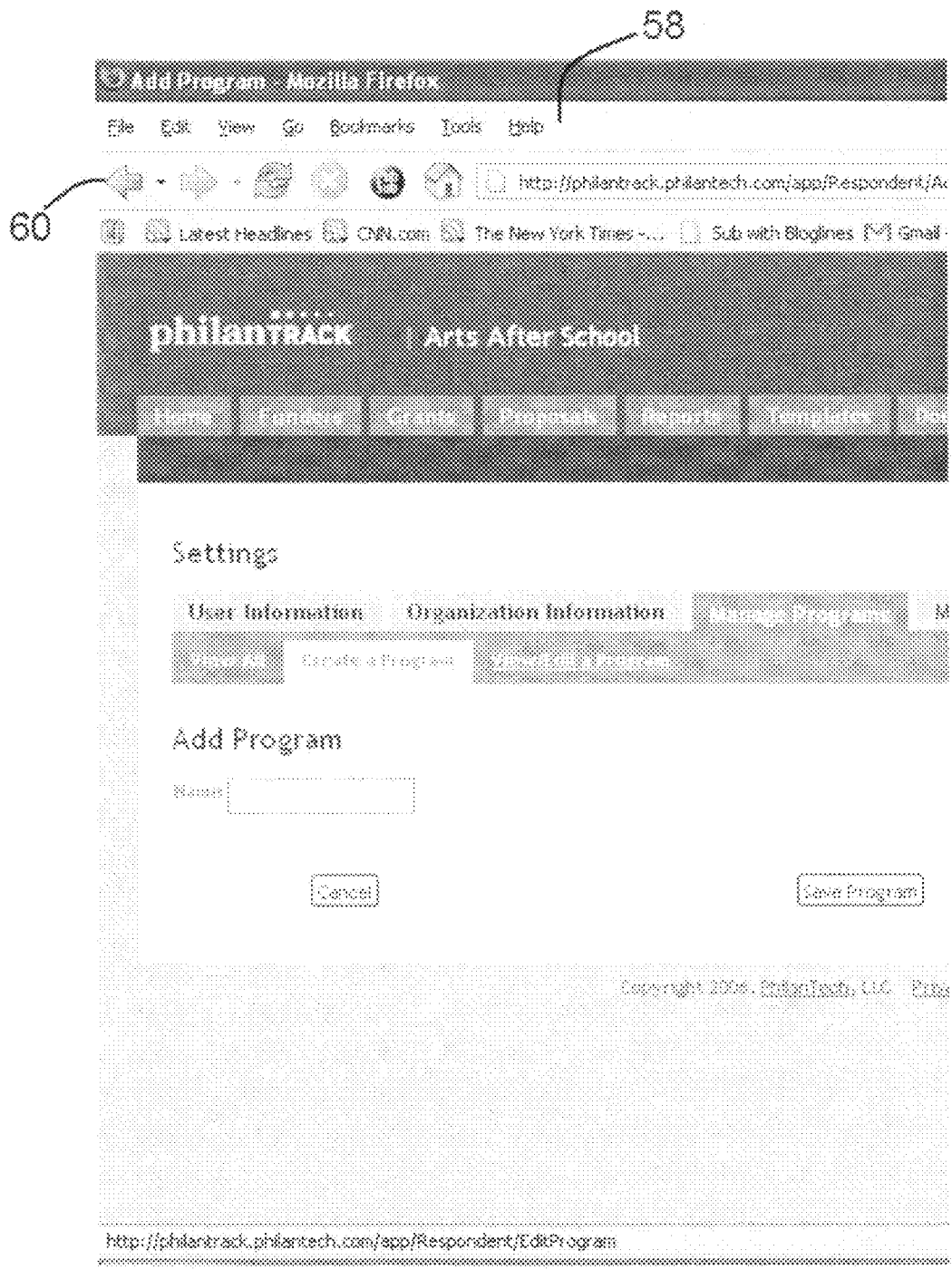
FIG. 27c illustrates an add-program tool on a settings screen.
Figure 27C:
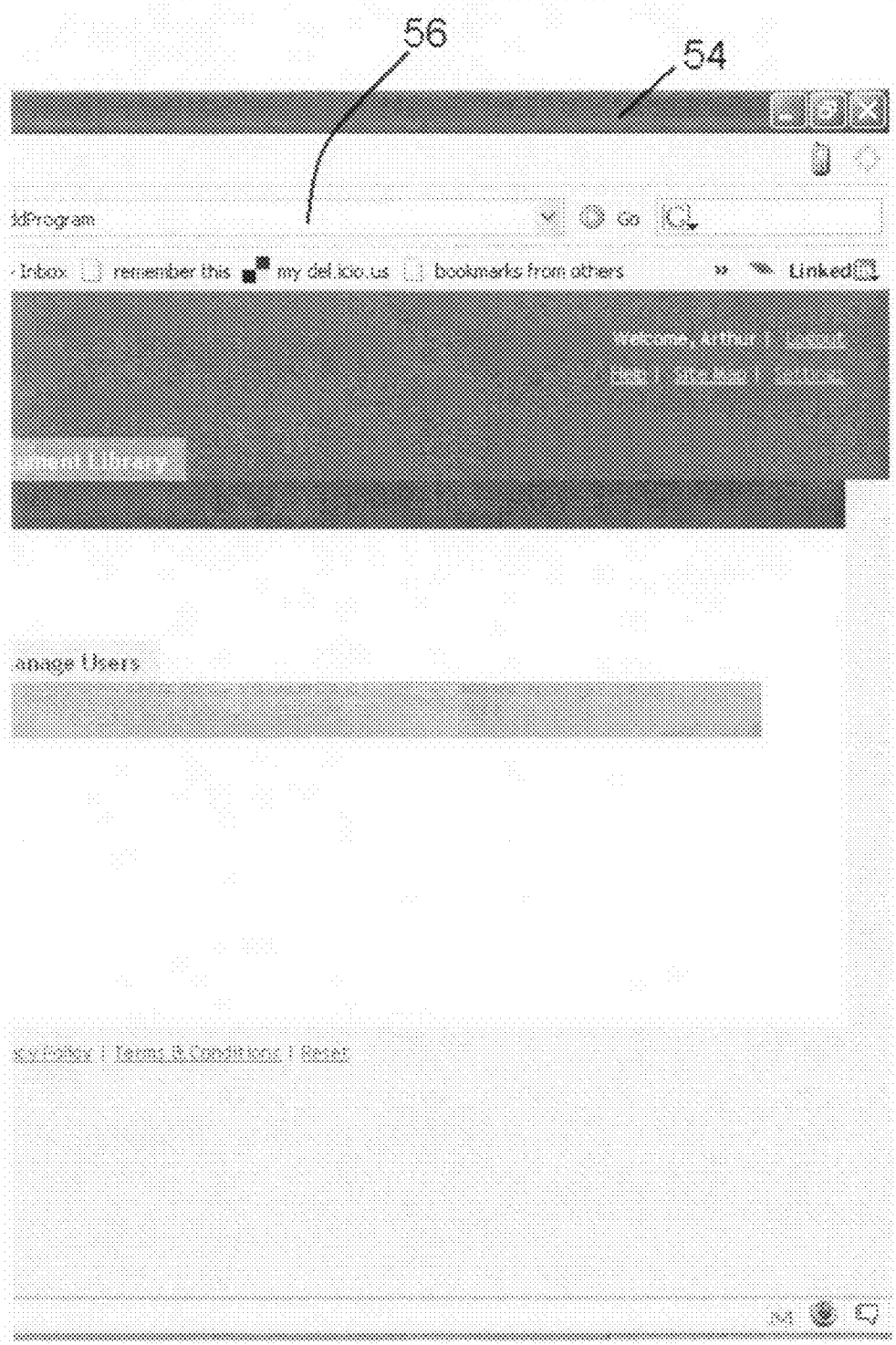

FIG. 27c illustrates an add-program tool on a settings screen, where a grantee user can add a program area by adding the name of the program. The grantee user can then save the program information using the save button or cancel using the cancel button.

Figure 28A:
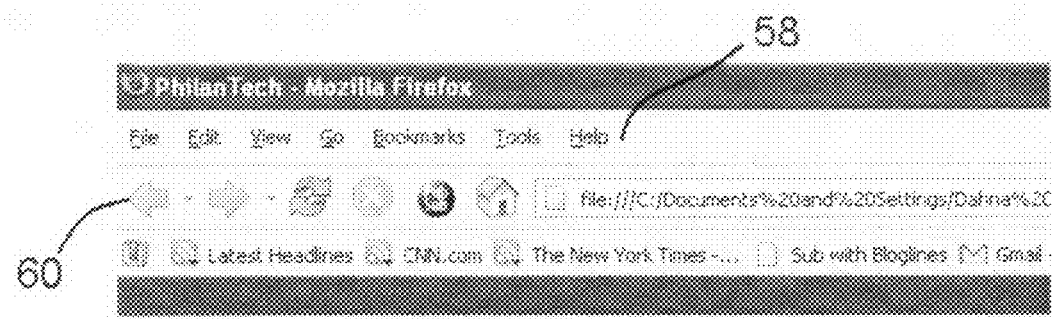
Figure 28B:
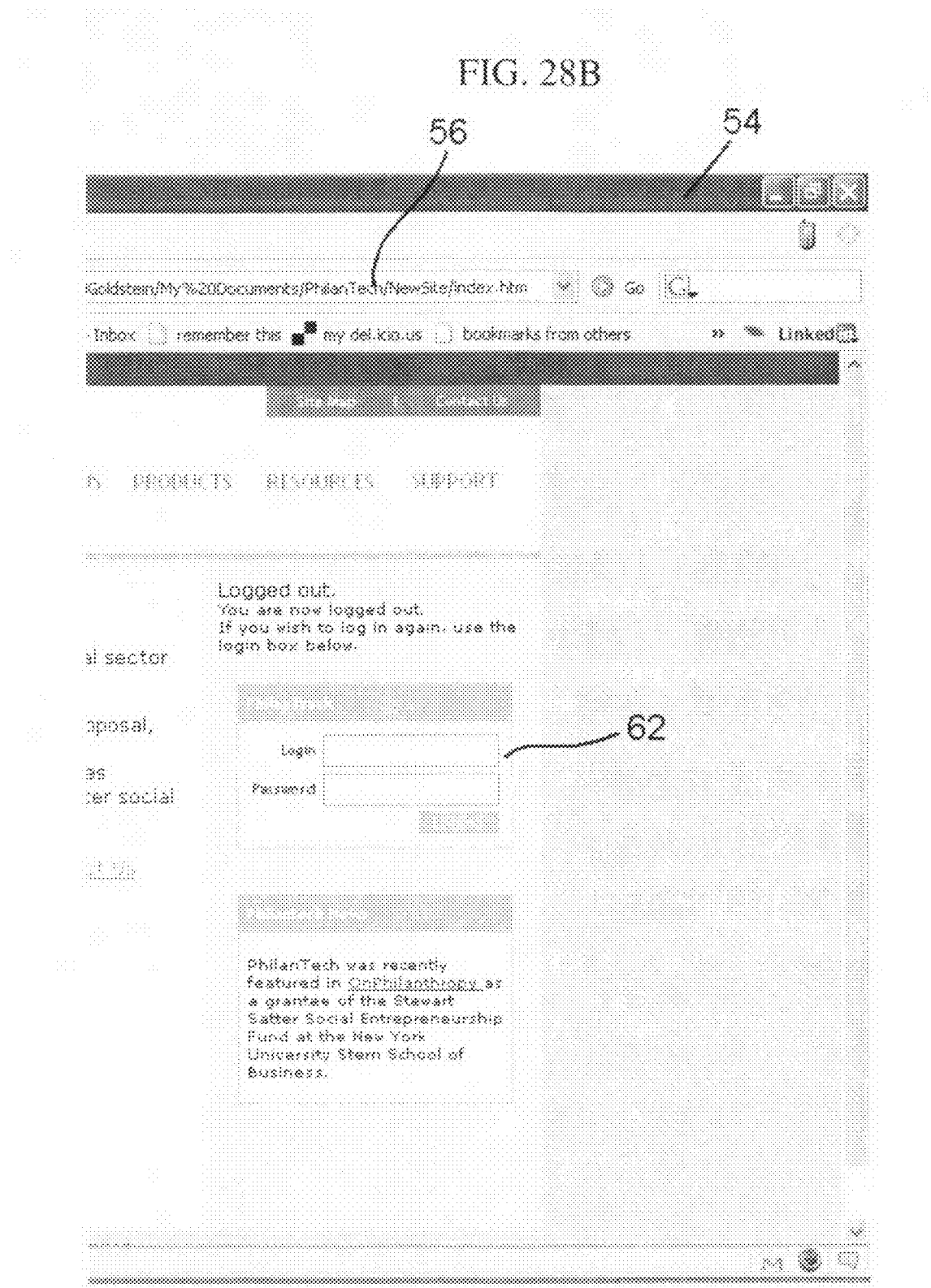

FIG. 28 illustrates a screen shot of a logout screen 210. The grantee user, once completed with using system 10 may logout. The grantee user is then shown logout screen 210, where the grantee user may log back in with login feature 62.

FIGS. 29-41 illustrate screen shots of software screens for a grantor organization 16 in grantor module 22.

Figure 29A:
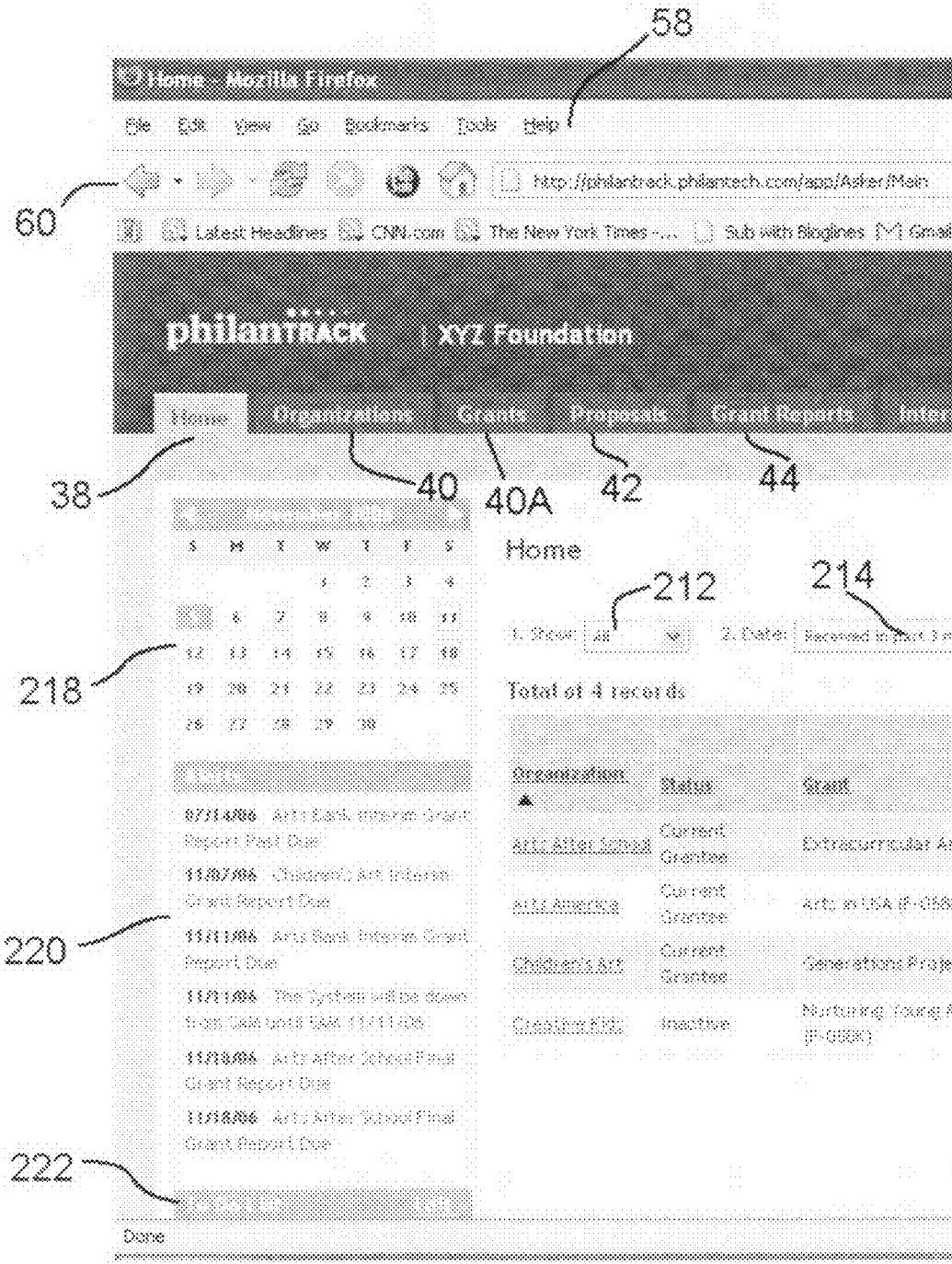
Figure 29B:
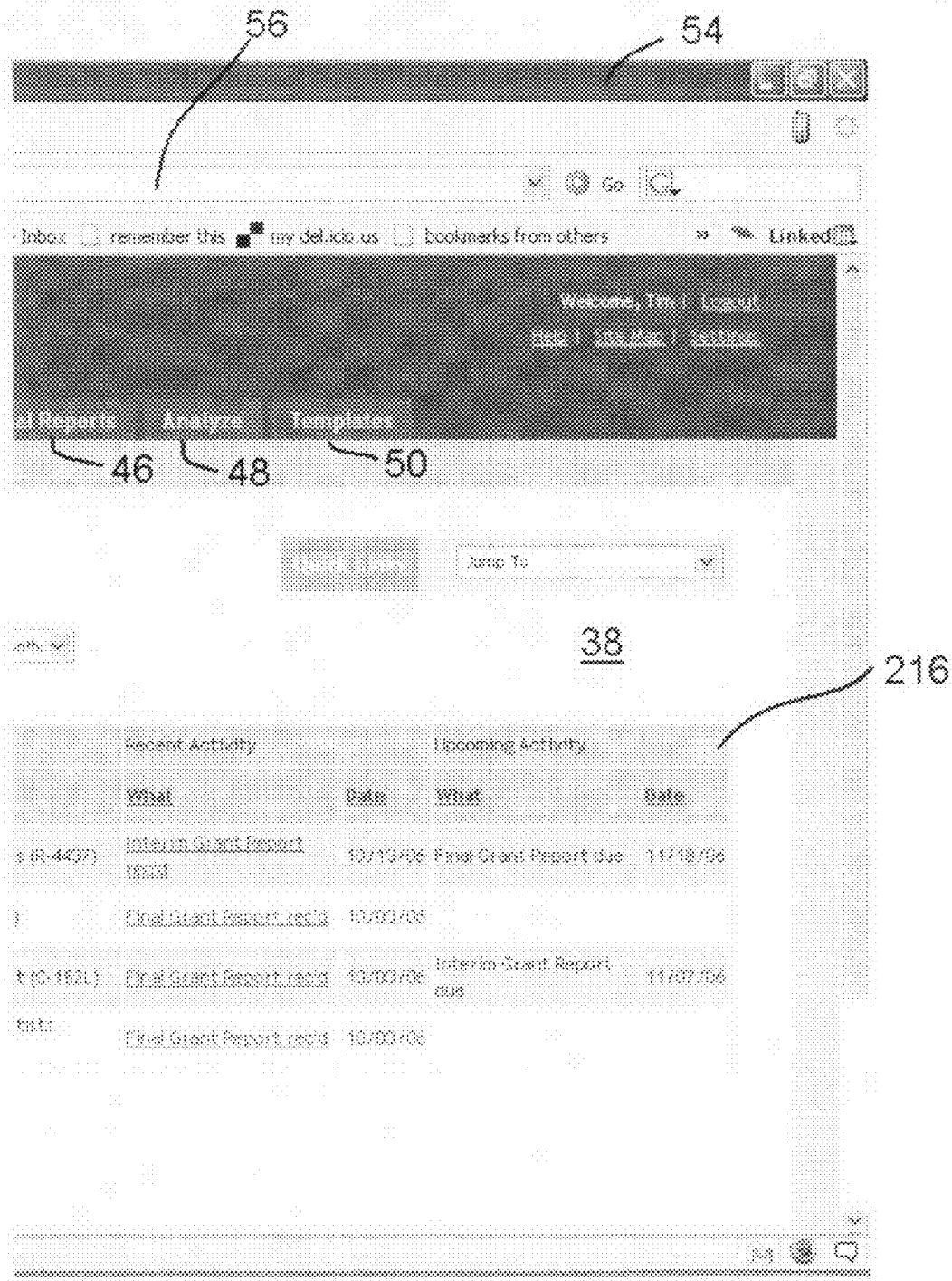

FIG. 29 illustrates a screen shot of a grantor user home page screen 38. The grantor user reaches screen 38 by logging into system 10 through login feature 62 on page 52. Login module 18 recognizes that the grantor user is associated with a grantor organization and directs the grantor user to screen 38. Grantor user home screen 38 provides a listing of all grantee organizations 14 and grants that are funded by the grantor organization 16. The grantor user may select which organizations he wishes to view with menu 212 along with a date range selected from menu 214. Table 216 provides a listing of the organizations, grant status, and recent activity for grantee organizations 14 and associated grants based on the selections made with menus 212 and 214. The grantor home screen 38 also includes a calendar 218 having graphical icons indicating due dates from table 216. Section 220 provides alerts on due dates from table 216 for the grantor user. Section 222 provides a to do list for the grantor user. The grantor home screen 38 also includes links to the organizations screen 40, grants screen 40A, proposals screen 42, grant reports screen 44, internal reports screen 46, analyze screen 48, and templates screen 50.

Figure 30A:
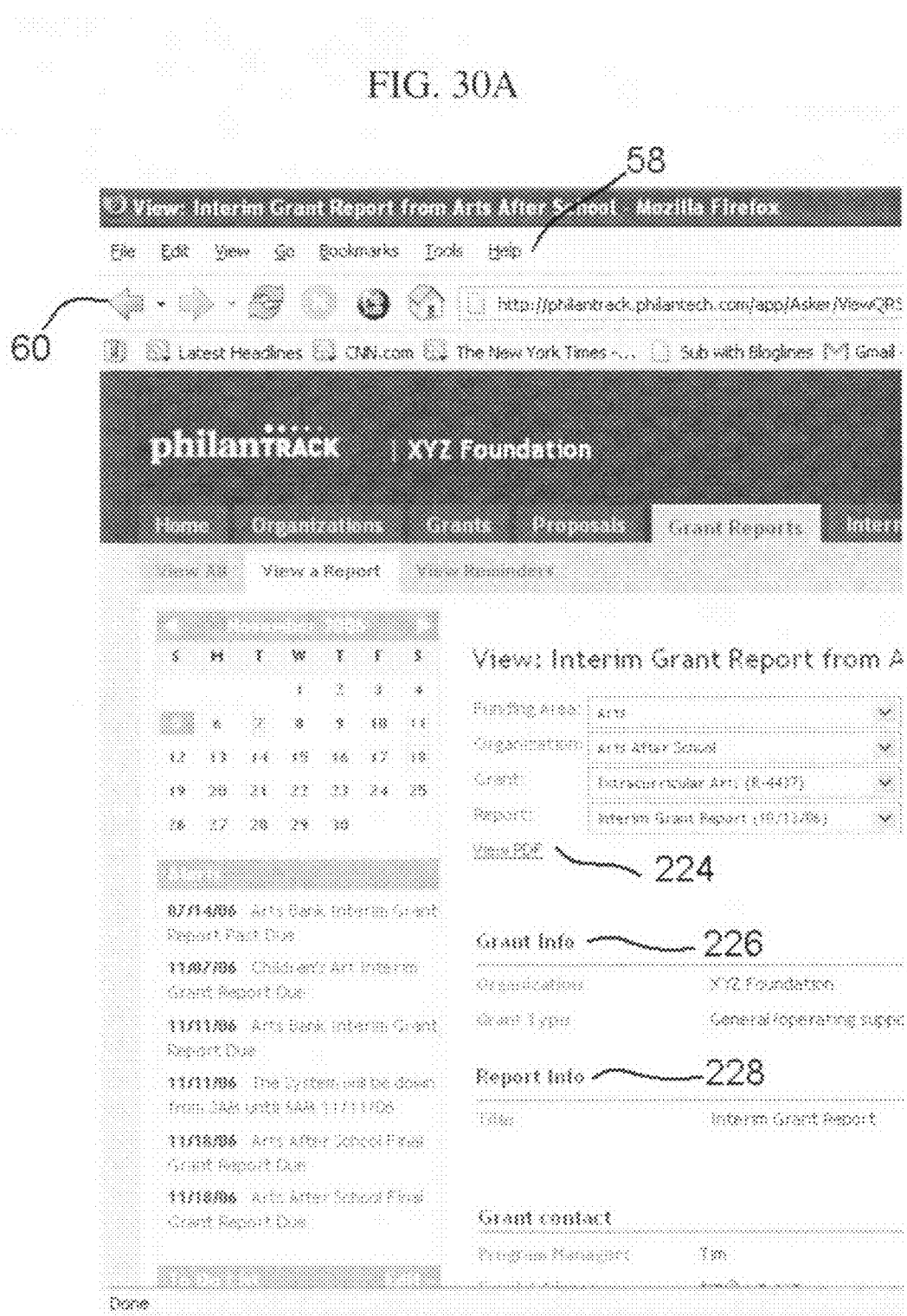
Figure 30B:
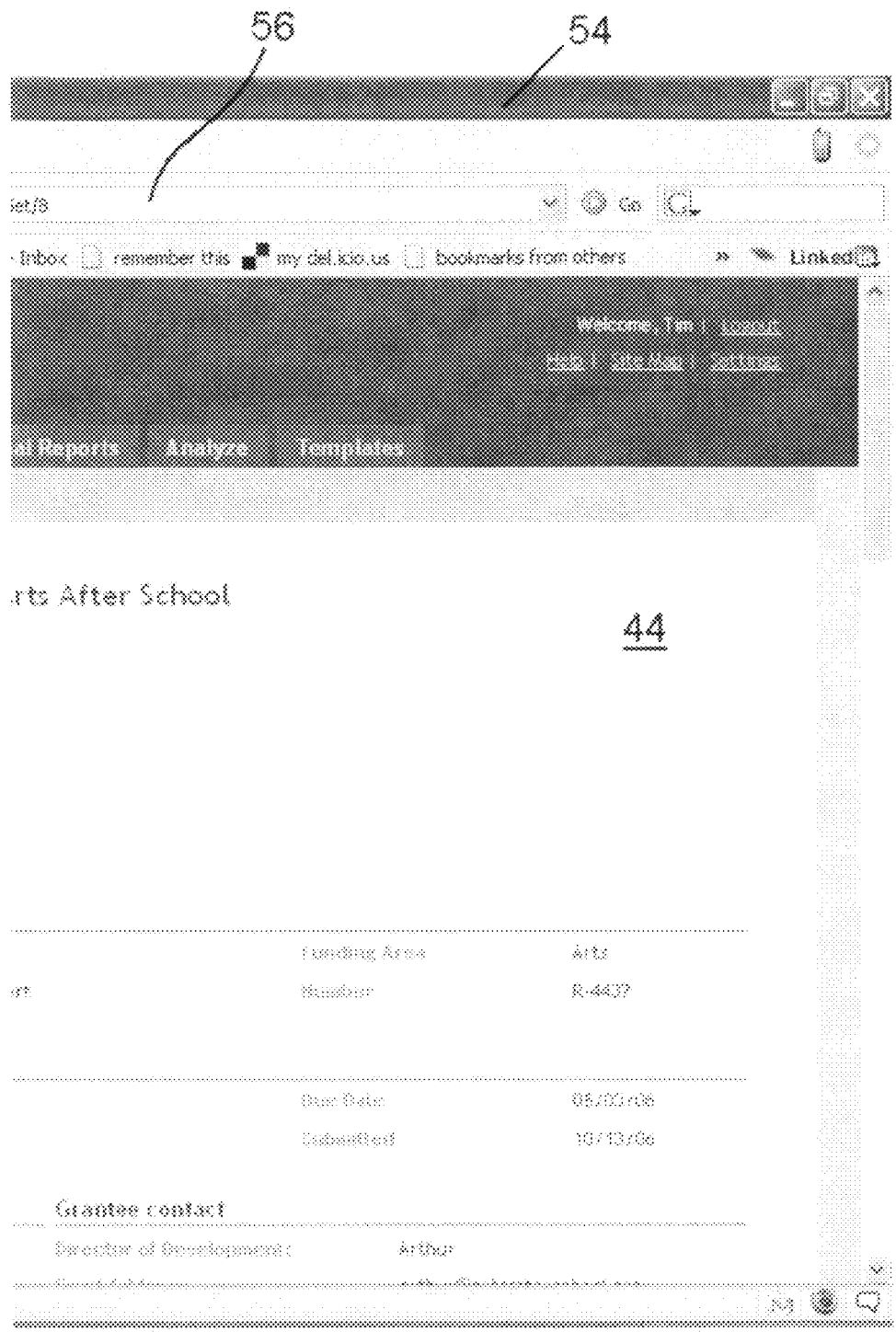

FIG. 30 illustrates a screen shot of a grant-report screen 44 for viewing grants made by the grantor organization 16. With button 224, the grantor user may view a particular grant report in PDF format. Grant information a selected grant is shown on screen 44 in region 226. Information on the report concerning the grant is shown in region 228.

Figure 31A:
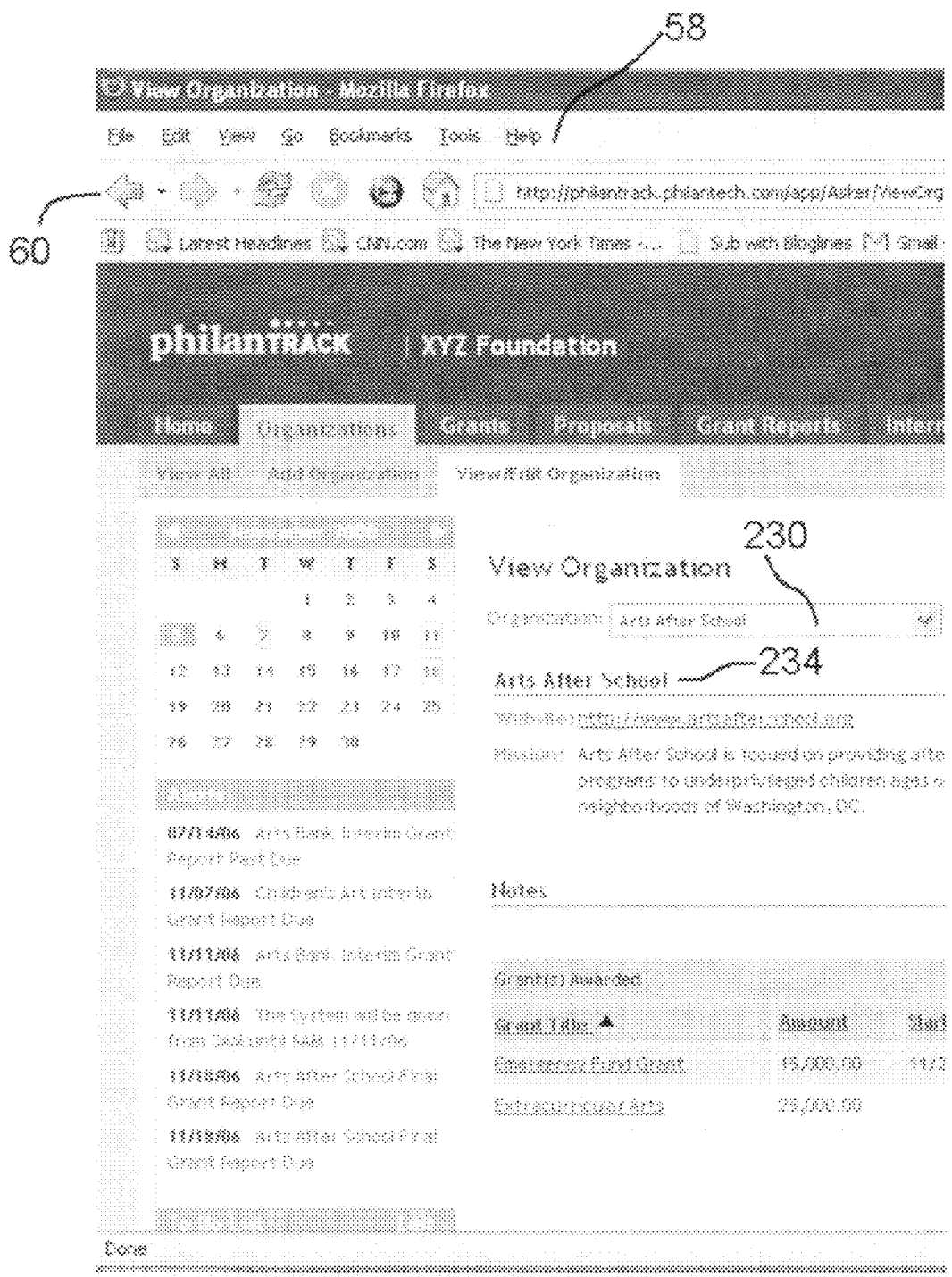
Figure 31B:
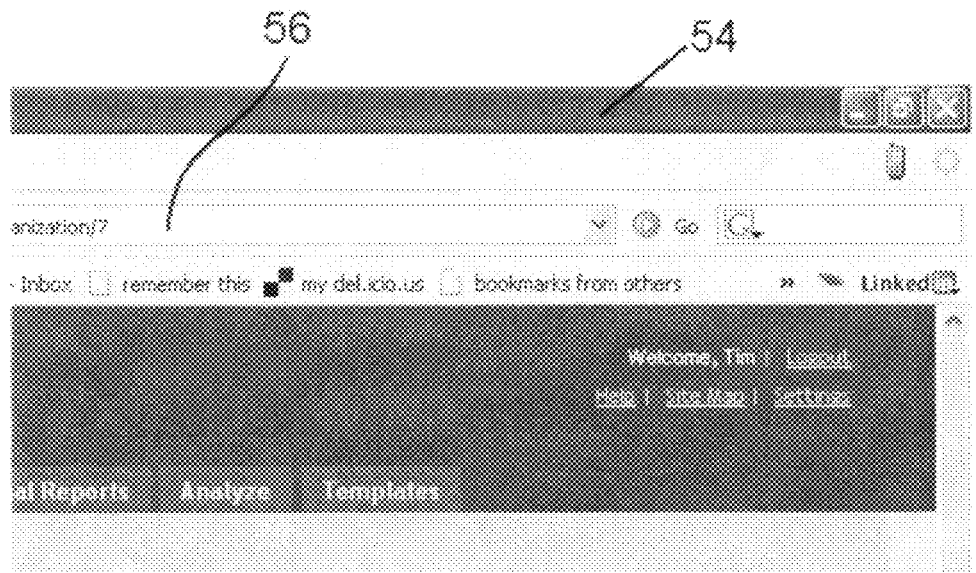

FIG. 31 illustrates a screen shot of a view/edit organizations screen 40. The grantor user may select a particular grantee organization 14 to view with menu 230. The grantor user may then select what information that they wish to view about the grantee organization with menu 232. In this example, the grantor user selected a summary, which is then displayed in region 234. A table 236 lists the grants made to the organization selected in menu 230. Table 236 lists the grant title, grant amount, grant number, grant start date, funding area, and type of grant.

Figure 32A:
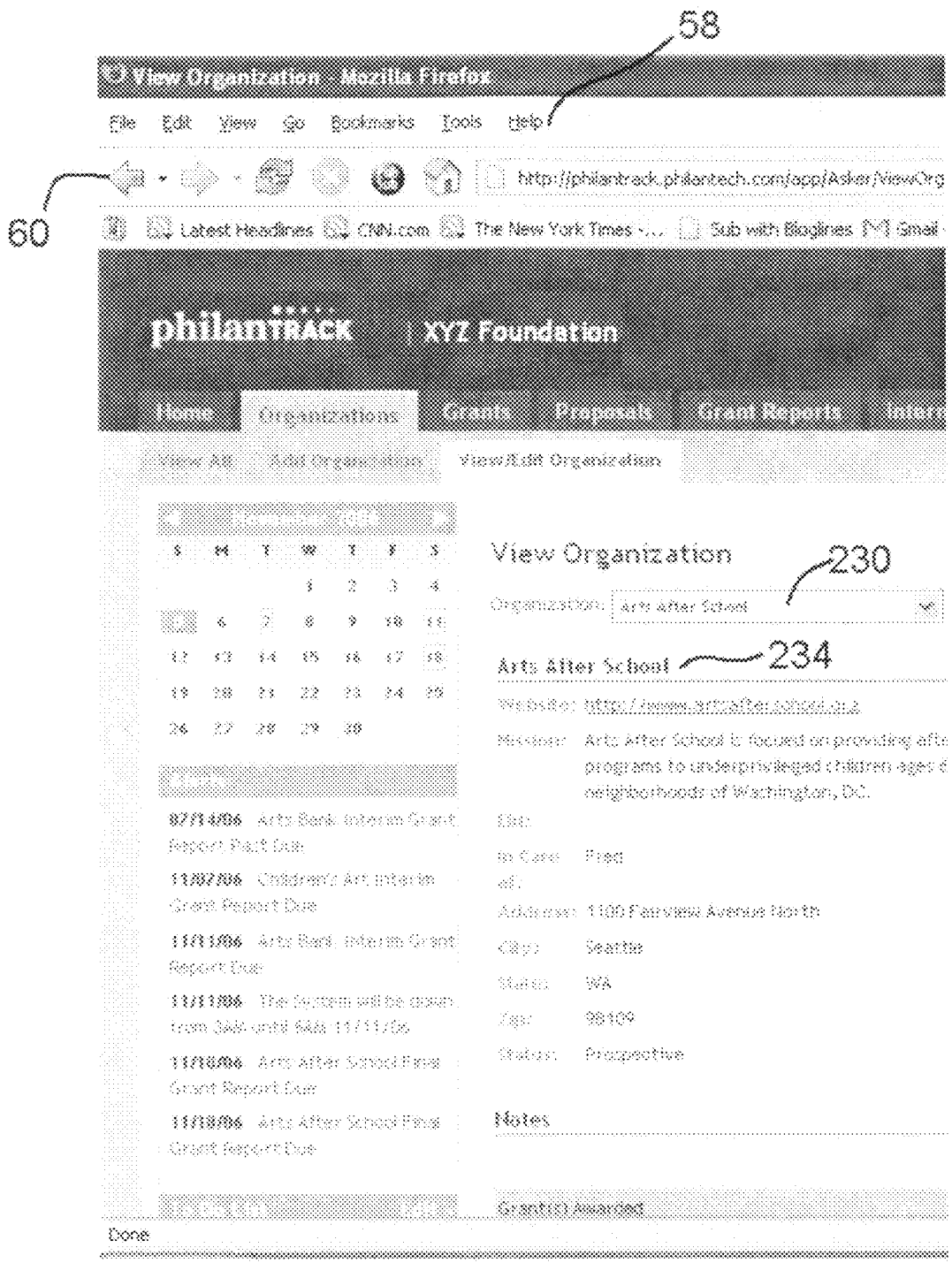
Figure 32B:
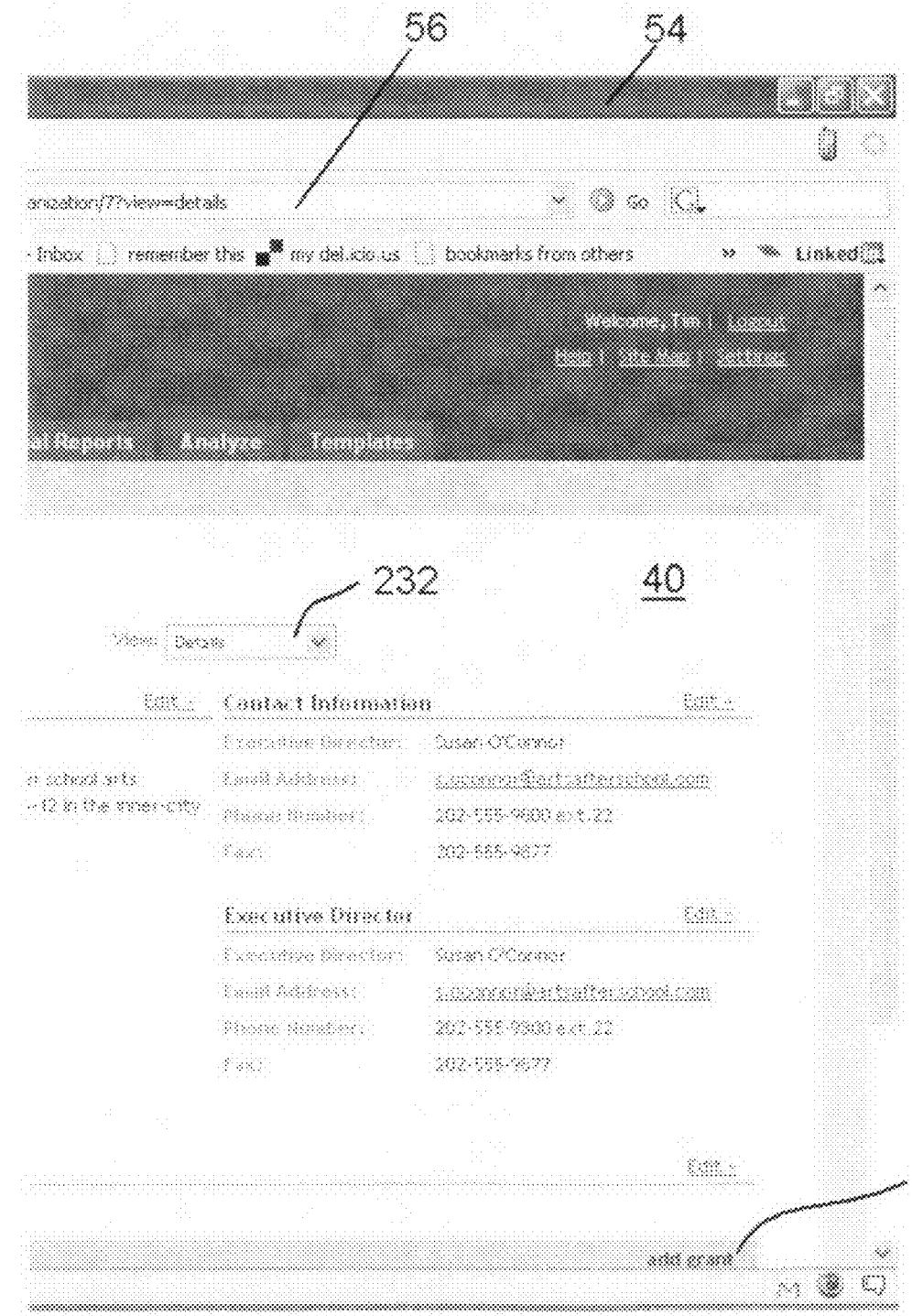

FIG. 32 illustrates a screen shot of a view/edit organizations screen 40 showing information for a particular grantee organization. In this example screen display, the grantor user selected a particular grantee organization 14 from menu 230 and selected to view detailed on that organization with menu 232. The detailed information is then shown in region 234.

Figure 33A:
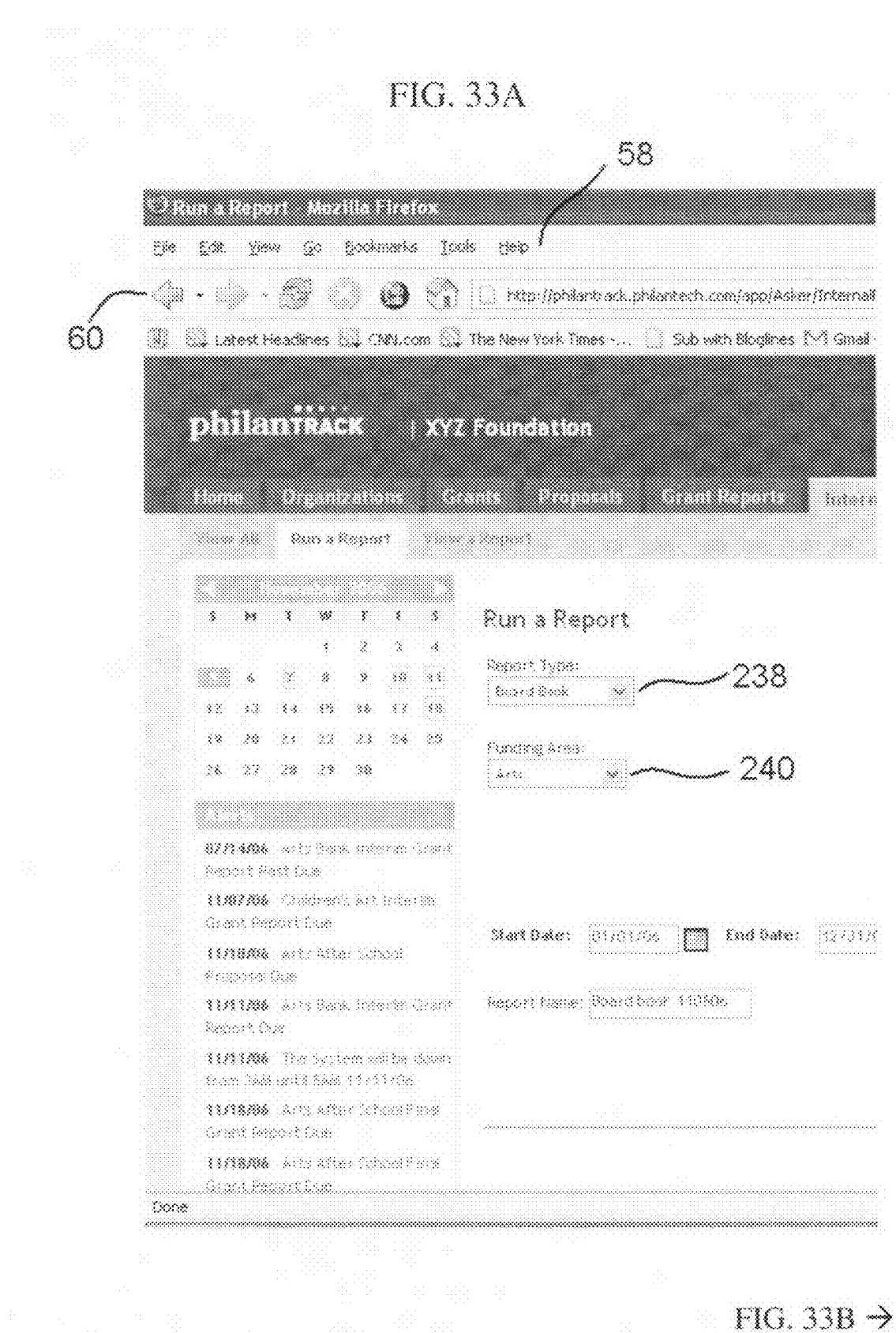
Figure 33B:
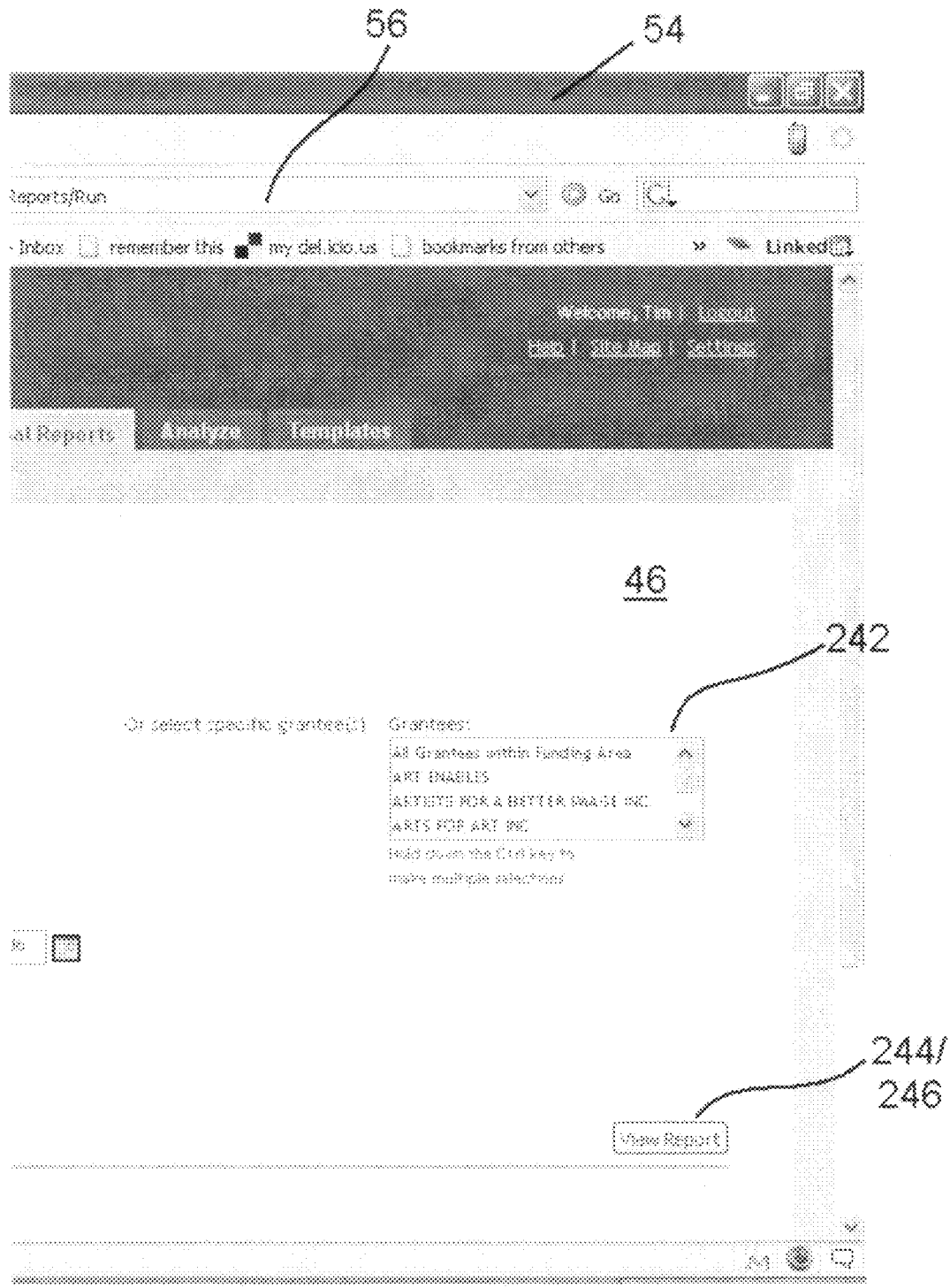

FIG. 33 illustrates a screen shot of an internal-report screen 46. The grantor user may select a report type to view from menu 238. The grantor user may select a funding area to view using menu 240. The grantor user may select a particular grantee to view using menu 242. The grantor user may then view the selected report with button 244 onscreen. Alternatively, the user may select button 246 to view the report onscreen or in PDF or word processing format.

Figure 34A:
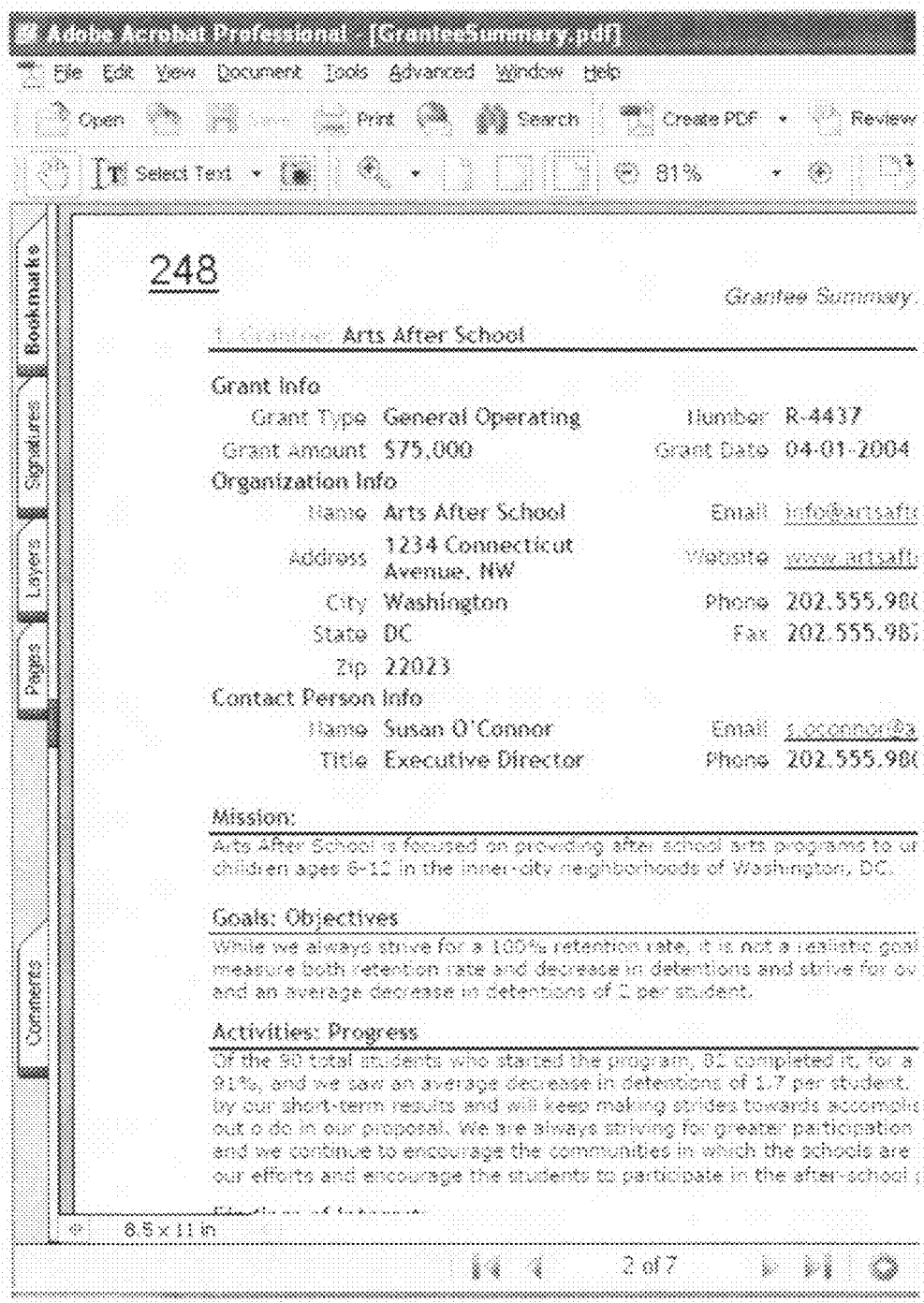
Figure 34B:
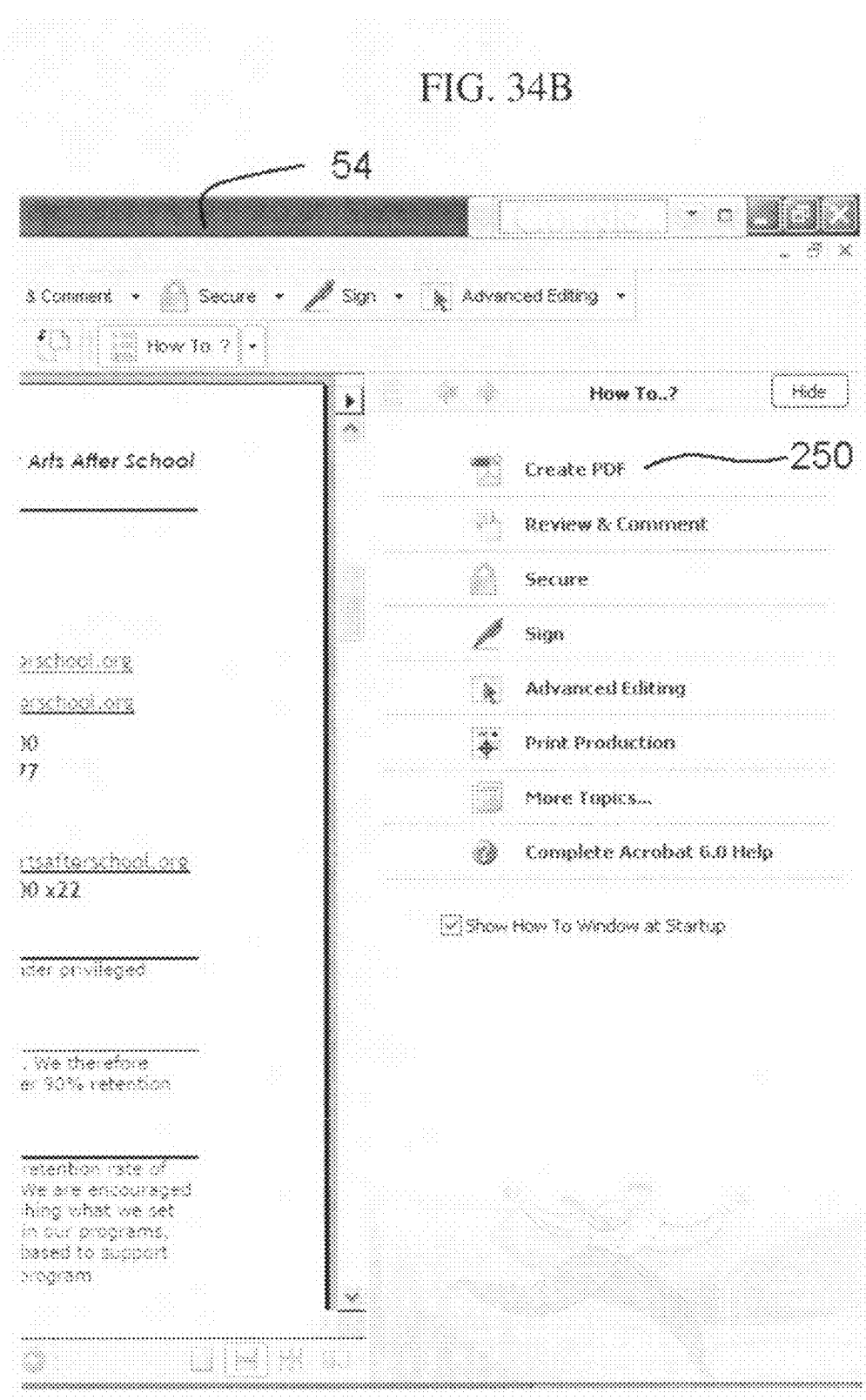

FIG. 34 illustrates a screen shot of a view-report-in-PDF-format screen. Using button 244, the grantor user may view the report selected with menus 238, 240 and 242 to view a report 248 in PDF format. Menu 250 allows the grantor user to manage the PDF document.

Figure 35A:
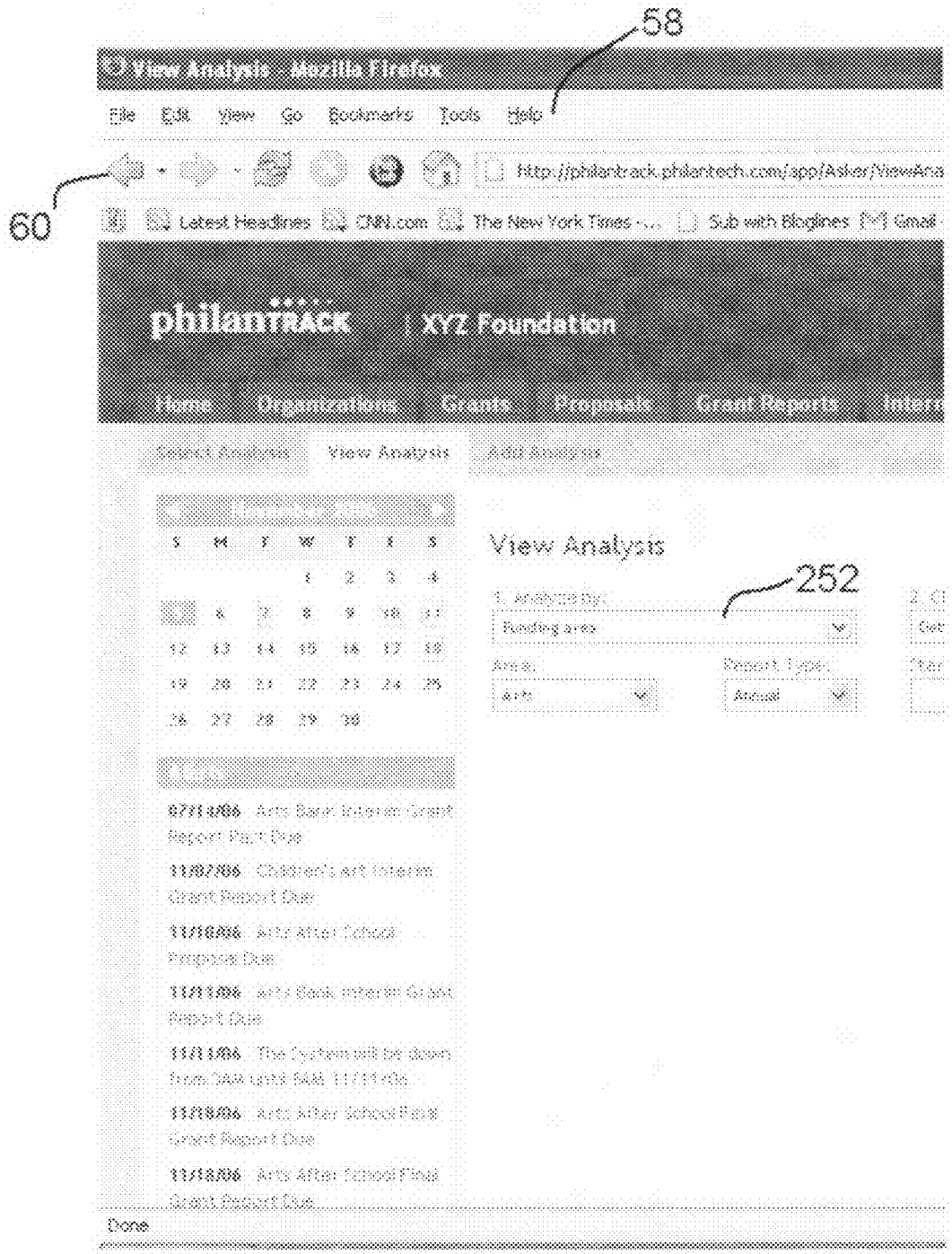
Figure 35B:
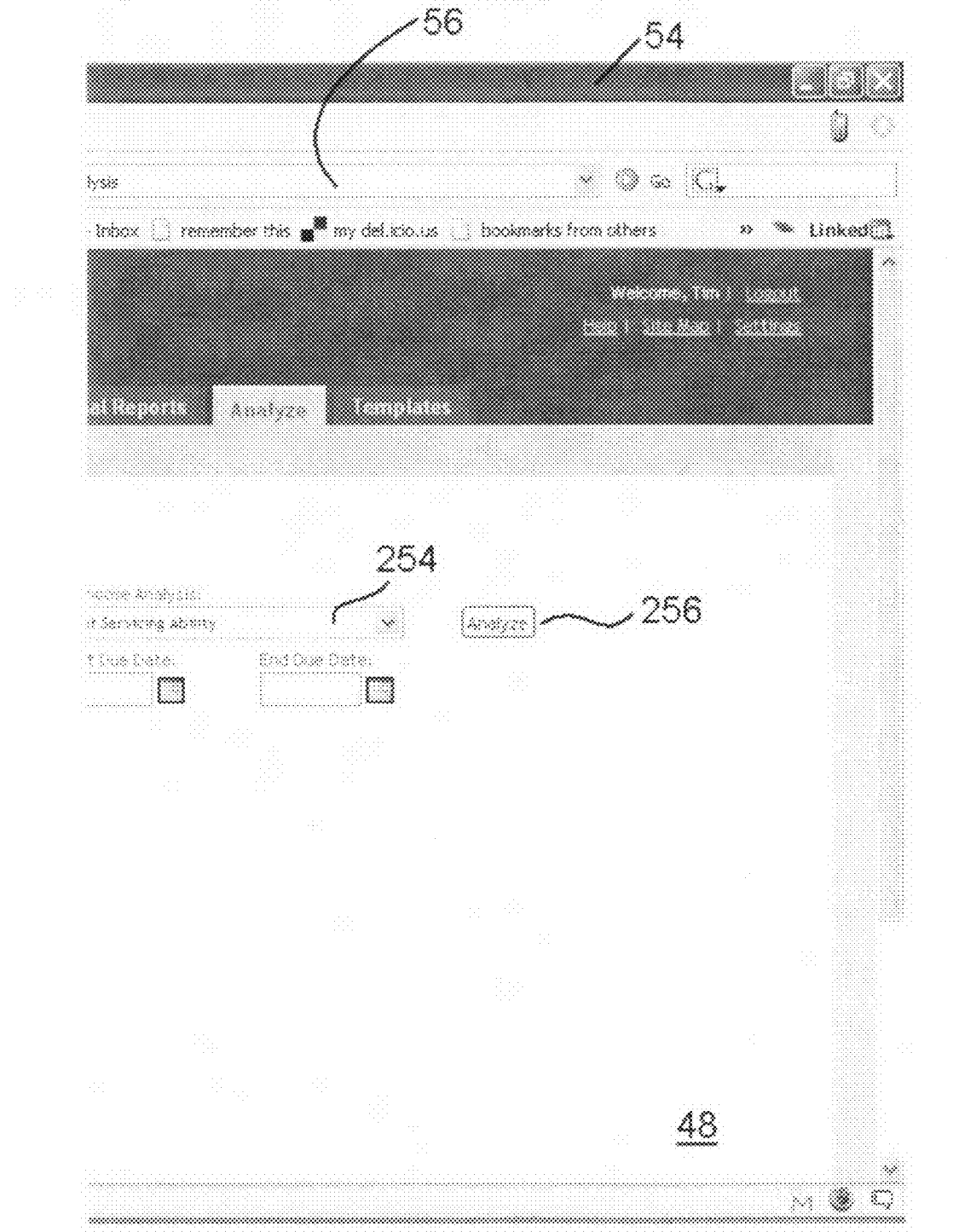
Figure 40A:
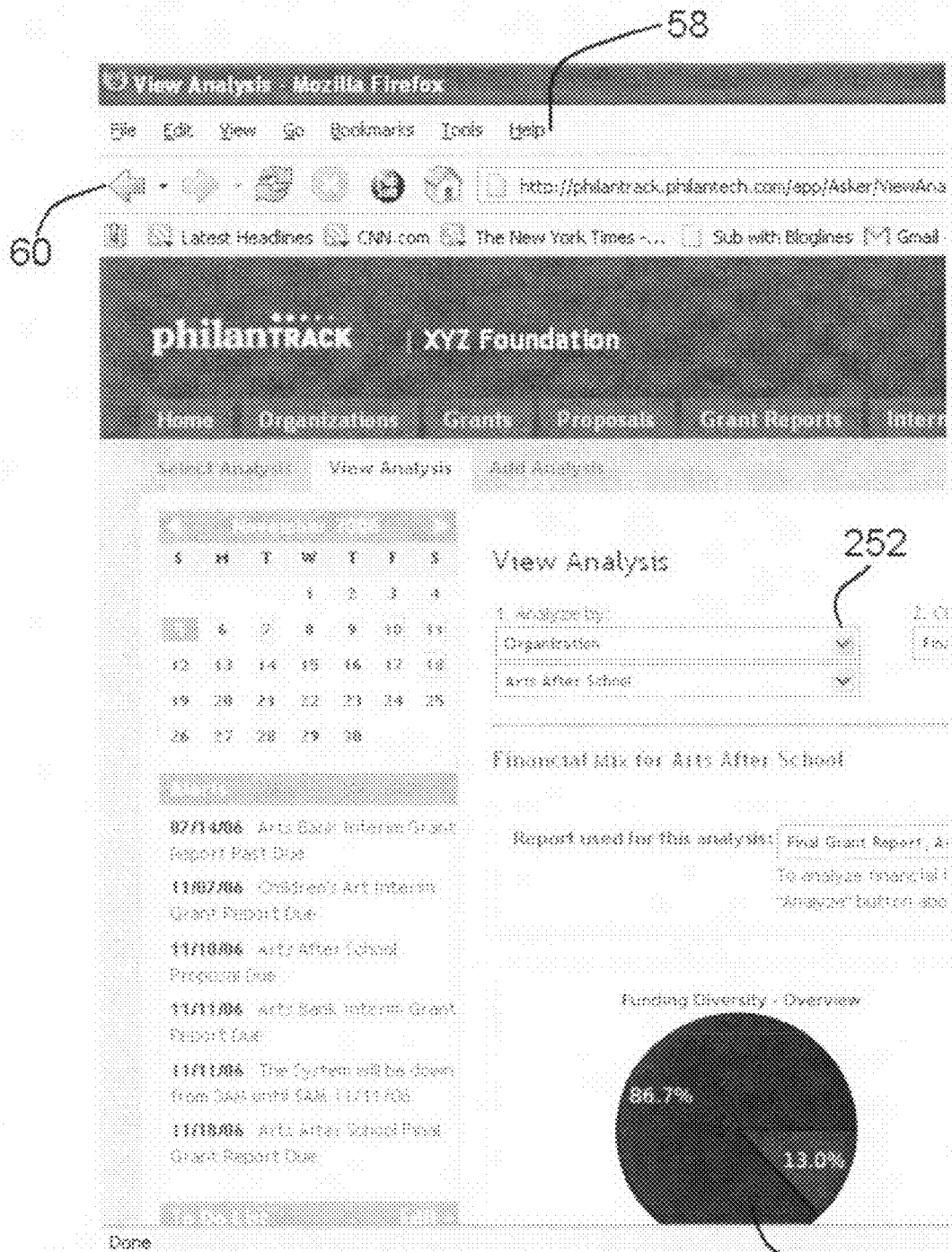
Figure 40B:
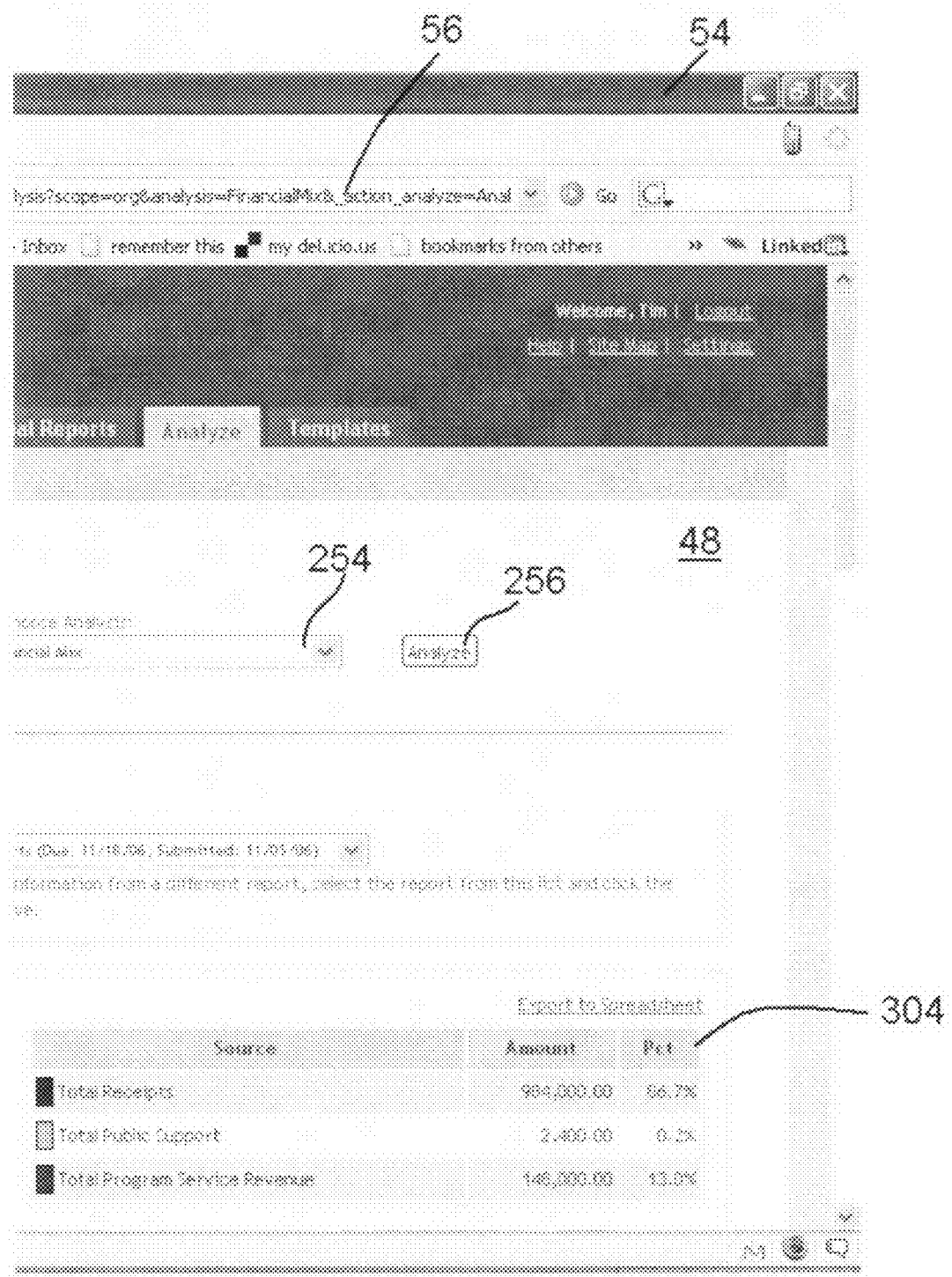
Figure 41A:
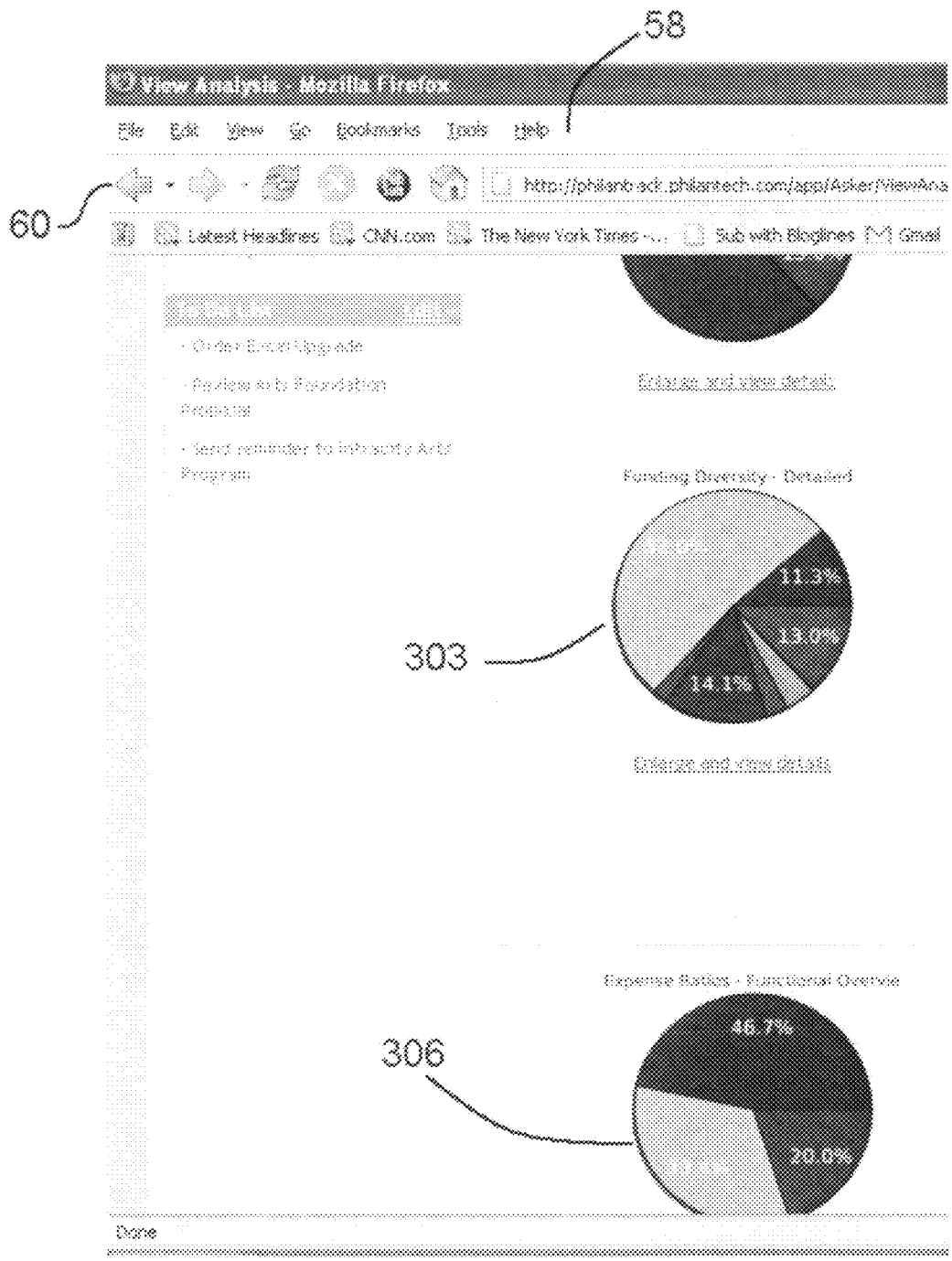
Figure 41B:
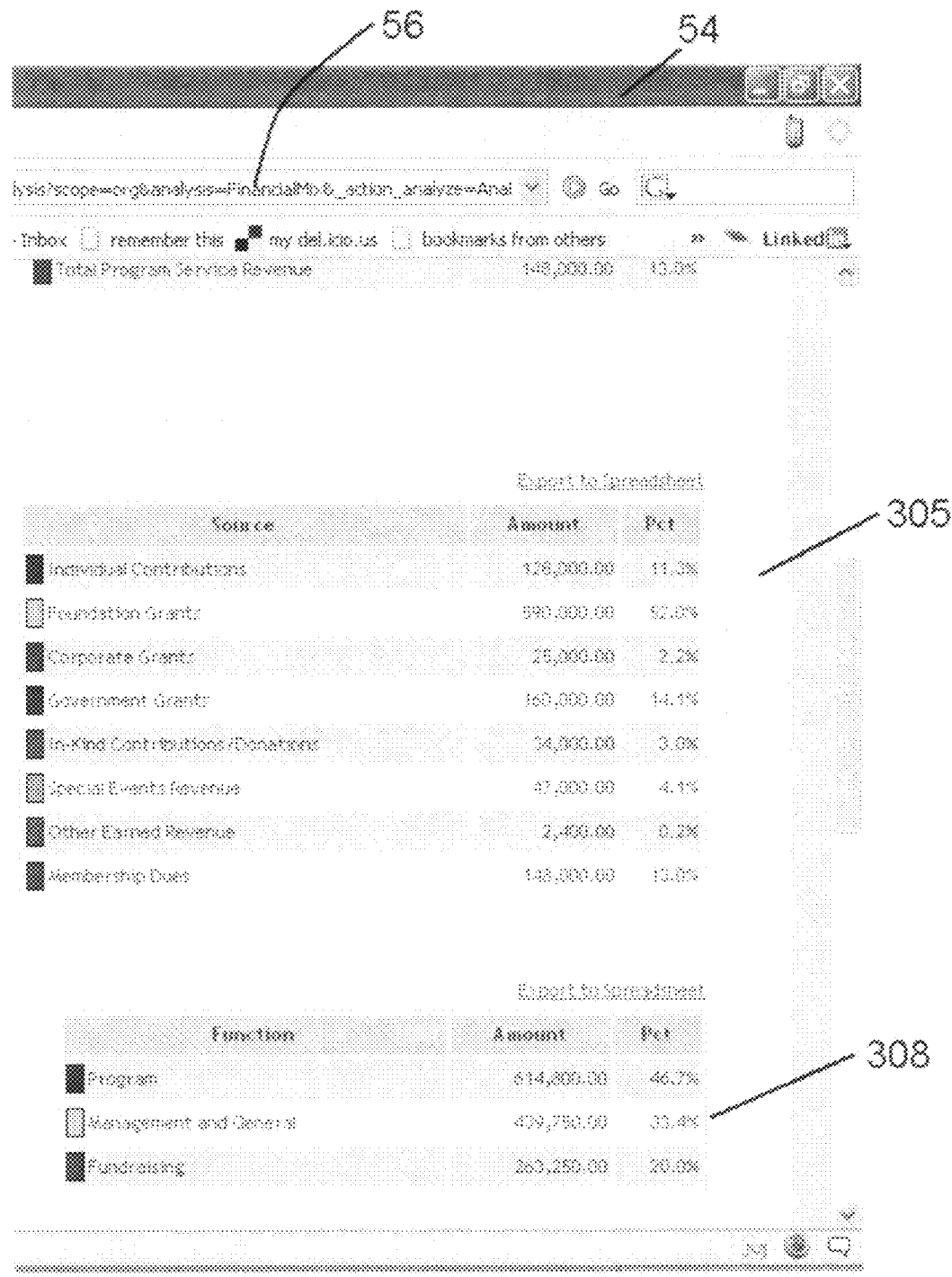

FIG. 35 illustrates a screen shot of a view-analysis screen 48. The grantor user can use menu 252 to select grants based on category for analysis. The grantor user can then use menu 254 to select a type financial analysis to perform on the selected category of grants. The user can then perform the analysis using button 256. The resulting analysis is shown in FIGS. 40 and 41.

FIG. 36 illustrates a screen shot of a view/edit-template screen 50. As with the grantee user, the grantor user is provided with templates to generate proposals or reports for the grantee user to respond to for requests for proposals and the reporting requirements associated with the grant. The grantor user may select a template from menu 258. The user may then edit the template by using move buttons 260 to move questions 262 around, or by using buttons 264 to remove the particular question 262.

Figure 36A:
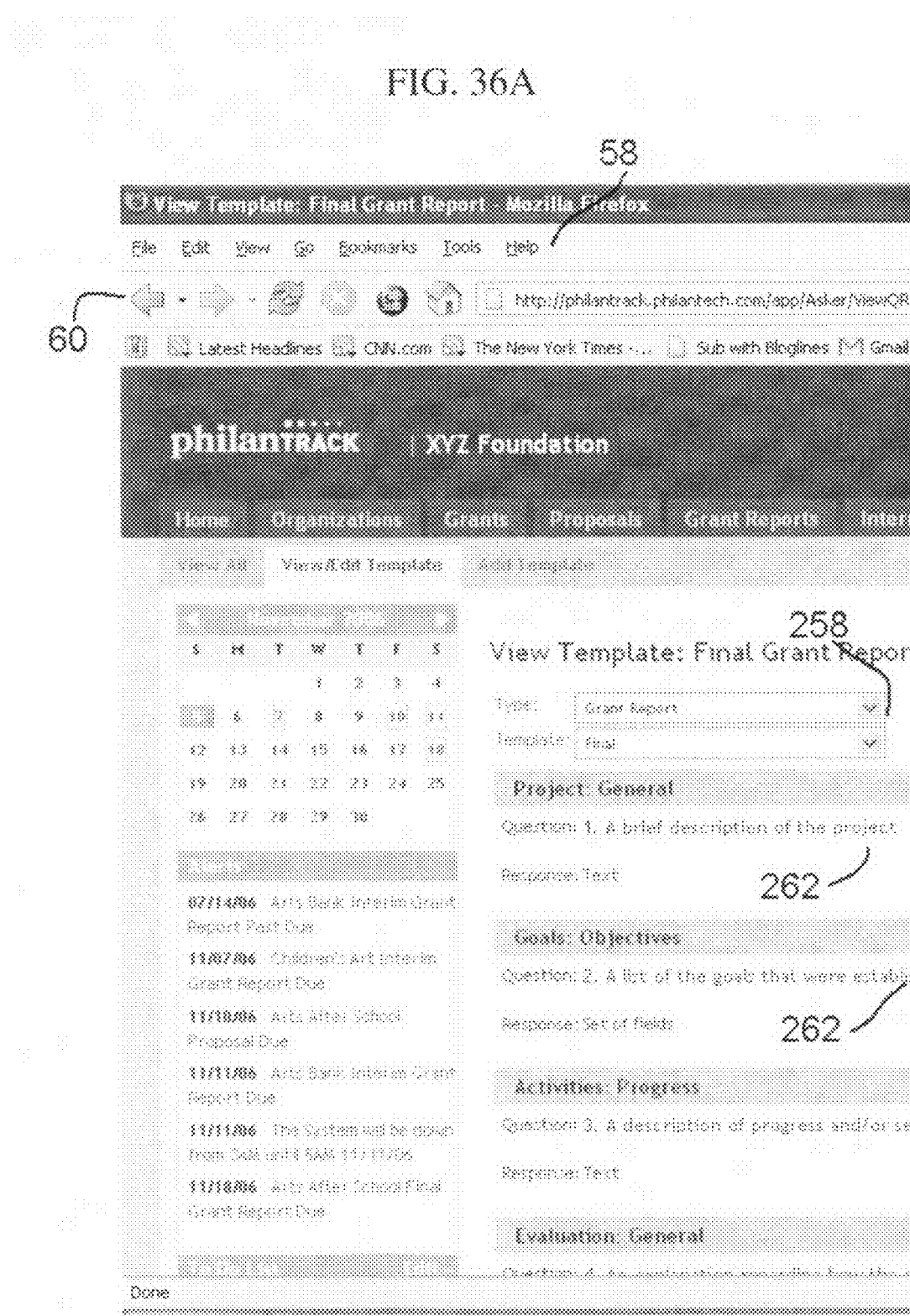
FIG. 36a illustrates a screen shot of a view all templates screen.

FIG. 36a illustrates a screen shot of a view all templates screen, where a grantor user can view all templates including name, type, funding area, number of questions, date last modified, and actions to be taken. The list of templates displayed can be narrowed by funding area.

Figure 36B:
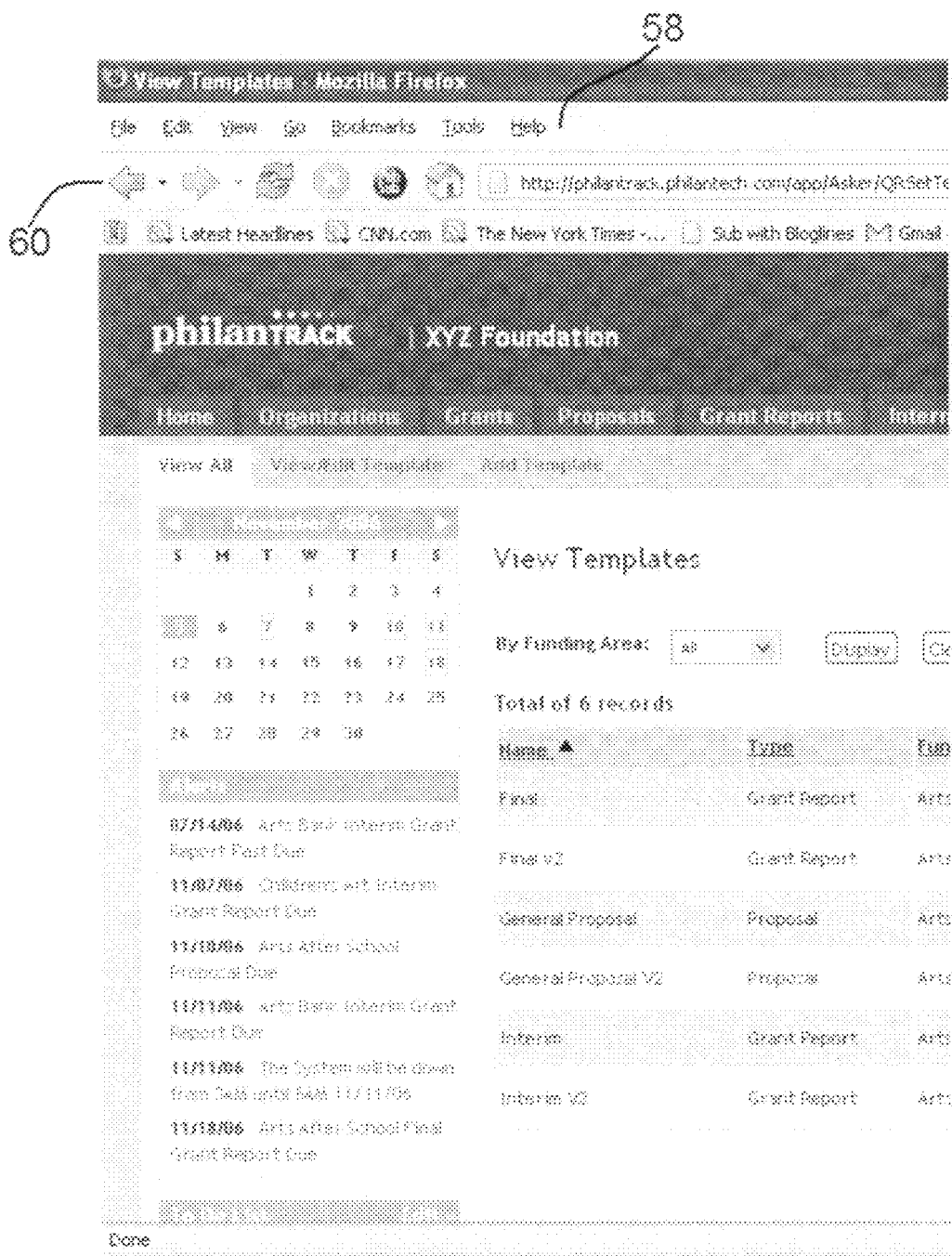
FIG. 36b illustrates a screen shot of an add template screen.
Figure 36A:
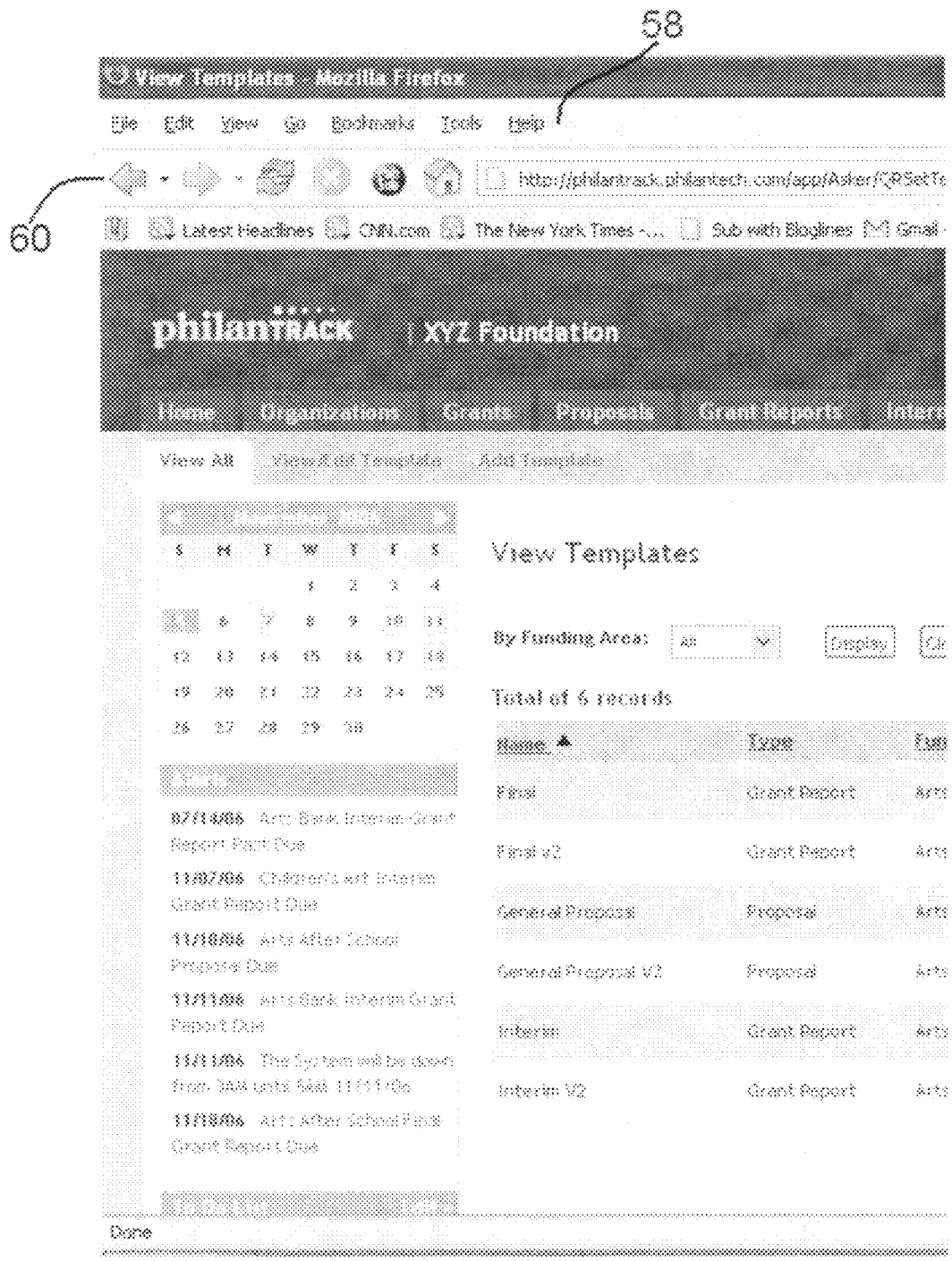
Figure 36A:
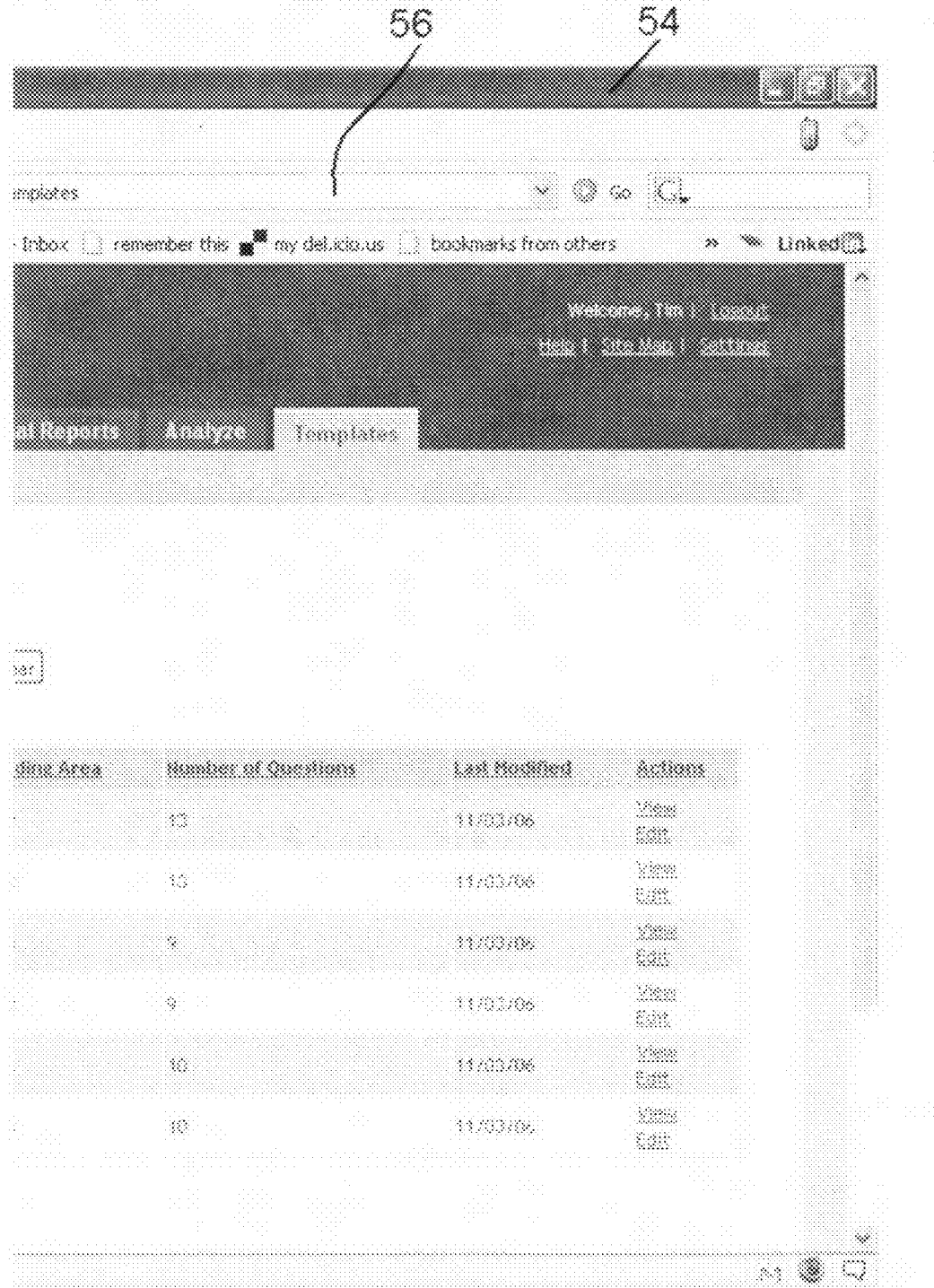
Figure 36B:
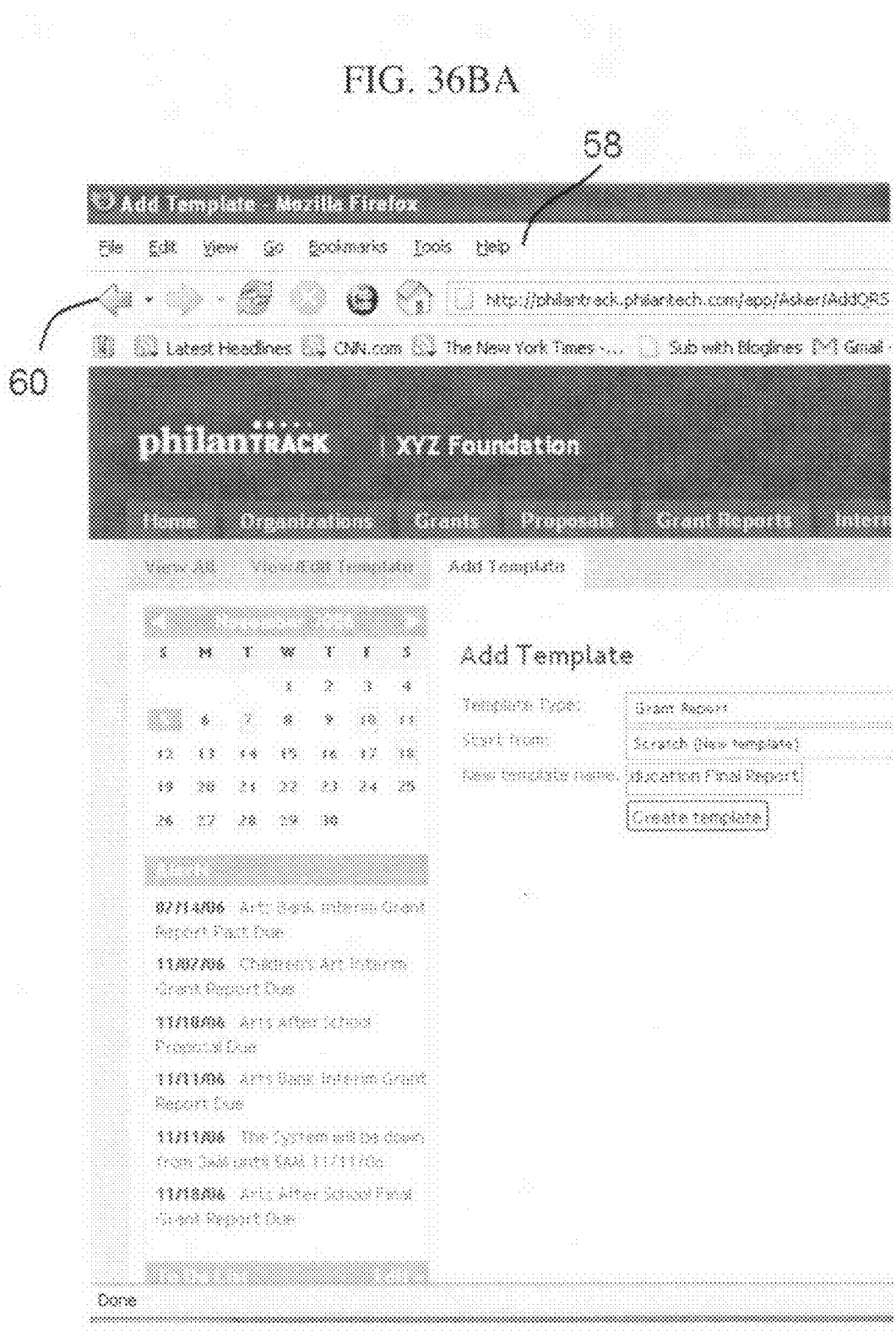
Figure 36B:
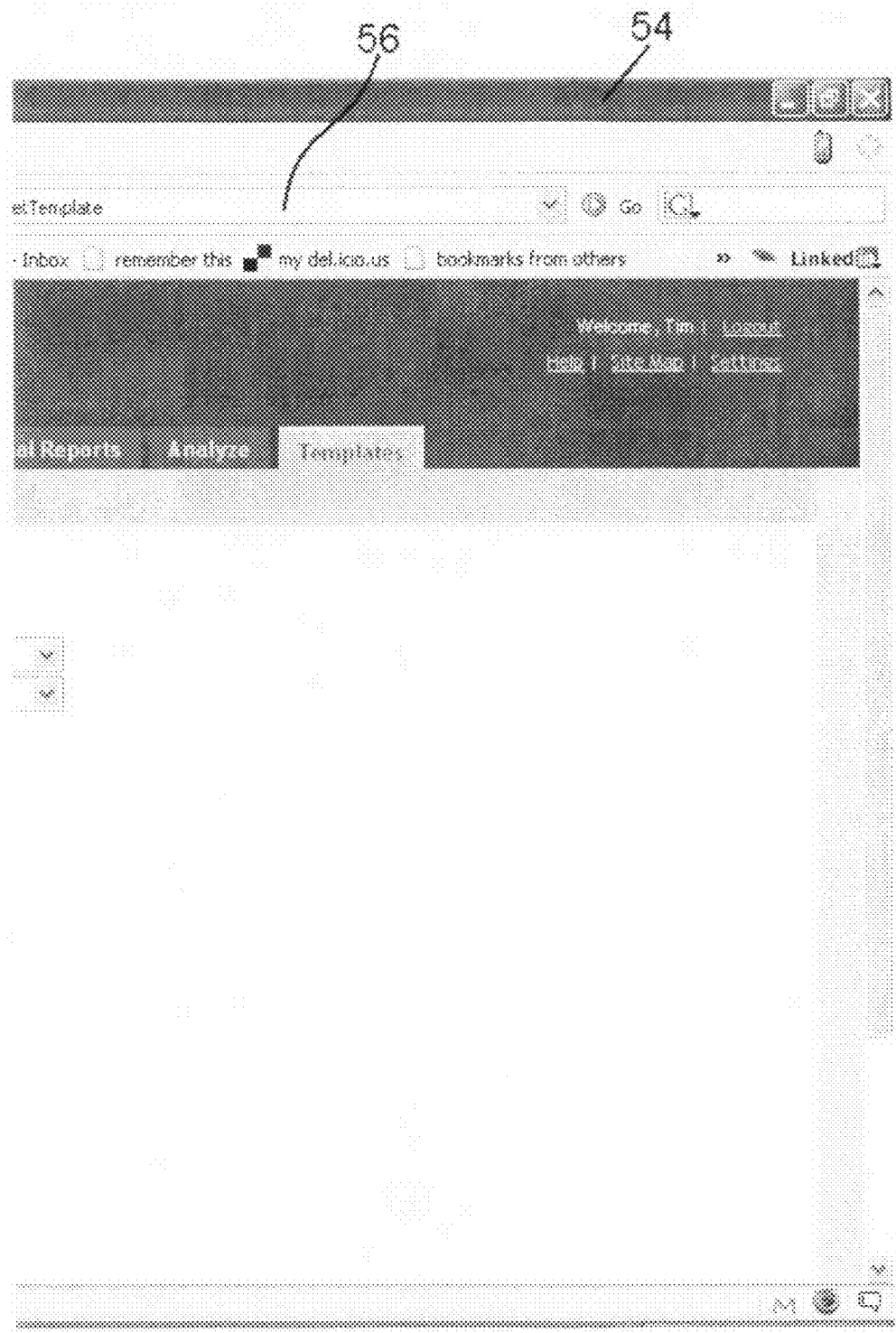

FIG. 36b illustrates a screen shot of an add template screen, where a grantor user can add a template by selecting template type, whether to start from scratch or from an existing template, and specifying a name for the template. The grantor user can begin to create the template by clicking the create template button.

Figure 36C:
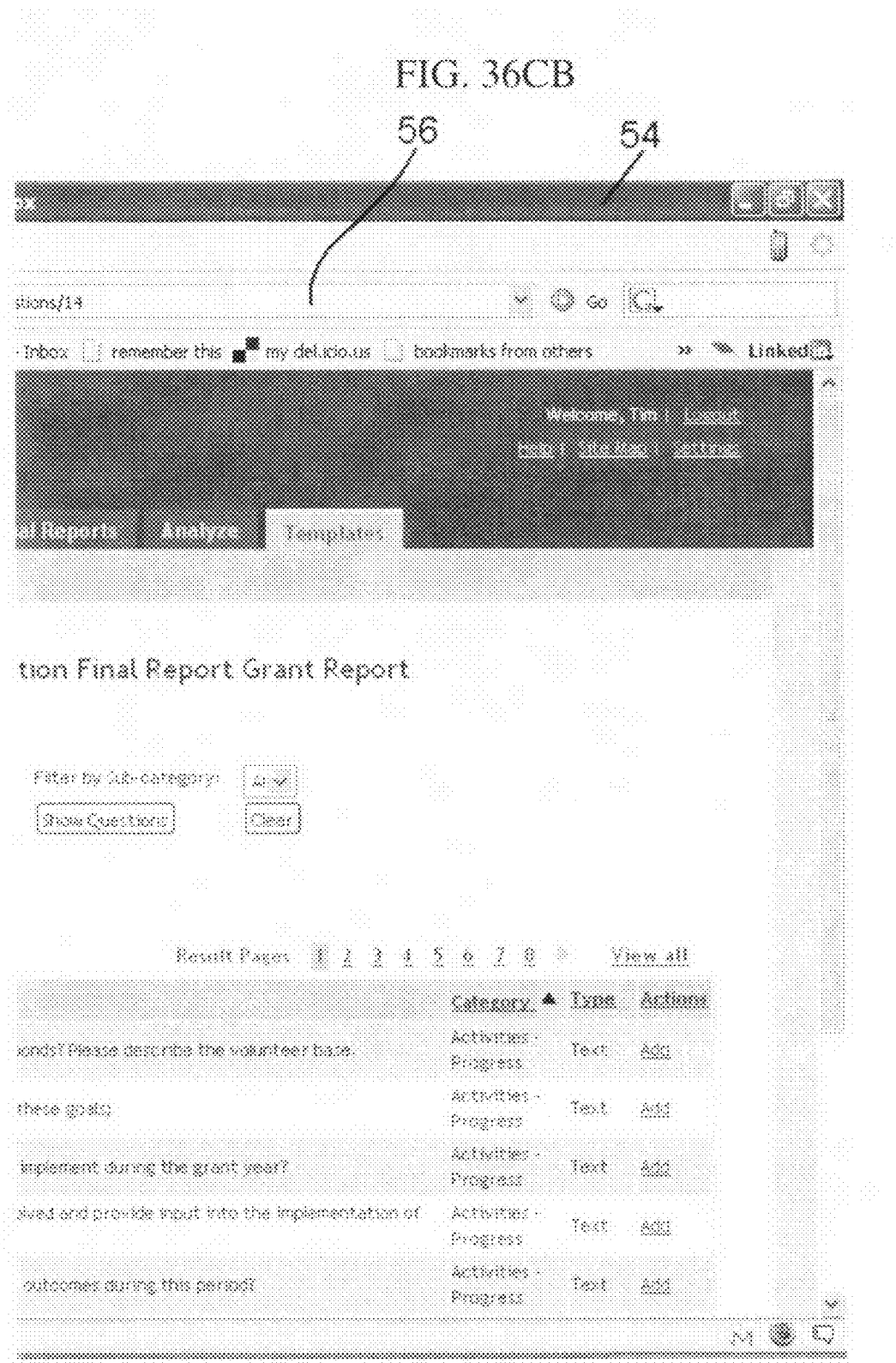
FIG. 36c illustrates a screen shot of a build template tool on a template screen.

FIG. 36c illustrates a screen shot of a build template tool on a template screen. The build template tool provides the grantor user with the ability to search for and select questions from the PhilanTrack database. The grantor user can then add a question from a list of search results to the template for a grant report or a grant proposal. The grantor user can add questions, view the template, or edit the template.

Figure 37A:
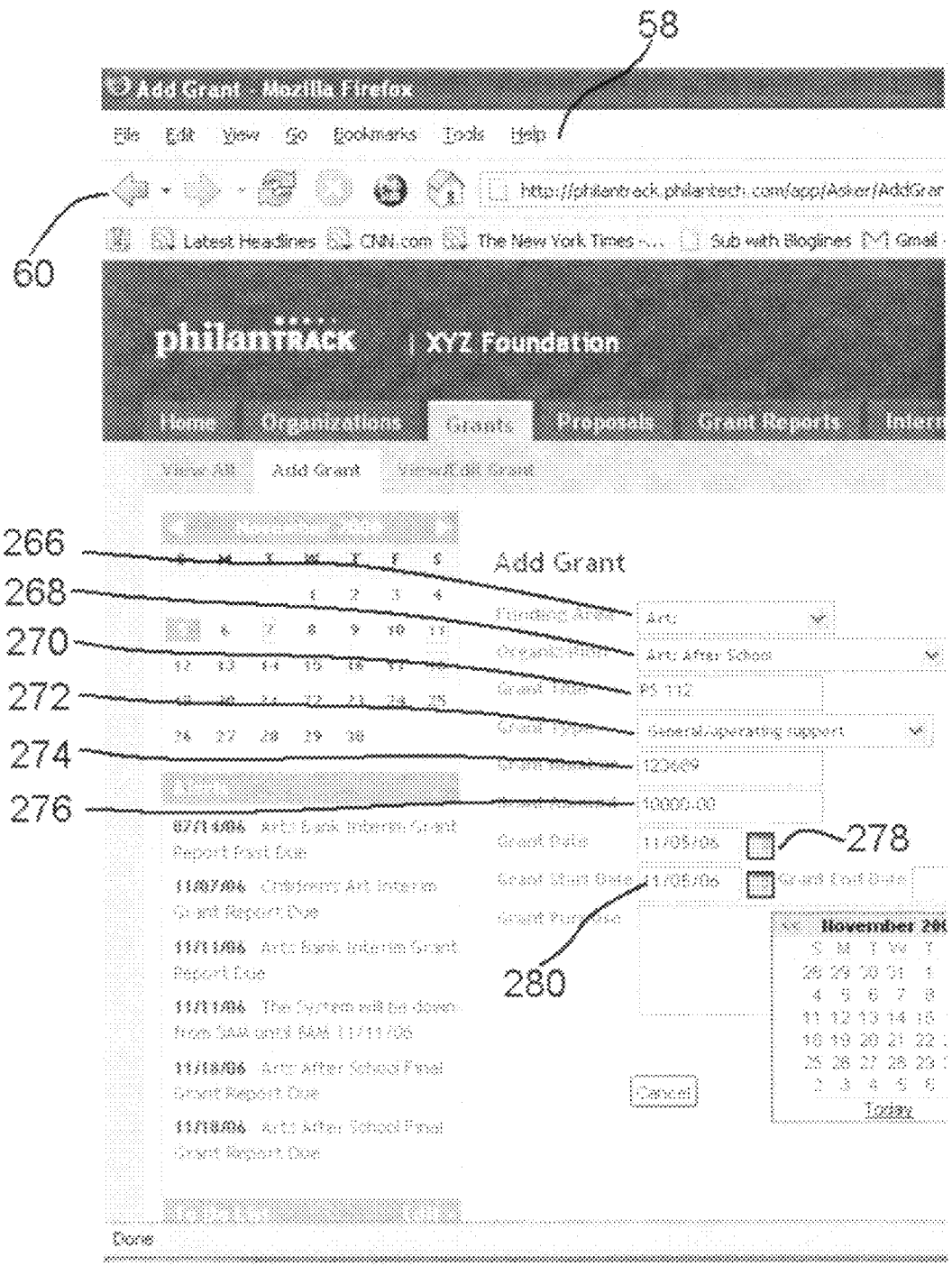
Figure 37B:
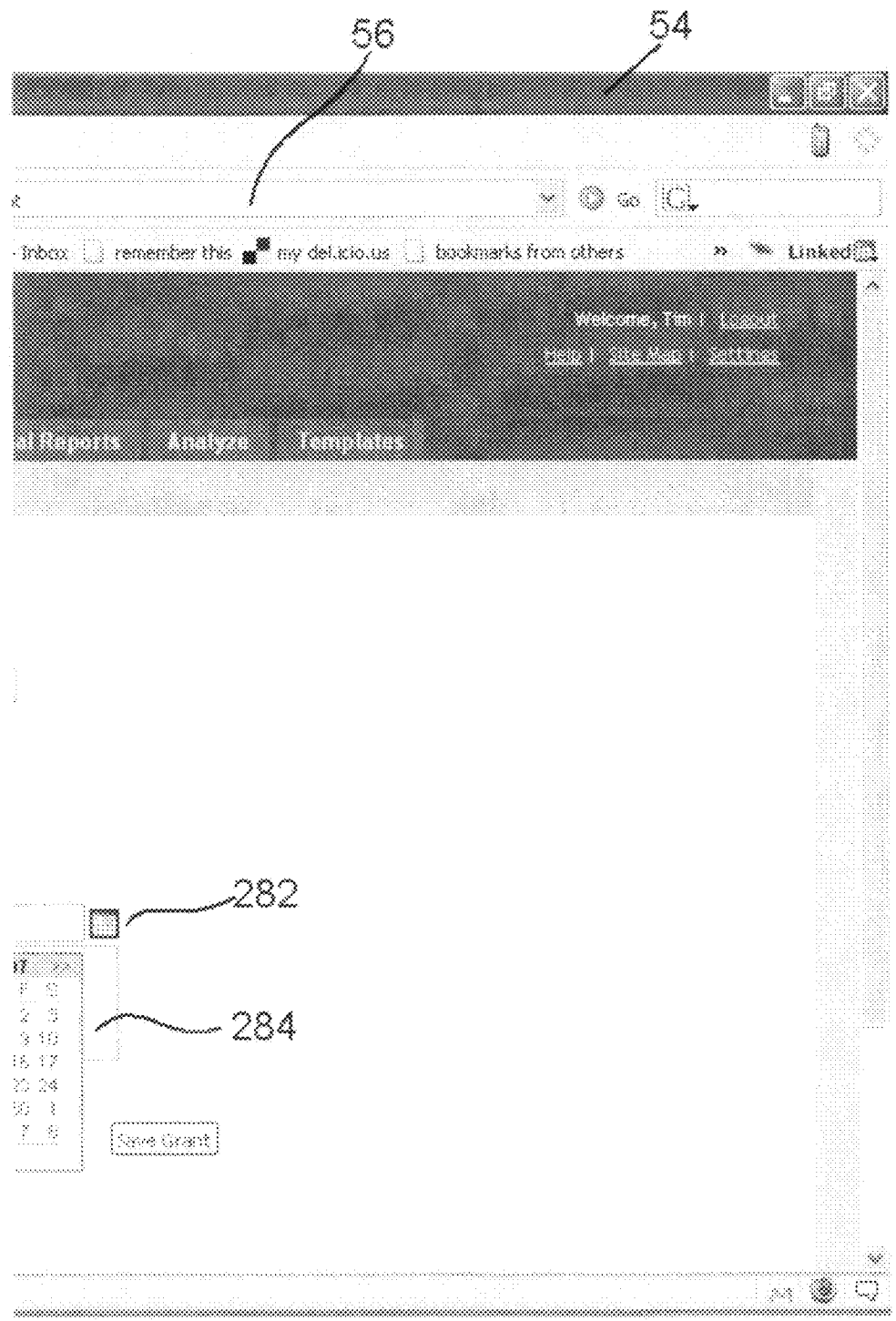

FIG. 37 illustrates a screen shot of an add-grant screen 44. In this screen, the grantor user may add a grant for display in table 236 by entering in the following information: funding area with menu 266, organization name with menu 268, grant title with text box 270, grant type with menu 272, grant number with text box 274, grant amount with text box 276, grant date with calendar 278, grant start and end dates with calendars 280 and 282, grant purpose with text box 284, and grant contact information 286.

Figure 38A:
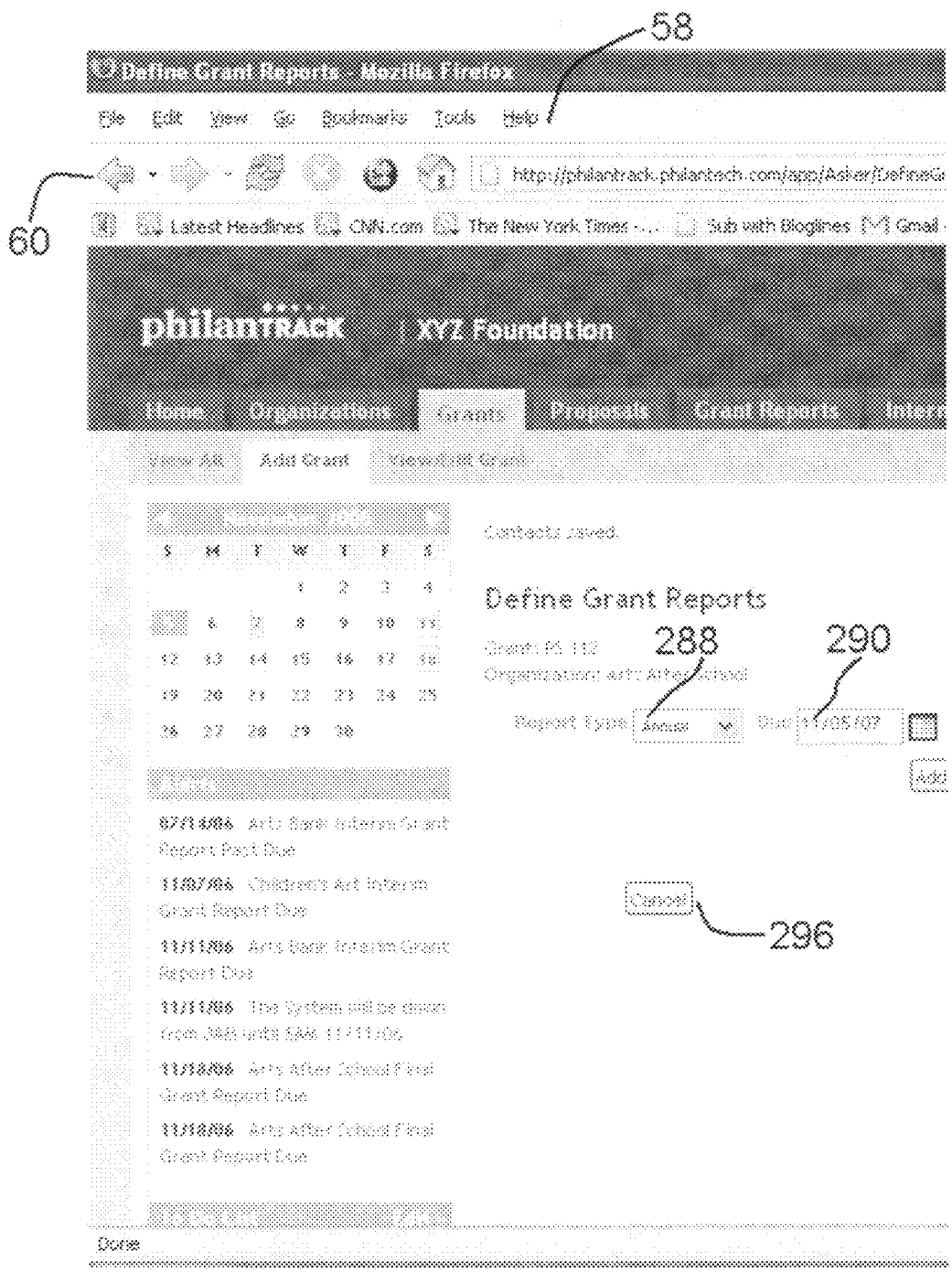
Figure 38B:
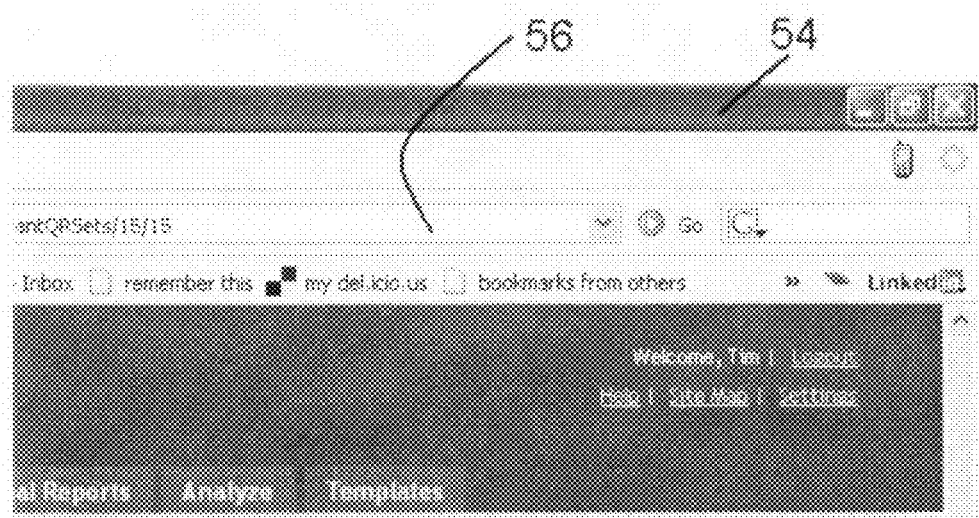

FIG. 38 illustrates a screen shot of a define-grant reports screen 44. In this screen, the grantor user may select a report type using menu 288, may select the date of the report using text box 290, and select a template for the report using menu 292. The grantor user may then save the report using button 294 or cancel the report using button 296.

Figure 39A:
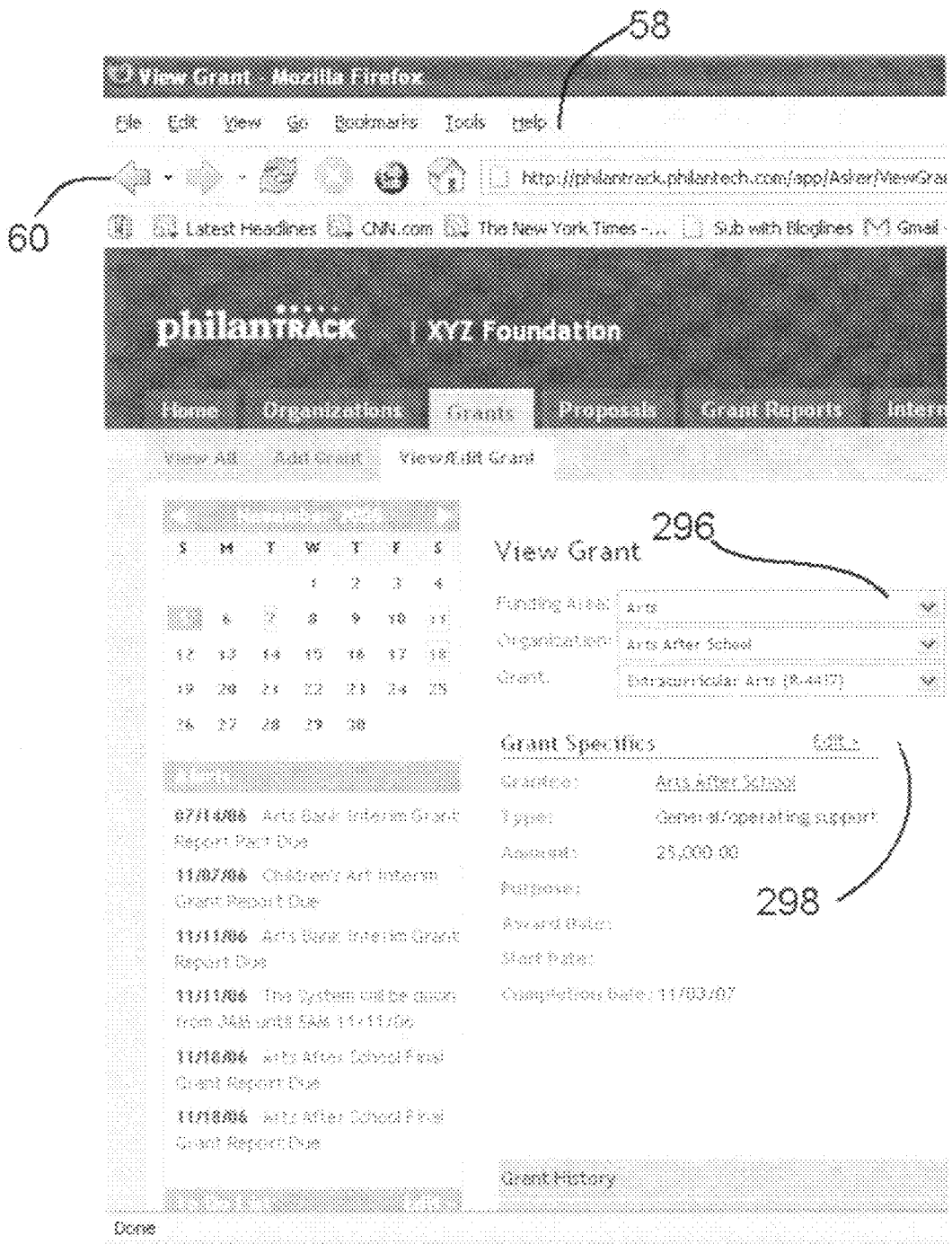
Figure 39B:
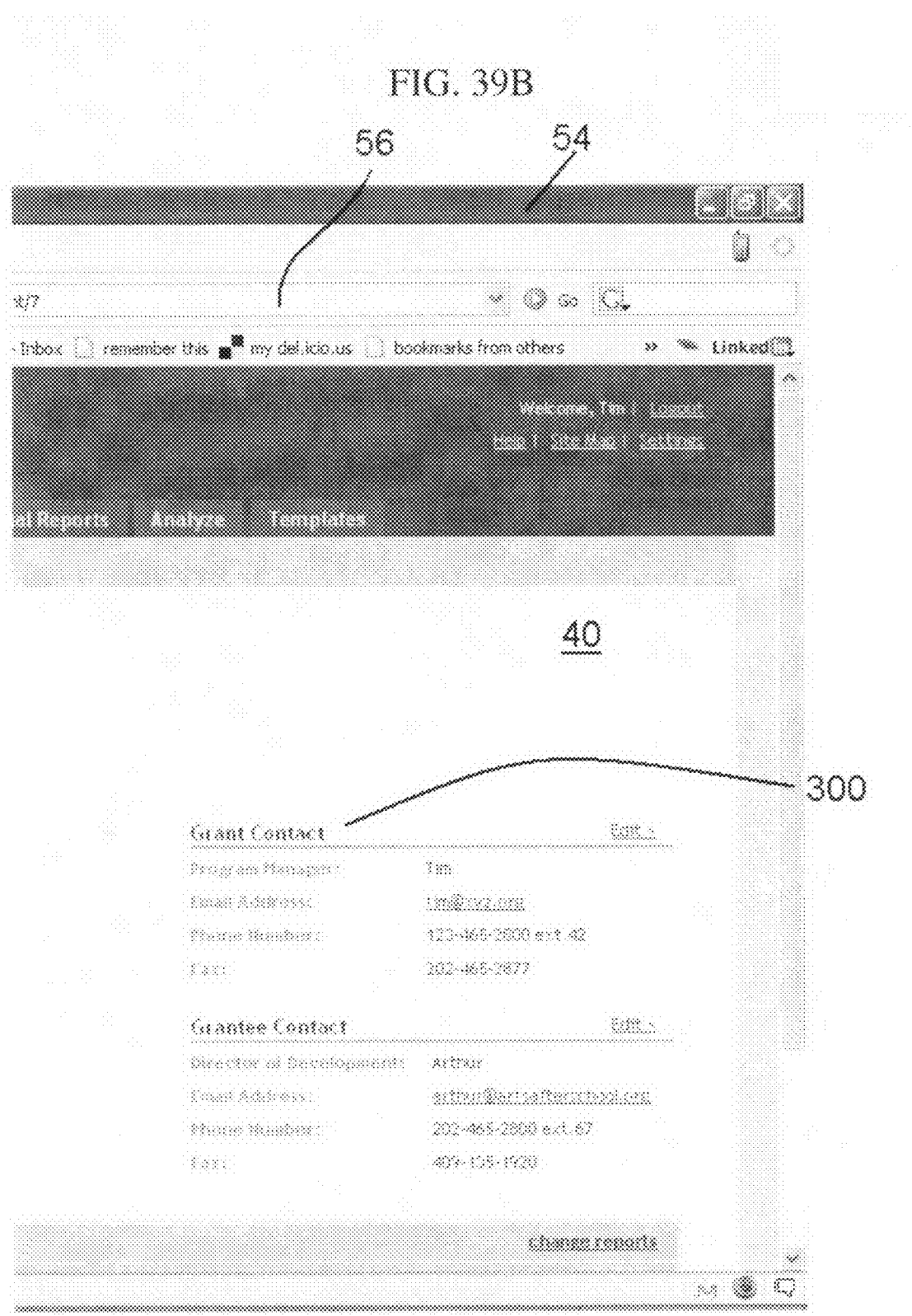

FIG. 39 illustrates a screen shot of a view/edit-grants-report screen 40. The grantor user can use menus 296 to select specific grants to view based upon funding area, organization, and grant number. The specifics of the grant are then shown in region 298. The contact information for the grant is shown in region 300.

FIGS. 40 and 41 illustrate a screen shot of a view analysis screen 48. Using menus 252 and 254 and button 256, the grantor user can perform an analysis on the selected organizations and grants that is then shown in charts 302, 303 and 306 and tables 304, 305 and 308.

Figure 42:
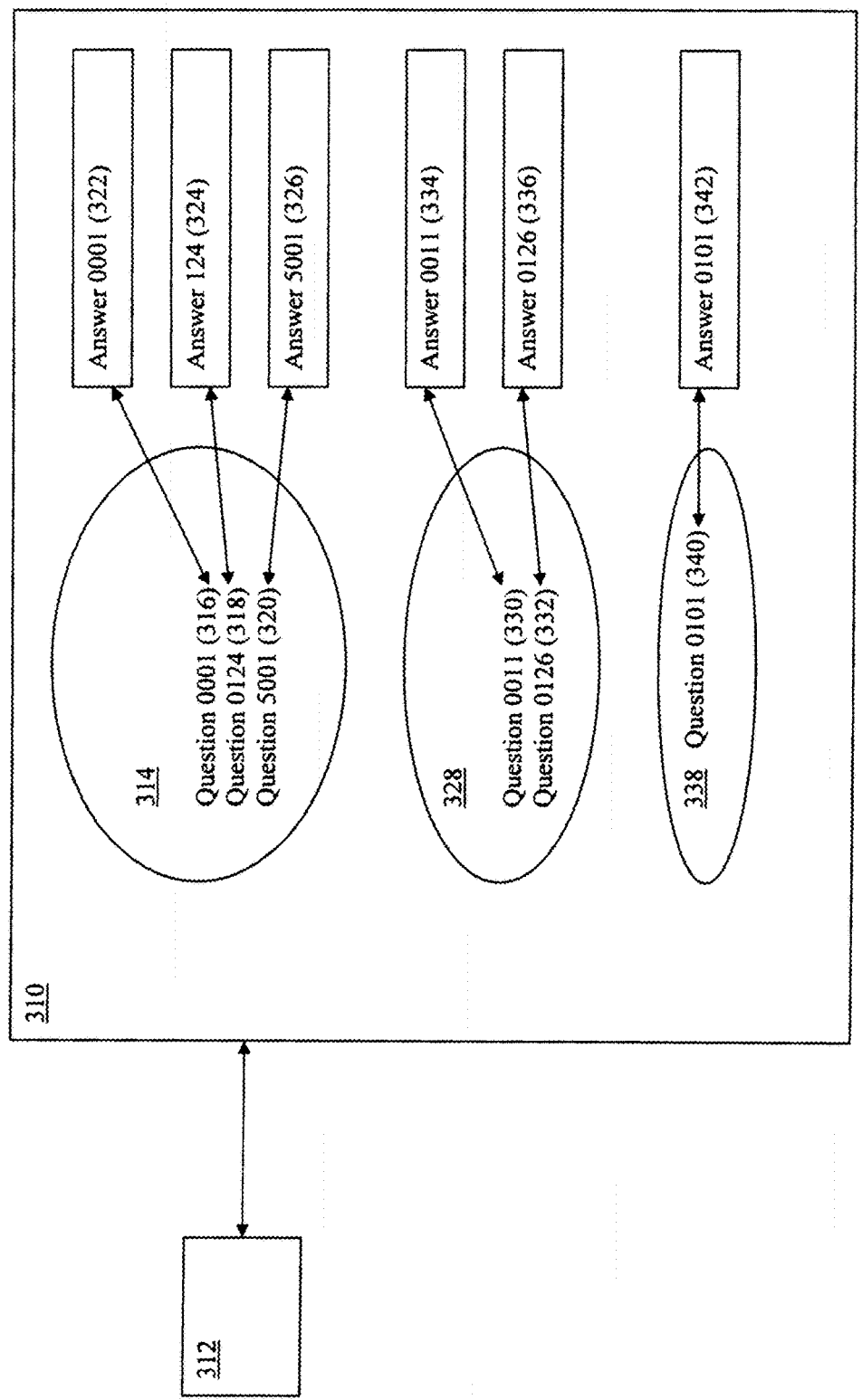
FIG. 42 illustrates a schematic of an interactive database that contains question and answer information for use with a find-similar-questions button and a use this answer button.

FIG. 42 illustrates a schematic of an interactive database that contains question and answer information for use with the find-similar-questions button 84 and use this answer button 114. System 10 includes a database 310 maintained by a database operator 312. Database 310 contains question and answer information from proposals and reports generated by the grantee user and the grantor user while using system 10. Database operator 312 reviews the questions in reports and tags similar questions together using one or more tags 314, 328, or 338. Tags 314, 328, and 338 are graphically shown in database 310 as Venn diagrams respectively grouping questions 316, 318, 320, 330, 332, and 340. By grouping similar questions together with tags 314, 328, and 338, database operator 312 enables grantee users to use the find-similar-questions button 84 to locate similar questions that they have already answered. Each question 316, 318, 320, 330, 332, and 340 is associated with a single answer 322, 324, 326, 334, 336, and 342 respectively. The link between questions 316, 318, 320, 330, 332, and 340 and answers 322, 324, 326, 334, 336, and 342 allows the grantee user to view the answer with button 108 for a selected question and use that answer to populate a form 92 using the use this answer button 114. The use of this database greatly reduces the time required by grantee users to answer repetitive proposals and reports. Alternately, grantees may be given access to add questions, search for and identify similar questions, and link similar questions similarly to the way a database operator would. The database preferably may be updated in near-real time so that answers may be added to the database before a grantee actually completes and submits a questionnaire to a grantor. Answers and links may be stored in other manner than a centralized database, such as in storage capacity at the grantee or grantor location or an XML file.

Detailed Description of a Preferred Database

Figure 43:
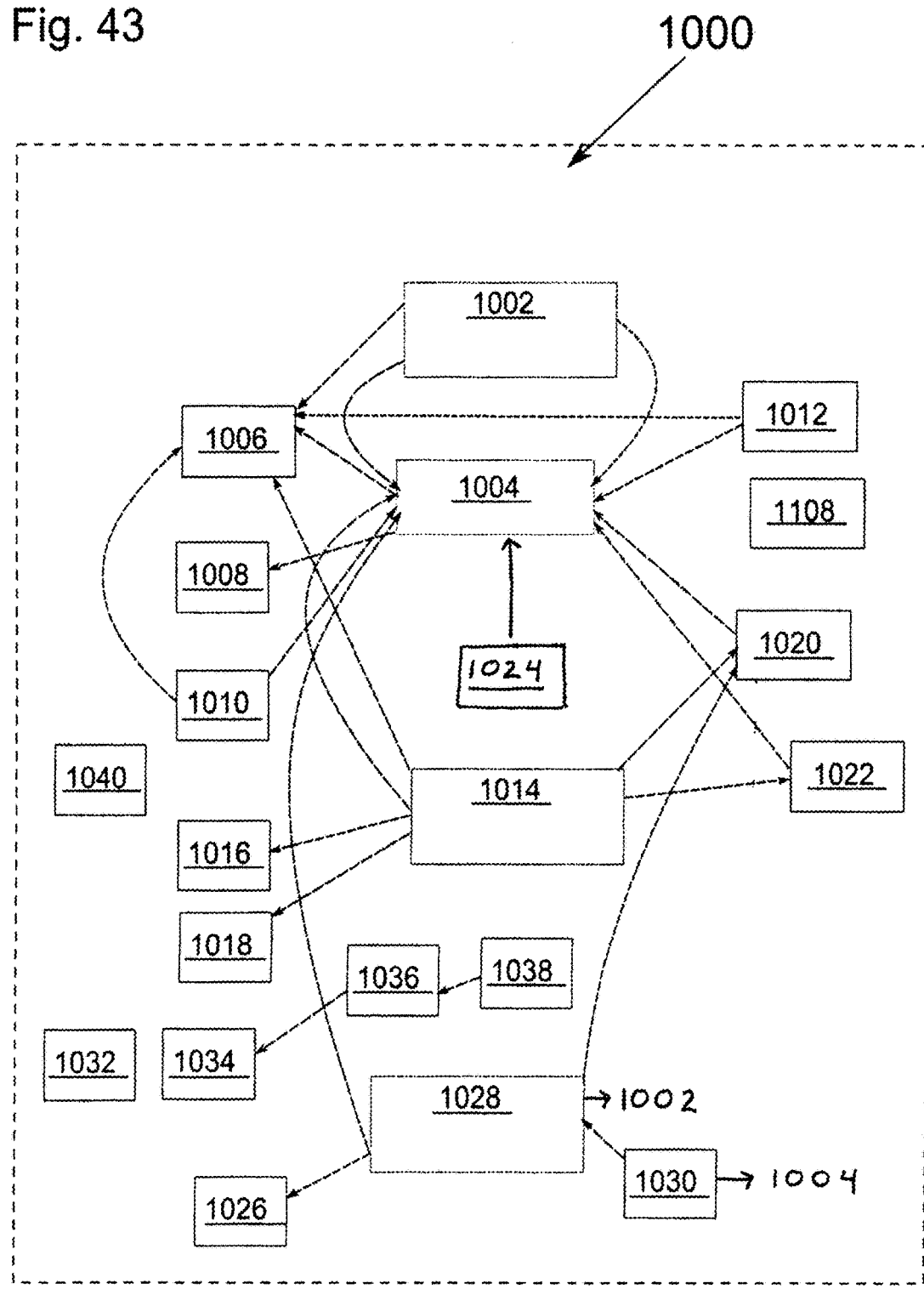
FIGS. 43-45 illustrate tables of an interactive database that contains question and answer information for use with a find-similar-questions button and a use this answer button.
Figure 44:
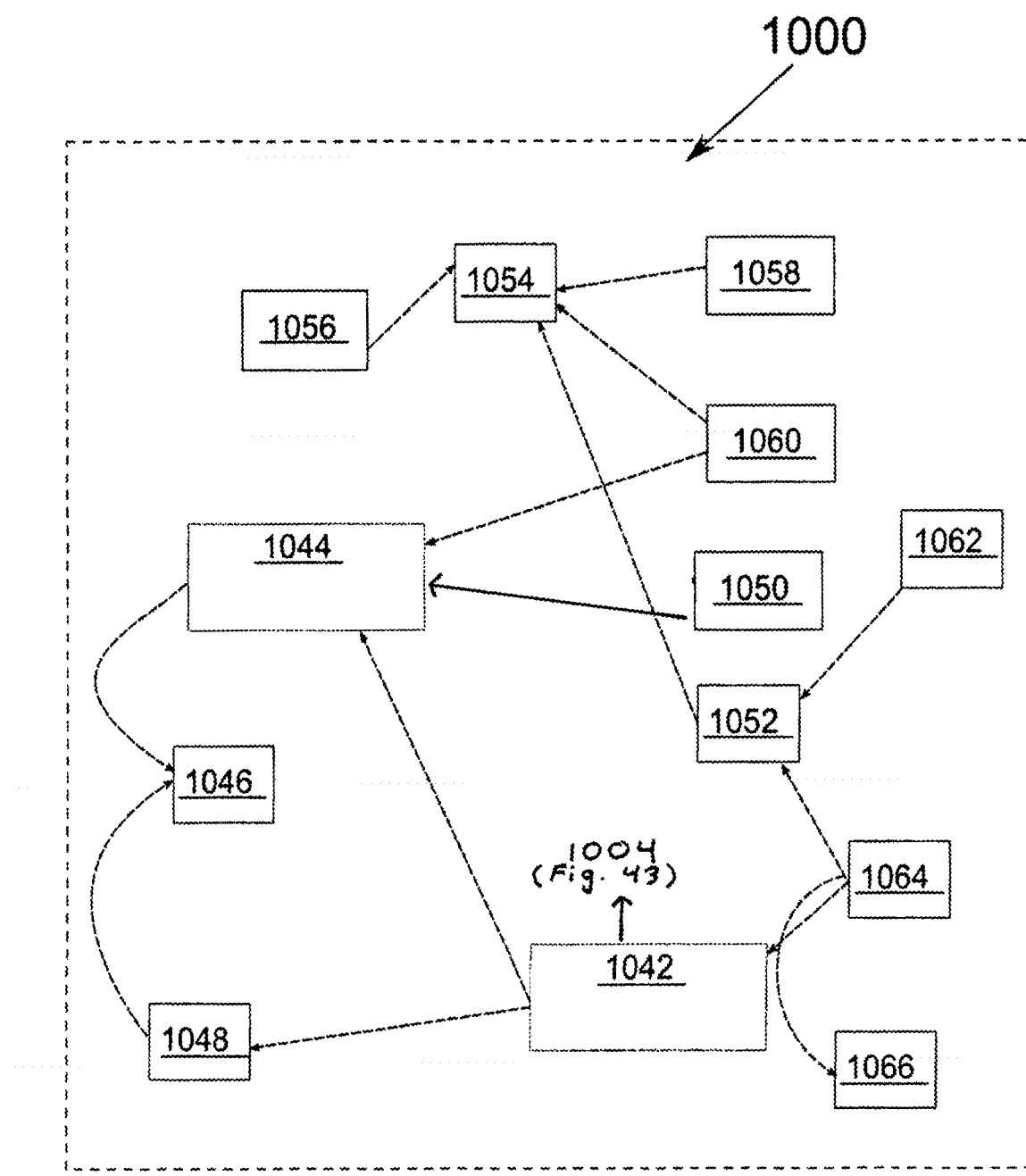
Figure 45:
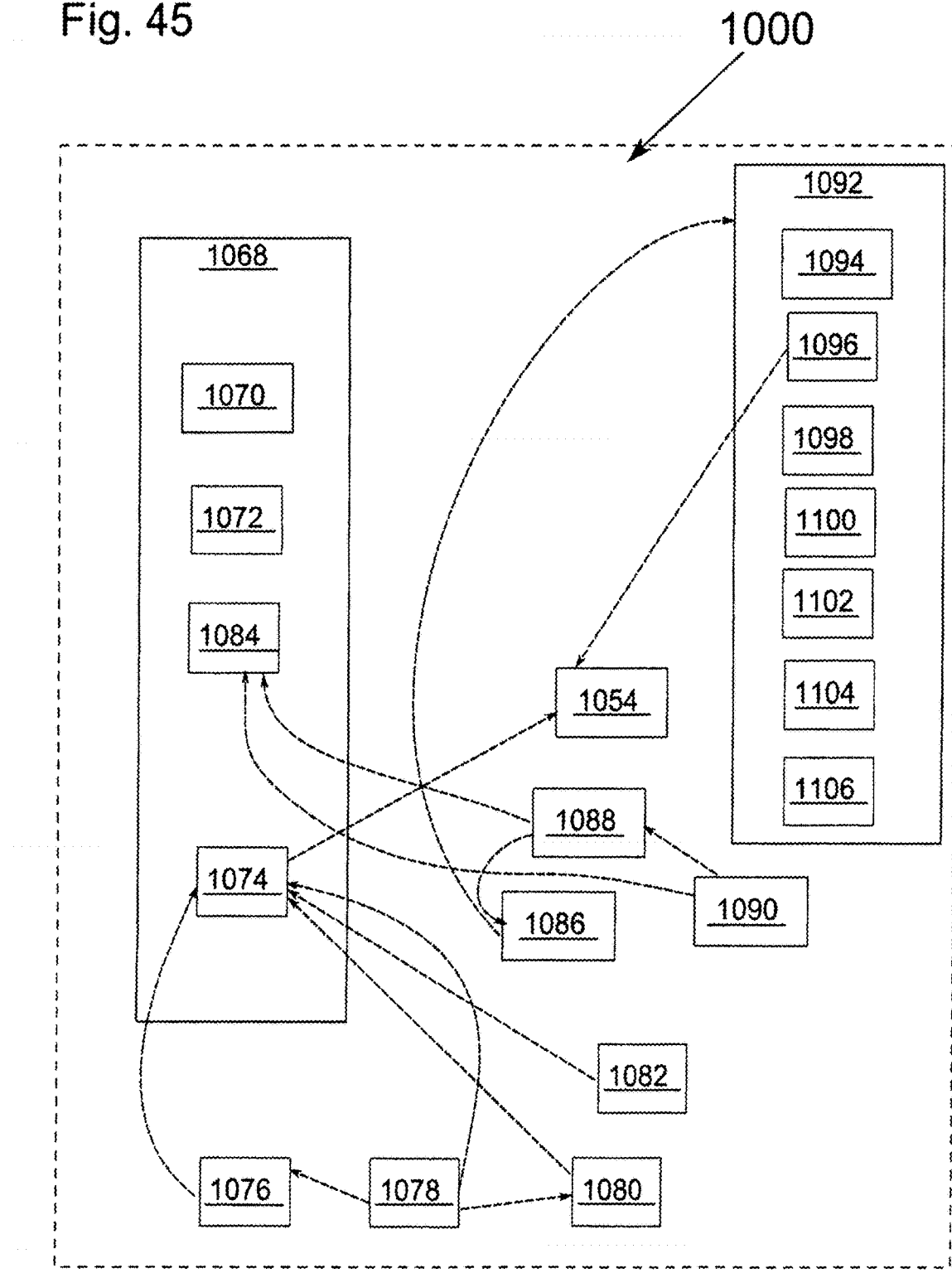

FIGS. 43-45 illustrate tables of an interactive database 1000 that contains question and answer information for use with a find-similar-questions button and a use-this-answer button. The database 1000 includes a series of tables, each consisting of individual fields. In most cases each table is related to at least one other table in the database 1000 via at least one field, though in some cases the relationship may be handled by the application and is not explicit in the database schema. The database may be built on Microsoft Access or other database platform. It should be understood that these tables are by way of example only and the database may be organized in other ways with different tables, fields, and relations.

Table users 1002 stores information about individuals that are users of the system. It connects users to organizations and to the functions they can perform within the application. Table users 1002 may, for example, include the following fields:

userid—a unique identifier for an individual user.

orgid—the identifier within the system for the organization with which a user is affiliated.

username—the username selected by the user which serves, with the password, as part of the login function.

password—the password associated with an individual username.

password_question—the question that the user sets up for a reminder in case the password is forgotten. This serves a security and privacy function.

password_answer—the answer to the question that the user sets up for a reminder in case the password is forgotten.

create_timestamp—the date and time the user record is created.

mod_timestamp—the date and time the user record is modified.

status—the status of a user. A user can be, for example, active, inactive, deleted, or replaced. The status field references the status table.

reminders—stores an individual user's "to-do list" items.

contactid—the identifier for contact information for a specific user. It relates to the table contacts which stores the specific contact information for a given user.

role—determines a user's role within the organization—different user roles entitle users to access and interact with different parts of the application (e.g., some users cannot access some sections or perform some functions).

calendar_private_url—the URL for a users calendar information. PhilanTrack uses iCal to export calendar-related information (e.g., due dates). Each user can access a user-specific calendar through their private URL to be able to integrate calendar information with their calendaring software (e.g., Microsoft Outlook).

Table organizations 1004 stores information about organizations that are using the database. Individuals in the users table 1002 are associated with organizations 1004. Table organizations 1004 may, for example, include the following fields:

orgid—a unique identifier within the database for an organization. It relates to orgid in the following tables: users, program areas, funding areas, qrset-templates.

org_ein—EIN stands for Employer Identification Number. It is a nine-digit number assigned by the IRS for businesses, estates, and trusts. The database may contain all tax exempt organizations. The org_ein field contains that organization's EIN.

org_name—the name of the organization.

org_long_name—the full name of the organization.

is_asker—this field and is-respondent identify whether the organization is an asker organization or a respondent organization. An asker requests reports and proposals; e.g., the asker asks questions of the respondent. A respondent answers questions asked by askers, and submits reports and proposals in response to asker requests.

is_respondent—this field and is_asker identify whether the organization is an asker organization or a respondent organization. An asker requests reports and proposals; e.g., the asker asks questions of the respondent. A respondent answers questions asked by askers, and submits reports and proposals in response to asker requests.

create_timestamp—the date and time the organization record is created.

mod_timestamp—the date and time the organization record is modified.

website—the organization's website.

mission—a text field for the organization's mission statement.

directorid—an identifier for the executive director of an organization to relate to contact information for the director of that organization. It references the contactid field in the table contacts. Whether the user is a director or not is identified in the contact_is_director field in the table asker_respondents or respondent_askers.

addressid—an identifier for the address of the organization. It references the addressid field the table addresses.

status—the status of a user. A user can be, for example, active, inactive, deleted, or replaced. The status field references the status table.

is_philantrack_user—identifies whether an organization is in the database (i.e., a user) for two purposes: in order to easily associate multiple users within the same organization and to generate different notifications and set different editing permissions depending on whether or not an organization already has a record in the system. For example, when a new user registers with the system and looks up the user's organization, the system will be able to identify whether the new user should be associated with an existing organization, or whether a new organization record should be created. In another case, an asker can edit respondent contact information if the respondent is not a user. Once a respondent becomes a user, that respondent can edit the respondent's contact information, not the asker.

accounting—identifies the respondent organization's accounting basis—typically cash or accrual. This is set in the respondent organization's profile information and is used in the financial analysis tool.

cashflow—identifies the respondent organization's cash flow statement methodology—typically direct or indirect. This is set in the respondent organization's profile information and is used in the financial analysis tool.

Table contacts 1006 stores contact information for individual users within an organization. It is related to table users 1002, asker_respondents 1010, respondent_askers 1012 and grants 1014. Table contacts 1006 may include the following fields:

contactid—an identifier of the contact.
name—the contact's name.
title—the contact's title.
phone—the contact's phone number.
fax—the contact's fax number.
email—the contact's email address.

The table addresses 1008 stores information about addresses for organizations. It is related to table organizations 1004. The table addresses 1008 may include the following fields:

addressid—an identifier for the address information for a given record.

in_care_of_name—if correspondence is sent in care of an individual or organization.

address1—first address line.
address2—second address line.
city—city.
state—state.
postal_code—postal or zip code.
country—country.

The table asker_respondents 1010 stores relationships between an asker and its respondents. When an asker adds a respondent to its list, an entry is created in the asker_respondent table. The table asker_respondents 1010 is related to tables organizations 1004 and contacts 1006. The table asker_respondents 1010 may include the following fields:

asker_orgid—an identifier for an asker organization. It references the orgid field in the table organizations.

respondent_orgid—an identifier for a respondent organization. It references the orgid field in the table organizations.

notes—notes that are specific to a respondent and an asker, but only visible to the asker.

contact_is_director—identifies whether a given contact in an organization is the director of that organization or a different type of user.

contact_contactid—identifier for a specific contact person (e.g. individual user within the asker organization).

The table respondent_askers 1012 stores relationships between a respondent and its askers. When a respondent adds an asker to its list, an entry is created in the respondent_asker table 1012. The table respondent_askers 1012 is related to tables organizations 1004 and contacts 1006. The table respondent_askers 1012 may include the following fields:

respondent_orgid—an identifier for a respondent organization.

asker_orgid—an identifier for an asker organization.

notes—notes that are specific to an asker and a respondent, but only visible to the respondent.

contact_is_director—identifies whether a given contact in an organization is the director of that organization or a different type of user.

contact_contactid—identifier for a specific contact person (e.g. individual user within the asker organization).

The table grants 1014 stores information about grants in the database. It connects grants to asker and respondent organizations as well as funding and program areas (at the asker organization and respondent organization, respectively) along with relevant contact information. It is related to tables contacts 1006, grant_types 1016, proposal_status 1018, organizations 1004, program_areas 1022, and funding_areas 1020. The table grants 1014 may include the following fields:

grantid—a unique identifier for an individual grant.

proposal_id—an identifier for a proposal associated with a given grant. It references orgid field in the table grants'.

asker_orgid—the identifier of the asker organization with which a grant is associated. It references orgid field in the table organizations.

fundingarea_id—the identifier of the asker funding area with which a grant is associated. It references fundingareaid in the table funding_areas.

program_areaid—the identifier of the respondent program area with which a grant is associated. It references program_areaid field in the table program_areas.

grant_identifier—a user-entered identifier for an individual grant (can be a combination of letters and numbers that are meaningful to the organization).

grant_name—the name of the grant entered by the asker or the respondent.

grant_date—the date the grant is made.

start_date—the date grant activities begin.

end_date—the date grant activities end.

description—a description of the grant.

amount—the amount of the grant.

grant_typeid—the type of grant. The grant_typeid field references the table grant_type.

asker_alternate_contact—a Boolean field identifying whether there is an alternate contact for the asker organization. Respondents and askers can designate a primary point of contact for a given grant. That contact may be different from the primary point of contact for the asker organization.

asker_contactid—an identifier for the primary point of contact for the asker organization.

respondent_alternate_contact—a Boolean field identifying whether there is an alternate contact for the respondent organization. Respondents and askers can designate a primary point of contact for a given grant. That contact may be different from the primary point of contact for the respondent organization.

respondent_contactid—an identifier for the primary point of contact for the respondent organization. It references orgid field in the table organizations.

status—a grant can be active, inactive, deleted, or replaced. The status field references the status table.

asker_notes—notes entered by the asker about the grant.

is_proposal—identifies whether a grant is a proposal. Proposals in the system become grants when approved by the asker. Fields from the proposal become fields in the grant once a grant is approved.

proposal_status—a proposal can be, for example, undecided, accepted, or declined. The proposal_status field references the table proposal_status.

The table grant_types 1016 stores information about the different types of grants that can be tracked through the system. It is related to the table grants 1014. The table grant_types 1016 may include the following fields:

grant_typeid—identifies the grant type.

grant_type_name—the name of the grant type.

The table proposal_status 1018 stores information about the status of a proposal. It is related to the table grants 1014. The table proposal_status 1018 may include the following fields:

status—identifies the status of the proposal. The proposal status can be, for example, undecided, accepted or declined.

status_name—the name of the proposal status.

The table funding_areas 1020 stores information about an asker's funding areas. It is related to the table grants 1014, organizations 1004, and documents 1024. The table funding_areas 1020 may include, for example, the following fields:

funding_areaid—identifies the funding area in an asker organization.

orgid—a unique identifier within the database for an organization. It relates to the orgid field in the table organizations.

funding_area_name—the name of the funding area.

status—the status of a funding area. A funding area can be, for example, active, inactive, deleted, or replaced. The status field references the status table.

The table program_areas 1022 stores information about a respondent's program areas. It is related to the tables grants 1014 and organizations 1004. The table program_areas 1022 may include the following fields:

program_areaid—identifies the program area in a respondent organization.

orgid—a unique identifier within the database for an organization. It relates to the orgid field in the table organizations.

program_area_name—the name of the program area.

status—the status of a program area. A program area can be, for example, active, inactive, deleted, or replaced. The status field references the status table.

The table documents 1024 stores information about documents. It is related to the table organizations 1004. The table documents 1024 may include the following fields:

docid—an identifier for the document.

orgid—a unique identifier within the database for an organization. It references the orgid field in the table organizations.

filename—the name of the file that has been uploaded.

systemname—the name generated by the system for the file that has been uploaded.

summary—summary text about the document, entered by the user.

bytes—the size of the document.

added_datetime—a date and time stamp for when the document was uploaded to the system.

added_byid—the username of the user who uploaded the document to the system.

mime_type—file mime type of the uploaded file.

The table internal_report_type 1026 defines the type of internal reports. The combination of the irt_id and irt_name fields define for any given internal report the name and type of report (e.g., board book, grantee report). The table internal_report_type 1026 is related to the table internal_report 1028. The table internal_report_type 1026 may include the following fields:

irt_id—an identifier for the internal report type (e.g., 1=board book).

irt_name—the name of the internal report type (e.g., board book)

The table internal_report 1028 is an entity that stores information about internal reports. It is related to the tables internal_report_grantee 1030, organizations 1004, funding_areas 1020, users 1002, and internal_report_type 1026. The table internal_report 1028 may include the following fields:

ir_id—an identifier for the internal report.

asker_orgid—an identifier for the asker organization generating the internal report. It references the orgid field in the table organizations.

funding_areaid—an identifier for the funding area for which the internal report has been generated. It references the funding_areaid field in the table funding_areas.

irt_id—an identifier for the internal report type. It references the irt_id field in the table internal_report_type.

run_byid—an identifier for the user that has generated (run) the report. It references the userid field in the table users.

report_name—the name of the internal report, entered by the asker user.

date_created—date and time an internal report is created.

start_date—start date of the period covered by the internal report.

end_date—end date of the period covered by the internal report.

results—the text of the results of the internal report.

The table internal_report_grantee 1030 stores information about the grantees included in a given internal report. It is related to the tables internal_report 1028 and organizations 1004. The table internal_report_grantee 1030 may include the following fields:

ir_id—an identifier for the internal report. It references the ir_id field in the table internal_report.

grantee_id—an identifier for the grantee whose information is included in an internal report. It references the orgid field in the table organizations.

The table states 1032 stores information about the names and abbreviations of states. The table states 1032 may include the following fields:

state—the two-letter abbreviation for a state.

name—the name of a state.

The table geographic_type 1034 stores information about types of geographic areas on which reports can be run (e.g., state, city, zip code, congressional district, etc.). The table geographic_type 1034 is related to the table geographic_regions 1036. The table geographic_type 1034 may include the following fields:

gt_id—an identifier for the geographic type (e.g., 1 is "state").

gt_name—the name of the geographic type (e.g., "state").

The table geographic_regions 1036 stores information about geographic regions. With the table geographic_member, it is used to define which states are included in which geographic region (e.g., "Northeast"). The table geographic_regions 1036 is related to the table geographic_type 1034. The table geographic_regions 1036 may include the following fields:

gr_id—an identifier for the geographic region.

name—the name of the geographic region.

gt_id—an identifier for the geographic type. It references gt_id field in the table geographic_type.

description—a description of the geographic region.

The table geographic_member 1038 stores information about which geographic entities comprise a specific geographic region. The table geographic_member is related to the table geographic_regions 1036. The table geographic_member 1038 may include the following fields:

gm_id—an identifier for the geographic member.

gr_id—an identifier for the geographic region. References gr_id field in the table geographic_regions.

name—the name of the geographic member (e.g., "Northeast").

The table alerts 1040 stores information about alerts (notifications to users). There are two preferred types of alerts—admin-generated (e.g., system downtime) and system-generated (e.g., report due on a given date). The table alerts 1040 may include the following fields:

alertid—an identifier for the alert.

description—a text description of the alert.

link—a link to the subject of the alert (e.g., a report that is due on a given day).

alert_date—the date the alert is due.

The table qrsets 1042 stores information about questions and responses in the database. A qrset is short for "question/response set." A qrset is composed preferably of a number of qrinstances (each of which may consist of an individual question and its associated response). A qrset can be thought of as a "request" from an asker organization of a respondent organization and the information that the respondent organization completes and submits in response to the request. The table qrsets 1042 is related to the tables organizations 1004, qrset_templates 1044, qrset_types 1048, grants 1014, and states 1032. The table qrsets 1042 may include the following fields:

qrsetid—an identifier for the qrset.

respondent_orgid—the identifier of the respondent organization with which a grant is associated. It references orgid field in the table organizations.

asker_ordid—the identifier of the asker organization with which a grant is associated. It references orgid field in the table organizations.

qrset_templateid—an identifier of the qrset_template with which the qrset is associated. A qrset template is the basis for creating a qrset. It determines the questions and responses (qrset instances) that comprise a given qrset. A qrset template can be thought of as a qrset that has not been associated with a specific asker/respondent pair. In other words, a qrset template can be the basis for many qrsets. It references qrset_templateid field in table qrset_templates.

qrset_typeid—an identifier of the type of qrset. Qrsets can be reports or proposals, etc. It references qrset_templateid field in table qrset_templates.

due_date—the date a given qrset is due.

grantid—an identifier for the grant with which the qrset is associated. It references grantid field in table grants.

submitted—date and time qrset is submitted.

create_timestamp—date and time qrset is created.

mod_timestamp—date and time qrset is modified.

status—the status of a qrset. A qrset can be active, inactive, deleted, or replaced. The status field references the status table.

original_qrsetid—the original id of the qrset. It references qrsetid in the table qrsets. It is used in the situation in which an asker modifies a QRSet that a respondent has started to answer but has not yet been submitted. In that situation, the modified QRSet becomes a new QRSet. This field links to the original QRSet so that responses already entered in the original QRSet can be copied into the modified QRSet. In most cases, this field will be empty.

comment—comments on the qrset that are visible only to the asker.

The table qrset_templates 1044 stores information about qrset templates. A qrset template is essentially a qrset that has not been associated with a specific asker/respondent pair. A qrset template can be the basis for many qrsets. The table qrset_templates 1044 is related to the tables organizations 1004, funding_areas 1020, program_areas 1022, qrset_template_types 1046, qrset_template_question_types 1060, and qrsets 1042. The table qrset_templates 1044 may include the following fields:

qrset_templateid—an identifier for the qrset template.

template_name—the name of the template.

qrset_template_typeid—an identifier of the type of template for a given qrset. Qrset template types may include report, proposal, etc. It references qrset_template_typeid in the table qrset_template_types.

orgid—a unique identifier within the database for an organization. It references the orgid field in the table organizations.

fundingarea_id—the identifier of the asker funding area with which a grant is associated. It references funding_areaid in the table funding_areas, if the organization is an asker organization.

program_areaid—the identifier of the respondent program area with which a grant is associated. It references program_areaid field in the table program_areas, if the organization is a respondent organization.

create_timestamp—date and time a qrset template is created.

mod_timestamp—date and time a qrset template is modified.

status—the status of a qrset template. A qrset template can be, for example, active, inactive, deleted, or replaced. The status field references the status table.

description—a description of the qrset template.

The table qrset_template_types 1046 stores information about the different types of qrset templates in the datebase. It is related to the tables qrset_templates 1044 and qrset_types 1048. The table qrset_template_types 1046 may include the following fields:

qrset_template_typeid—an identifier for the type of qrset template.

name—the name of the qrset template type.

label—the label associated with the qrset template type.

The table qrset_types 1048 stores information about the different types of qrsets in the database. It is related to the tables qrset_template_types 1046 and qrsets 1042. The table qrset_types 1048 may include the following fields:

qrset_typeid—an identifier for the type of qrset.

qrset_template_typeid—an identifier for the type of qrset template. It references qrset_template_typeid field in the table qrset_template_types.

name—the name of the qrset type.

label—a label for the qrset type.

The table qrset_template_members 1050 organizes groups of questions into qrsets. It is related to the tables qrset_templates 1044 and questions 1052. The table qrset_template_members 1050 may include the following fields:

qrset_templateid—an identifier for the qrset template. It references qrset_templateid field in the table qrset_templates.

qid—an identifier for an individual question. It references qid field in the table questions.

sort_order—the order of the questions in a qrset template.

The table questions 1052 stores the questions in the database. It is related to the tables tags 1054, qrset_template_members 1050, question_xref 1062, and qrinstances 1064. The table questions 1052 may include the following fields:

qid—an identifier for an individual question.

question—the text of a question.

question_type_tagid—an identifier of the question type as referenced in the tag. It references tagid field in the table tags.

definition—the XML definition for the question.

The table tags 1054 stores information about tags. Tags are like an option code selection or a lookup code value. They are used for lists of items (e.g., expense categories for a financial report). The table tags 1054 are related to the tables questions 1052, tag_tree 1058, qrset_template_question_types 1060. The table tags 1054 may include the following fields:

tagid—an identifier for a tag.

tag_name—the name of the tag.

status—the status of a tag. A tag can be active, inactive, deleted, or replaced. The status field references the status table.

tag_label—the label for a given tag.

The table tag_financial_attrs 1056 stores information that helps define rows in financial statements. It provides context for when given tags appear in financial statements (e.g., certain tags may only appear in rows of financial statements when the respondent organization is using accrual accounting). A record in the table tag_financial attrs 1056 relates to a specific tag and defines the context in which a given tag should appear. The table tag_financial_attrs 1056 is related to the table tags 1054. The table tag_financial_attrs 1056 may include the following fields:

tagid—an identifier for the tag. It references the tagid field in the table tags.

cash_accounting—identifies whether the organization uses cash accounting.

accrual_accounting—identifies whether the organization uses accrual accounting.

direct_cashflow—identifies whether the organization uses direct cash flow statements.

indirect_cashflow—identifies whether the organization uses indirect cash flow statements.

The table tag_tree 1058 is an entity that is a way of organizing tags in a hierarchical manner, like a genus and a species. The tag tree can represent any number of levels of lists. The table tag_tree 1058 is related to the table tags 1054. The table tag_tree 1058 may include the following fields:

parent_tagid—an identifier for a tab at the top of the hierarchy. References the tagid field in the table tags.

child_tagid—an identifier for a tab further down the hierarchy. References the tagid field in the table tags.

The table qrset_template_question_types 1060 keeps track of the order of question categories used within a qrset_template. It is related to the tables qrset_templates 1044 and tags 1054. The table qrset_template_question_types 1060 may include the following fields:

qrset_templateid—an identifier for the qrset_template. It references the qrset_templateid field in the table qrset_templates.

question_type_tagid—an identifier for the tag related to a specific question type. It references the tagid field in the table tags.

sort_order—Defines the sort order of the question with respect to other questions within the same question type category (e.g., Goals/Objectives).

The table question_xref 1062 defines the relationships between similar questions in the database. Questions that are identified as similar are not necessarily identical. They are identified as similar in this table. The table question_xref 1062 is related to the table question 1052. The table question_xref 1062 may include the following fields:

qid1—an identifier for the first question that is similar to another question. It references the qid field in the questions table.

qid2—an identifier for the second question that is similar to another question. It references the qid field in the questions table.

The table qrinstances 1064 stores information about qrinstances. It associates a question with a response. The combination of responseid and response_typeid fields relate a given qrinstance to a single response within one of the response tables (e.g., narrative_responses, if_then_responses, dict_list_responses, and financial_grids). It is related to the tables questions 1052, qrsets 1042, and response_types 1066. The table qrinstances 1064 may include the following fields:

qrinstanceid—an identifier for an individual qrinstance.

qrsetid—an identifier for a qrset. Associates a qrinstance with a qrset. It references qrset field in the qrsets database.

qid—an identifier for a question. It references the qid field in the questions table.

responseid—an identifier for an individual response. In this table, the response preferably is associated with a specific question.

response_typeid—an identifier for a type of response. It references the response_typeid field in the table response_types.

sort_order—defines the sort order of qrinstances within a qrset.

The table response_types 1066 is a registry of the response types/classes which exist. Response types can include, for example, narrative responses, financial grids, if-then responses, dict-list responses (see table dict_list_responses), etc. It is related to the table qrinstances 1064. The table response_types 1066 may include the following fields:

response_typeid—an identifier for an individual response types.

table_name—the name of the table in which responses of a specific response type are stored.

class_name—the name of the class of which the response type is a part.

The table responses 1068 stores responses. It is used to define the common fields (e.g., respondent_orgid, submitted, create_timestamp, mod_userid, and mod_timestamp) which exist in all of the tables which inherit from it. The tables that inherit from the table responses are preferably the tables narrative_responses 1070, if_then_responses 1072, dict_list_responses 1084, and financial_grids 1074. The table responses 1068 may include the following fields:

respondent_orgid—the identifier of the respondent organization. It references the orgid field in the table organizations.

submitted—Boolean; whether a qrset containing an individual response has been submitted.

create_timestamp—date and time a response is created.

mod_userid—the user ID of the user to last modify the response.

mod_timestamp—date and time a response is modified.

The table narrative_responses 1070 stores information about narrative responses. Narrative responses are textual responses. Narrative_responses inherits respondent_orgid, submitted, create_timestamp, mod_userid and mod_timestamp from the table responses 1068 and is related to the table organizations 1004. The table narrative_responses 1070 may include the following fields:

respondent_orgid—the identifier of the respondent organization. It references the orgid field the in the table organizations.

submitted—Boolean; whether a qrset containing an individual response has been submitted.

create_timestamp—date and time a response is created.

mod_userid—the user ID of the user to last modify the response.

mod_timestamp—date and time a response is modified.

narrative_responseid—an identifier of the narrative response.

response—the text of the response.

The table if_then_responses 1072 stores information about if-then responses. If-then responses are two part questions; the first part generally consists of a Boolean response. The second part, when applicable, generally consists of simple text. If_then_responses preferably inherit respondent_orgid, submitted, create_timestamp, mod_userid and mod_timestamp from the table responses 1068 and is related to the table organizations 1004. The table if_then_responses 1072 may include the following fields:

respondent_orgid—the identifier of the respondent organization. It references the orgid field the in the table organizations.

submitted—Boolean; whether a qrset containing an individual response has been submitted.

create_timestamp—date and time a response is created.

mod_userid—the user ID of the user to last modify the response.

mod_timestamp—date and time a response is modified.

if_then_responseid—an identifier of the if-then response.

boolean_response—the response to part one of the if-then question.

narrative_responseid—the response to part two of the if-then question.

The table financial_grids 1074 stores information about financial responses. Financial responses are stored in grids of varying numbers of columns and rows. Financial_grids inherits respondent_orgid, submitted, create_timestamp, mod_userid and mod_timestamp from the table responses 1068 and is related to the table organizations 1004 and tags 1054. The table financial_grids 1074 may include the following fields:

respondent_orgid—the identifier of the respondent organization. It references the orgid field the in the table organizations.

submitted—Boolean; whether a qrset containing an individual response has been submitted.

create_timestamp—date and time a response is created.

mod_userid—the user ID of the user to last modify the response.

mod_timestamp—date and time a response is modified.

financial_gridid—an identifier for the financial grid response.

fiscal_year—an identifier for the fiscal year for which financial information is being submitted.

fiscal_quarter—an identifier for the fiscal quarter for which financial information is being submitted.

org_level—an identifier of the level to which the financial information applies. Financial information can apply to an organization, a program/project, or a grant.

accounting—an identifier of the accounting basis followed by the respondent organization. The accounting basis can be, for example, cash or accrual.

cashflow—an identifier of the cash flow method followed by the respondent organization. The cash flow method can be, for example, direct or indirect.

statement_tagid—an identifier of the tag associated with a given financial statement. It references the tagid field in the table tags.

The table financial_columns 1076 stores information about the columns in a financial grid. It is related to the table financial_cells 1078. The table financial_columns 1076 may include the following fields:

financial_columnid—an identifier for a column within a financial grid.

financial_gridid—an identifier of a financial grid of which the financial column is part. It references the financial_gridid field in the table financial_grids.

name—the name of the column in the financial grid.

label—the label visible to the user for the column in the financial grid.

sort_order—the order in which financial column appears.

The table financial_cells 1078 stores information about cells within a financial grid. It is related to the tables financial_columns 1076, financial_grids 1074 and financial_rows 1080. The table financial_cells 1078 may include the following fields:

financial_cellid—an identifier for an individual cell within a financial grid.

financial_gridid—an identifier for a financial grid. It references the financial_gridid field in the table financial_grids.

financial_columnid—an identifier for the column in the financial grid in which the financial cell resides. It references the financial_columnid field in the table financial_cells.

financial_rowid—an identifier for the row in the financial grid in which the financial cell resides. It references the financial_rowid field in the table financial_rows.

value—the value of the individual cell.

The table financial_rows 1080 stores information about the rows in a financial grid. It is related to the tables financial_sections 1082 and financial_grids 1074. The table financial_rows 1080 may include the following fields:

financial_rowid—an identifier for a row within a financial grid.

financial_gridid—an identifier for the financial grid of which the financial row is a part. It references the financial_gridid field in the table financial_grids.

financial_sectionid—identifier for the section in the financial grid of which the financial row is part (for example, whether it is an expense row or an income row in an income statement or statement of activities, or an asset or liability on a balance sheet or statement of financial condition). It references the financial_sectionid field in the table financial_sections.

name—the name of the financial row.

label—the label visible to the user for the financial row.

sort_order—the order in which the financial row appears.

The table financial_sections 1082 stores information about the sections within a financial grid. For example, a statement of activities might include an income section and an expenses section, or a statement of financial condition might include an assets section, a liabilities section, and a net assets section. The table financial_sections 1082 is related to the table financial_grids 1074. The table financial_sections 1082 may include the following fields:

financial_sectionid—an identifier for a section within a financial grid.

financial_gridid—an identifier for a financial grid. It references the financial_gridid field in the table financial_grids.

name—the name of the financial section.

label—the label visible to the user for the financial section.

sort_order—the order in which the financial section appears.

The table dict_list_responses 1084 stores responses for a "dict list." A dict list stores an ordered sequence of dicts. A dict is a set of tuples containing a name and a value. Each name is a text string. The types of values in a dict may be non-homogeneous (can be any type from the values_type table). The table dict_list_responses 1084 is the top level in managing dict list information. It is related to the tables organizations 1004, dict_list_entries 1090 and dict_list_types 1088. Dict_list_responses inherits respondent_orgid, submitted, create_timestamp, mod_userid and mod_timestamp from the table responses 1068. The table dict_list_responses 1084 may include the following fields:

respondent_orgid—the identifier of the respondent organization. It references the orgid field in the table organizations.

submitted—Boolean; whether a qrset containing an individual response has been submitted.

create_timestamp—date and time a response is created.

mod_userid—the user ID of the user to last modify the response.

mod_timestamp—date and time a response is modified.

dict_list_responseid—an identifier of the dict_list response. It references dict_list_responseid field in the table dict_list_types.

The table value_types 1086 stores the different types of values that dict list responses can contain. It is referenced in determining the variant values of responses in a given dict list. It is related to the table dict_list_types 1088 and the variant_values tables 1092. The value types are intrinsic to the PostgreSQL database and may include: text, date, numeric, float, integer, Boolean, and tag. The table value_types 1086 may include the following fields:

value_typeid—the identifier of the type of value (e.g., text is 1).

value_type—an internal name (i.e. 'text' or 'date') for the type.

The table dict_list_types 1088 defines each of the columns in tabular form for a dict list. For each column in a dict list, the table dict_list_types 1088 defines what type of value will be in that column. Each column then has a consistent value type (e.g., numeric). For example, a dict list showing funding sources might have two columns: source and amount. The source column will contain text values while the amount column will contain numeric values. The table dict_list_types 1088 is related to the tables dict_list_responses 1084, value_types 1086 and dict_list_entries 1090. The table dict_list_types 1088 may include the following fields:

dict_list_typeid—an identifier for the type of dict list.

dict_list_responseid—an identifier for the response to the dict list. It references dict_list_responseid field in the dict_list_responses table.

name—the name of the dict list.

value_typeid—an identifier of the type of value (e.g., 1=text). It references value_typeid field in the table value_types.

The table dict_list_entries 1090 stores specific entries into dict lists. It is related to the tables dict_list_responses 1084 and dict_list_types 1088. The table dict_list_entries 1090 may include the following fields:

dict_list_entryid—an identifier of an individual dict list entry.

dict_list-responseid—an identifier of the dict list response. It references dict_list_responseid field in the table dict_list_responses. This relates the individual response within a dict list to the overall response in a qrset.

dict_list-typeid—an identifier of the dict list type. It references dict_list_type field in the table dict_list_types.

sequence_index—specifies which dict in the list this entry is from.

variant_valueid—the identifier of the type of value for this particular entry. The variant_valueid is passed through the table variant_values 1092 to the appropriate variant table (specific to the type of value, e.g., text).

The table variant_values 1092 is an entity that tells the application which type of value is stored in a given variant in a dict list. It may be a table that passes information along to the appropriate table for a given value type. The table variant_values 1092 may have a single field that is inherited by the various variant_values_*tables. That field may be:

variant_valueid—identifies which type of data is stored in a given dict_list in order to determine what kind of data is in a given field. The variant_valueid may be a number that is assigned in series to the following types of fields as a non-limiting example: text, date, numeric, integer, float, Boolean, and tag.

The table variant_values_text 1094 stores information about text values stored in a given dict list. It inherits the variants_valueid field from the table variant_values 1092. The table variant_values_text 1094 may include the following fields:

variant_valueid—identifies which type of data is stored in a given dict_list. It is inherited from variant_valueid field in the table variant_values 1092.

variant_value—the actual value of the given variant.

The table variant_values_tag 1096 stores information about tag values stored in a given dict list. It is related to the table tags 1054. It inherits the variants_valueid field from the table variant_values 1092. The table variant_values_tag 1096 may include the following fields:

variant_valueid—identifies which type of data is stored in a given dict_list. It may be inherited from variant_valueid field in the table variant_values 1092.

variant_value—the actual value of the given variant.

The table variant_values_numeric 1098 stores information about numeric values stored in a given dict list. Numeric values are used, for example, for dollar/financial figures in the database. It inherits the variants_valueid field from the table variant_values 1092. The table variant_values_numeric 1098 may include the following fields:

variant_valueid—identifies which type of data is stored in a given dict_list. It is inherited from variant_valueid field in the table variant_values 1092.

variant_value—the actual value of the given variant.

The table variant_values_integer 1100 stores information about integer values stored in a given dict list. It inherits the variants_valueid field from the table variant_values 1092. The table variant_values_integer 1100 may include the following fields:

variant_valueid—identifies which type of data is stored in a given dict_list. Inherited from variant_valueid field in the table variant_values 1092.

variant_value—the actual value of the given variant.

The table variant_values_float 1102 stores information about float values stored in a given dict list. Floating point values are a type of numeric value. It inherits the variants_valueid field from the table variant_values 1092. The table variant_values_float 1102 may include the following fields:

variant_valueid—identifies which type of data is stored in a given dict_list. It is inherited from variant_valueid field in the table variant_values.

variant_value—the actual value of the given variant.

The table variant_values_date 1104 stores information about date values stored in a given dict list. It inherits the variants_valueid field from the table variant_values 1092. The table variant_values_date 1104 may include the following fields:

variant_valueid—identifies which type of data is stored in a given dict_list. It is inherited from variant_valueid field in the table variant_values 1092.

variant_value—the actual value of the given variant.

The table variant_values_boolean 1106 stores information about Boolean values stored in a given dict list. It inherits the variants_valueid field from the table variant_values 1092. The table variant_values_boolean 1106 may include the following fields:

variant_valueid—identifies which type of data is stored in a given dict_list. It is inherited from variant_valueid field in the table variant_values 1092.

variant_value—the actual value of the given variant.

Table: status 1108: The table status 1108 stores the status of entity in the database (e.g., a user, grant, organization, proposal, template, report, etc.). An entity can be, for example, active, inactive, deleted, or replaced. The status field references the status table. The table status 1108 may include the following field:

status—the status of an entity in the database (e.g., a user, grant, organization, proposal, template, report, etc.). An entity can be, for example, active, inactive, deleted, or replaced.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of reusing answers from prior forms to complete a computerized form for generating a response to a request for a grant proposal in a grant administration system, the method comprising:

storing a plurality of previously-answered questions from multiple asker organizations and previously-entered answers from multiple responder organizations corresponding to the previously answered questions in a centralized storage medium available for access to both asker and responder organizations;

securely facilitating simultaneous communication between said asker and responder organizations to allow multi-party addition of information;

operatively connecting the centralized storage medium to a login module;

wherein a previously-answered question and previously-entered answer from a prior proposal are stored as a question/answer pair; wherein said previously-answered questions and previously-entered answers and information pertaining to said previously-answered questions and previously-entered answers are accessible to a responding user;

presenting a question to the responding user associated with an organization, wherein the question is part of a form to be completed, wherein said form is capable of being generated by the responding user and/or by an asker;

identifying a previously-answered question deemed similar to a current question;

increasingly identifying more questions as similar to each other;

updating an interactive database;

providing a template tool that provides the responding user the ability to reuse at least a portion of an answer to a previously-answered question and allowing both the asker and the responder to reuse questions from other askers;

allowing both the responding user and a user at an asker organization to add a new question thereby adding information to the database;

allowing a tag to be applied to the question being presented and/or entered, wherein the tag links similar questions to be available to both the asker and the responding user;

using the template tool to search the centralized storage medium to locate static question/answer pairs having one or more tags in common with the question being presented and/or entered wherein the tags were applied by the responding user;

presenting a list of static question/answer pairs that have one or more tags in common with the question being presented and/or entered;

allowing the responding user to select one of the previously-entered answers associated with a selected question/answer pair as a response to the question being presented and/or entered;

generating a new answer to the question being presented and/or entered which comprises at least a portion of said selected previously-entered answer for generating a response to a request for a new grant proposal unrelated to the prior proposal;

updating the centralized storage medium to add the question being presented and/or entered and the new generated answer prior to the responding user submitting said form; and associating the new generated answer with the question being presented and/or entered to generate a new static question/answer pair.

2. The method of claim 1, wherein the previously-entered answers comprise a prose discussion of goals, accomplishments, organizational information, challenges, success stories, and/or numeric information about activities, outcomes, funding sources, people served and/or budget information.

3. The method of claim 1, further comprising storing the question being presented and the response to the question being presented in the centralized storage medium when the responding user saves the response.

4. The method of claim 1, wherein responding users of multiple organizations complete the computerized form.

5. The method of claim 1, wherein a user at a responder organization and a user at an asker organization are allowed to add information to the database that relates to a different asker organization.

6. The method of claim 1, wherein the tag is applied by a database operator.

7. An apparatus for reusing answers from a prior form to complete a computerized form for generating a response to a request for a grant proposal, the apparatus being part of a grant administration system, and comprising:

a centralized storage medium comprising a plurality of previously-answered questions from multiple asker organizations and previously-entered answers from multiple responder organizations corresponding to the previously-answered questions from a prior proposal available for access to both asker and responder organizations to allow multi-party addition of information, wherein the previously-entered answers were entered by a responding user associated with an organization, wherein said previously-answered questions and previously-entered answers and information pertaining to said previously-answered questions and previously-entered answers are accessible to the responding user, wherein the previously-answered question and previously-entered answer are stored as a static question/answer pair in the centralized storage medium which securely facilitates simultaneous communication between said asker and responder organizations, and wherein the centralized storage medium is operatively connected to a login module; and a computer network interface connected to the centralized storage medium, wherein the computer network interface is operable to:

(a) present a question to the responding user associated with an organization, wherein the question is part of a form to be completed, wherein said form is capable of being generated by the responding user and/or an asker and identifying a previously-answered question deemed similar to a current question;

(b) increasingly identify more questions as similar to each other and update an interactive database by providing a template tool that provides the responding user the ability to reuse at least a portion of an answer to a previously-answered question and allowing both the asker and the responder to reuse questions from other askers;

(c) allow both the responding user and a user at an asker organization to add a new question thereby adding information to the database;

(d) allow a tag to be applied to the question being presented and/or entered, wherein the tag links similar questions to be available to both the asker and the responding user, (e) using the template tool to search the centralized storage medium to locate static question/answer pairs that have one or more tags in common with the question being presented and/or entered, (f) present the responding user with a list of question/answer pairs that have one or more tags in common with the question being presented and/or entered, (g) allow the responding user to select one of the previously-entered answers associated with a selected question/answer pair as a response to the question being presented and/or entered, (h) generate a new answer to the question being presented and/or entered using at least a portion of said selected previously-entered answer to generate a response to a request for a new grant proposal unrelated to the prior proposal, and (i) update the centralized storage medium to add said generated answer prior to the responding user submitting said form; and (j) associate the new generated answer with the question being presented and/or entered to generate a new static question/answer pair.

8. The apparatus of claim 7, wherein the previously-entered answers comprise a prose discussion of goals, accomplishments, organizational information, challenges, success stories, and/or numeric information about activities, outcomes, funding sources, people served and/or budget information.

9. The apparatus of claim 7, wherein the computer network interface is operable to store the question being presented and the selected response in the centralized storage medium when the responding user saves the response.

10. The apparatus of claim 7, wherein responding users of multiple organizations complete the computerized form.

11. A method of reusing answers from prior forms for generating a grant report in a grant administration system, the method comprising:
storing a plurality of previously-answered questions from multiple asker organizations and previously-entered answers from multiple responder organizations corresponding to the previously answered questions from a prior proposal in a centralized storage medium available for access to both asker and responder organizations, wherein said previously-answered questions and previously-entered answers and information pertaining to said previously-answered questions and previously-entered answers are accessible to a responding user, wherein a previously-answered question and previously-entered answer are stored as a static question/answer pair in the centralized storage medium;
securely facilitating simultaneous communication between said asker and responder organizations to allow multi-party addition of information; operatively connecting the centralized storage medium to a login module;
presenting a question to the responding user associated, wherein the question is part of a form to be generated, wherein said form is capable of being generated by the responding user and/or an asker;
identifying a previously-answered question deemed similar to a current question;
increasingly identifying more questions as similar to each other;
updating an interactive database by providing a template tool that provides the responding user the ability to reuse at least a portion of an answer to a previously-answered question and allowing both the asker and the responder to reuse questions from other askers;
allowing both the responding user and a user at an asker organization to add a new question thereby adding information to the database;
allowing a tag to be applied to the question being presented and/or entered, wherein the tag links similar questions to be available to both the asker and the responding user;
using the template tool to search the centralized storage medium to locate static question/answer pairs having one or more tags in common with the question being presented and/or entered, wherein the tags were applied by the responding user;
presenting a list of question/answer pairs that have one or more tags in common with the question being presented and/or entered;
allowing the responding user to select one of the previously-entered answers associated with a selected question/answer pair as a response to the question being presented and/or entered;
generating a new answer to the question being presented and/or entered which comprises at least a portion of said selected previously-entered answer for generating a form;
updating the centralized storage medium to add the question being presented and entered and the new generated answer prior to the responding user submitting said form; and
associating the new generated answer with the question being presented and/or entered to generate a new static question/answer pair unrelated to the prior proposal.

12. The method of claim 11, wherein the previously-entered answers comprise a prose discussion of goals, accomplishments, organizational information, challenges, success stories, and/or numeric information about activities, outcomes, funding sources, people served and/or budget information.

13. The method of claim 11, further comprising storing the question being presented and the response to the question being presented in the centralized storage medium when the responding user saves the response.

14. The method of claim 11, wherein responding users of multiple organizations complete the computerized form.

15. An apparatus for reusing answers from a prior form to generate a form, the apparatus being part of a grant administration system, and comprising:
a centralized storage medium comprising a plurality of previously-answered questions from multiple asker organizations and previously-entered answers from multiple responder organizations corresponding to the previously-answered questions from a prior proposal available for access to both asker and responder organizations, that securely facilitates simultaneous communication between said asker and responder organizations to allow multi-party addition of information, wherein the previously-entered answers were entered by a responding user associated with an organization, wherein said previously-answered questions and previously-entered answers and information pertaining to said previously-answered questions and previously-entered answers are accessible to the responding user, wherein the previously-answered question and previously-entered answer are stored as a static question/answer pair, and wherein the centralized storage medium is operatively connected to a login module; and
a computer network interface connected to the centralized storage medium, wherein the computer network interface is operable to:
(a) present a question to the responding user, wherein the question is part of a to be generated, wherein said form is capable of being generated by the responding user and/or an asker and identifying a previously-answered question deemed similar to a current question;
(b) increasingly identify more questions as similar to each other and update an interactive database by providing a template tool that provides the responding user the ability to reuse at least a portion of an answer to a previously-answered question, add a new question and allowing both the asker and the responder to reuse questions from other askers, thereby adding information to the database;
(c) allow a tag to be applied to the question being presented and/or entered, wherein the tag links similar questions to be available to both the asker and the responding user,
(d) using the template tool to search the centralized storage medium to locate static question/answer pairs that have one or more tags in common with the question being presented and/or entered,
(e) present the responding user with a list of question/answer pairs that have one or more tags in common with the question being presented and/or entered, (f) allow the responding user to select one of the previously-entered answers associated with a selected question/answer pair as a response to the question being presented and/or entered,
(g) generate a new answer to the question being presented using at least a portion of said selected previously-entered answer to generate a response to a request for a grant,
(h) update the centralized storage medium to add said generated answer prior to the responding user submitting said form; and
(i) associate the new generated answer with the question being presented to generate a new static question/answer pair unrelated to the prior proposal.

16. The apparatus of claim 15, wherein the form comprises a grant report.

17. The apparatus of claim 15, wherein the previously-entered answers comprise a prose discussion of goals, accomplishments, organizational information, challenges, success stories, and/or numeric information about activities, outcomes, funding sources, people served and/or budget information.

18. The apparatus of claim 15, wherein the computer network interface is operable to store the question being presented and the selected response in the centralized storage medium when the responding user saves the response.

19. The apparatus of claim 15, wherein responding users of multiple organizations complete the computerized form.

* * * * *